(12) United States Patent
Drevö et al.

(10) Patent No.: US 9,955,337 B2
(45) Date of Patent: Apr. 24, 2018

(54) UE IDENTIFICATION IN WLAN

(71) Applicant: Telefonaktiebolaget LM Ericsson (publ), Stockholm (SE)

(72) Inventors: Markus Drevö, Linköping (SE); Rasmus Axén, Linköping (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/113,263

(22) PCT Filed: Jun. 23, 2016

(86) PCT No.: PCT/SE2016/050617
§ 371 (c)(1),
(2) Date: Jul. 21, 2016

(87) PCT Pub. No.: WO2017/007399
PCT Pub. Date: Jan. 12, 2017

(65) Prior Publication Data
US 2017/0251352 A1    Aug. 31, 2017

Related U.S. Application Data

(60) Provisional application No. 62/188,532, filed on Jul. 3, 2015.

(51) Int. Cl.
*H04W 4/00* (2009.01)
*H04W 8/00* (2009.01)
*H04L 29/06* (2006.01)
*H04W 12/06* (2009.01)
*H04W 76/06* (2009.01)
*H04W 84/04* (2009.01)
(Continued)

(52) U.S. Cl.
CPC ......... *H04W 8/005* (2013.01); *H04L 63/0876* (2013.01); *H04W 12/06* (2013.01);
(Continued)

(58) Field of Classification Search
CPC .............................. H04W 88/08; H04W 92/20
(Continued)

(56) References Cited

U.S. PATENT DOCUMENTS

| | | | |
|---|---|---|---|
| 8,787,228 B2 * | 7/2014 | Avital ............... | H04W 36/0083 370/311 |
| 2008/0304458 A1 * | 12/2008 | Aghvami .............. | H04W 48/16 370/338 |
| 2014/0204927 A1 | 7/2014 | Horn et al. | |

OTHER PUBLICATIONS

Unknown, Author, "3rd Generation Partnership Project; Technical Specification Group Radio Access Network; Study on Multiple Radio Access Technology (Multi-RAT) joint coordination (Release 13)", 3GPP TR 37.870 V13.0.0, Jun. 2015, 1-24.

(Continued)

Primary Examiner — Kiet Doan
(74) Attorney, Agent, or Firm — Murphy, Bilak & Homiller, PLLC

(57) ABSTRACT

Mechanisms are provided to enable the identification of a UE in both the cellular network (e.g., a 3GPP network) and the WLAN. In some aspects, the UE is provided with information enabling it to find the transport network layer, TNL, address (e.g., an IP address) of the WT and an identifier of the UE. Using the TNL of the WT, the UE can establish a connection towards the WT (either connectionless or connection oriented) and provide the UE identity. The WT and eNodeB exchange information about the UE ID, and the UE is identified in both the 3GPP network and the WLAN. The WT is a logical node and may be integrated in the eNodeB, in a WLAN node (e.g. access controller, access point), standalone or somewhere else. Once identified, user data can be sent to the UE via the WT.

23 Claims, 47 Drawing Sheets

(51) Int. Cl.
  *H04W 84/12* (2009.01)
  *H04L 29/12* (2006.01)
  *H04L 29/08* (2006.01)
  *H04W 88/06* (2009.01)
  *H04W 92/02* (2009.01)

(52) U.S. Cl.
  CPC ......... *H04W 76/06* (2013.01); *H04L 61/1511* (2013.01); *H04L 69/326* (2013.01); *H04W 84/042* (2013.01); *H04W 84/12* (2013.01); *H04W 88/06* (2013.01); *H04W 92/02* (2013.01)

(58) Field of Classification Search
  USPC .................. 455/456.1, 411, 436, 410, 414.1; 370/338, 329, 311, 252
  See application file for complete search history.

(56) References Cited

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.5.0, Mar. 2015, 1-445.
3GPP, "3rd Generation Partnership Project; Technical Specification Group Radio Access Network; Evolved Universal Terrestrial Radio Access Network (E-UTRAN); S1 Application Protocol (S1AP) (Release 12)", 3GPP TS 36.413 V12.5.0, Mar. 2015, 1-301.
Rigney, C., et al., "Remote Authentication Dial in User Service (RADIUS)", Network Working Group, Request for Comments: 2865, Jun. 2000, 1-77.

* cited by examiner

UE IDENTIFICATION IN WLAN

TECHNICAL FIELD

The present invention generally relates to wireless communication networks, and particularly relates to wireless devices in interworking wireless local area network (WLAN) and wide-area cellular networks.

BACKGROUND

The WLAN technology known as "Wi-Fi" can be used to offload traffic from wide-area cellular networks, such as 3GPP cellular networks. Interest in cooperation between WLANs and cellular networks is rapidly increasing, since virtually all smartphones support Wi-Fi. In some Wi-Fi descriptions, the term "Station" (STA) might be used instead of user equipment (UE). Accordingly, the terms UE, STA and terminal may be used interchangeably herein to describe wireless terminals that support both a cellular technology (such as Evolved Universal Terrestrial Radio Access, or E-UTRA) and WLAN.

In a Wi-Fi architecture, the wireless terminal (UE/STA) is connected on the user plane to the Wi-Fi Access Point (AP), which can be directly connected to the Internet. In the control plane, an Access point Controller (AC) may handle the management of the AP. One AC can handle the management of several APs. Security and authentication of users can be handled via an Authentication, Authorization and Accounting (AAA) entity, which may be a RADIUS server. Remote Administration Dial-In User Service (RADIUS) is the most widely used network protocol for providing a centralized AAA management (RFC 2865).

In working groups of the $3^{rd}$-Generation Partnership Project (3GPP), the functionality for sending data from a 3GPP network to a UE, via WLAN, is being standardized. The current architecture in 3GPP is shown in FIG. 1, where the WLAN Termination (WT) is a logical node connected to a 3GPP network (e.g., an eNB in E-UTRAN). The WLAN Termination is also connected to the WLAN.

However, when the UE has found and connected to an AP in WLAN, there is currently no mechanism for the eNodeB to find the UE on the WLAN side, or for the AP to find or know which WLAN Termination is connected to the eNodeB serving the UE.

SUMMARY

The embodiments described herein provide mechanisms to enable the identification of the UE in both the cellular network (e.g., a 3GPP network) and the WLAN. In some aspects, the UE is provided with information enabling it to find the transport network layer (TNL) address (e.g., an IP address) of the WLAN Termination and an identifier of the UE. Using the TNL of the WLAN Termination, the UE can establish a connection towards the WLAN Termination (either connectionless or connection oriented) and provide the UE identity. The WLAN Termination and eNodeB exchange information about the UE ID, and the UE is identified in both the 3GPP network and the WLAN. The WLAN Termination is a logical node and may be integrated in the eNodeB, in a WLAN node (e.g., AC, AP), in a standalone implementation or somewhere else. Once identified, user data can be sent to the UE via the WLAN Termination.

According to some embodiments, a method in a network access node of a wide-area cellular network, the network access node associated with a node ID and configured to communicate with a wireless terminal that is associated with a wireless terminal ID and that is configured for operation in the cellular network and in a WLAN, wherein the method includes sending, to the wireless terminal via the cellular network, a logical node ID associated with a logical node that is operatively connected to the cellular network and the WLAN. The method also includes receiving, from the logical node, the wireless terminal ID of the wireless terminal via the WLAN. The method further includes comparing the received wireless terminal ID with stored wireless terminal IDs and, responsive to a match of the received wireless terminal ID and one of the stored wireless terminal IDs, identifying the wireless terminal in both the WLAN and the cellular network.

According to some embodiments, a method, in a wireless terminal of a wide-area cellular network, the wireless terminal associated with a wireless terminal ID and configured for operation in the cellular network and in a WLAN, wherein the method includes receiving, from a network access node of the cellular network via the cellular network, a node ID of the network access node and a logical node ID of a logical node that is operatively connected to the cellular network and the WLAN. The method also includes sending, to the logical node via the WLAN, the wireless terminal ID and a TNL address of the wireless terminal.

According to some embodiments, a method, in a logical node associated with a logical node ID and configured to communicate with a wireless terminal that is associated with a wireless terminal ID, the wireless terminal being configured for operation in a wide-area cellular network and in a WLAN, wherein the method includes receiving, from the wireless terminal via the WLAN, the wireless terminal ID and a TNL address the logical node uses to reach the wireless terminal. The method also includes sending the wireless terminal ID to a network access node of the cellular network identified by a node ID of the network access node.

According to some embodiments, a method, in a network access node of a wide-area cellular network, the network access node associated with a node ID and configured to communicate with a wireless terminal that is associated with a wireless terminal ID and configured for operation in the cellular network and in a WLAN, includes sending the wireless terminal ID to a logical node that is operatively connected to the cellular network and to the WLAN and receiving an indication from the logical node that the wireless terminal has been identified in the WLAN.

According to some embodiments, a method, in a logical node associated with a logical node ID and configured to communicate with a wireless terminal configured for operation in a wide-area cellular network and in a WLAN, includes receiving, from a network access node of the cellular network, a first wireless terminal ID associated with the wireless terminal. The method also includes receiving, from the wireless terminal, a second wireless terminal ID associated with the wireless terminal. The method further includes comparing the first wireless terminal ID received from the network access node and the second wireless terminal ID received from the wireless terminal. The method further includes, responsive to a match of the first and second wireless terminal IDs, identifying the wireless terminal in both the WLAN and the cellular network. The method also includes sending a notification to the network access node that the wireless terminal has been identified in the WLAN.

According to some embodiments, a method, in a logical node associated with a logical node ID and configured to communicate with a wireless terminal configured for operation in a wide-area cellular network and in a WLAN, includes receiving, from a network access node of the cellular network, a first wireless terminal ID associated with the wireless terminal. The method also includes receiving, from the wireless terminal, a node ID of the network access node and a second wireless terminal ID associated with the wireless terminal. The method further includes comparing the first and second wireless terminal IDs and, responsive to a match of the first and second wireless terminal IDs, identifying the wireless terminal in the WLAN. The method also includes sending a notification to the network access node that the wireless terminal has been identified in the WLAN.

According to some embodiments, a method, in a wireless terminal of a wide-area cellular network, the wireless terminal associated with a wireless terminal ID and configured for operation in the cellular network and in a WLAN, includes receiving a node ID of a network access node of the cellular network from the network access node via the cellular network and sending the node ID and the wireless terminal ID to an access point of the WLAN.

According to some embodiments, a method, in an access point of a WLAN configured for communication with a wireless terminal that is associated with a wireless terminal ID, the wireless terminal being configured for operation in the WLAN and in a wide-area cellular network, wherein the method includes receiving a node ID of a network access node of the cellular network and the wireless terminal ID from the wireless terminal and sending the node ID and the wireless terminal ID to a logical node that is operatively connected to the cellular network and the WLAN.

According to some embodiments, a method, in a logical node associated with a logical node ID and configured to communicate with a wireless terminal configured for operation in a wide-area cellular network and in a WLAN, includes receiving, from an access point of the WLAN, a node ID of a network access node of the cellular network and a wireless terminal ID associated with the wireless terminal and sending the wireless terminal ID to the network access node identified by the node ID.

According to some embodiments, a method, in a network access node of a wide-area cellular network, the network access node associated with a node ID and configured to communicate with a wireless terminal that is associated with a wireless terminal ID and configured for operation in the cellular network and in a WLAN, includes receiving the wireless terminal ID from a logical node that is operatively connected to the cellular network and the WLAN. The method also includes comparing the wireless terminal ID received from the logical node to stored wireless terminal IDs. The method further includes, responsive to a match of the received wireless terminal ID and one of the stored wireless terminal IDs, identifying the wireless terminal in both the WLAN and the cellular network and identifying that the wireless terminal has a connection via the logical node.

According to some embodiments, a method, in a network access node of a wide-area cellular network configured to serve a wireless terminal configured for operation in the cellular network and in a WLAN, includes sending a node ID associated with the network access node to the wireless terminal via the cellular network. The method also includes receiving the first wireless terminal ID from the wireless terminal via the cellular network and receiving a second wireless terminal ID of the wireless terminal from a logical node that is operatively connected to the cellular network and the WLAN. The method further includes comparing the first wireless terminal ID received from the wireless terminal and the second wireless terminal ID received from the logical node. The method includes, responsive to a match of the first and second wireless terminal IDs, identifying the wireless terminal in both the WLAN and the cellular network.

According to some embodiments, a method, in a network access node of a wide-area cellular network, the network access node configured to communicate with a wireless terminal configured for operation in the cellular network and in a WLAN, includes receiving a wireless terminal ID associated with the wireless terminal from the wireless terminal via the cellular network. The method also includes receiving, from the wireless terminal, a logical node ID of a logical node that is operatively connected to the cellular network and the WLAN. The method further includes sending the wireless terminal ID to the logical node identified by the logical node ID and receiving an indication from the logical node that the wireless terminal has been identified in the WLAN.

According to some embodiments, a method, in a logical node associated with a logical node ID and configured to communicate with a wireless terminal configured for operation in a wide-area cellular network and in a WLAN, includes receiving, from a network access node of the cellular network, a first wireless terminal ID associated with the wireless terminal. The method also includes receiving, from an access point of the WLAN, a node ID of the network access node and a second wireless terminal ID associated with the wireless terminal. The method further includes comparing the first wireless terminal ID received from the network access node and the second wireless terminal ID received from the access point and, responsive to a match of the first and second wireless terminal IDs, identifying the wireless terminal in both the WLAN and the cellular network. The method also includes sending a notification to the network access node that the wireless terminal has been identified in the WLAN.

According to some embodiments, a method, in a network access node of a wide-area cellular network, the network access node associated with a node ID and configured to communicate with a wireless terminal configured for operation in the cellular network and in a WLAN, includes receiving a first WLAN media access control (MAC) address of the wireless terminal via the cellular network. The method also includes receiving a second WLAN MAC address from a logical node that is operatively connected to the cellular network and the WLAN. The method further includes comparing the first WLAN MAC address received from the wireless terminal and the second WLAN MAC address received from the logical node. The method includes, responsive to a match of the first and second WLAN MAC addresses, identifying the wireless terminal in the WLAN via the logical node.

According to some embodiments, a method, in a network access node of a wide-area cellular network, the network access node associated with a node ID and configured to communicate with a wireless terminal configured for operation in the cellular network and in a WLAN, includes receiving a WLAN MAC address of the wireless terminal via the cellular network. The method also includes sending the WLAN MAC address to one or more logical nodes and receiving an indication from one of the logical nodes that the wireless terminal associated with the WLAN MAC address has been identified in the WLAN.

According to some embodiments, a method, in a logical node associated with a logical node ID and configured to communicate with a wireless terminal configured for operation in a wide-area cellular network and in a WLAN, includes receiving, from a network access node of the cellular network, a first WLAN MAC address associated with the wireless terminal. The method also includes receiving, from an access point of the WLAN, a second WLAN MAC address associated with the wireless terminal. The method includes comparing the first WLAN MAC address received from the network access node and the second WLAN MAC address received from the access point. The method further includes, responsive to a match of the first and second WLAN MAC addresses, identifying the wireless terminal in both the WLAN and the cellular network. The method also includes sending a notification to the network access node that the wireless terminal has been identified in the WLAN.

According to some embodiments, the methods described above may be implemented by respective network access nodes, logical nodes, wireless terminals and access points. These devices may include memory, communication circuitry and processing circuitry for implementing the methods. According to some embodiments, computer programs, computer program products and computer readable media may be used to implement the methods.

Of course, the present invention is not limited to the above features and advantages. Those of ordinary skill in the art will recognize additional features and advantages upon reading the following detailed description, and upon viewing the accompanying drawings.

DETAILED DESCRIPTION

A cell in a wide-area cellular network, or 3GPP network, such as the Long Term Evolution (LTE) network, is associated with a radio access network (RAN) node. Although terminology from specifications for the LTE network (also referred to as the E-UTRAN) is used in this disclosure to exemplify embodiments of the inventive concepts, this should not be seen as limiting the scope of the presently disclosed techniques to only these systems. Wireless terminals designed for use in other wireless systems, including variations and successors of 3GPP LTE systems, and WCDMA (UMTS) systems, WiMAX (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments disclosed herein.

Figure 1:
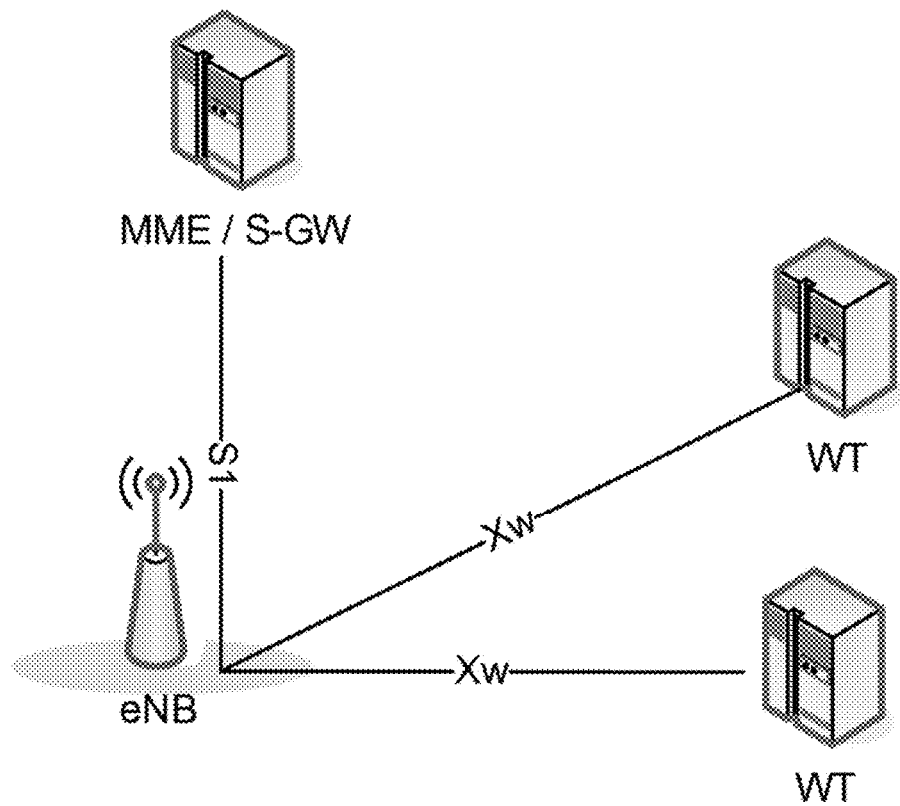
FIG. 1 illustrates cellular/WLAN interworking.

In order to implement some of the various embodiments described herein, a communication path is established between a WLAN AP and/or a WLAN AC and a logical node referred to as a WLAN Termination, or "WT." The WT is also connected to base stations (e.g., eNBs) in the 3GPP network, as shown in FIG. 1. Thus, communications can be exchanged between a 3GPP eNB and the WLAN, via the WT. As noted above, the WT is a logical node and may be integrated in an eNodeB, in a WLAN node (e.g. AC, AP), standalone or somewhere else. It will be appreciated that when the WT is physically separated from the WLAN AP or AC, the connection between the WT and the WLAN AP or AC would typically be established via the WLAN AP's broadband connection, rather than there being a direct (e.g. air interface) signaling connection between the AP and WT. Similar interfaces may be established between one WT and multiple WLAN APs.

As noted above, 3GPP is developing functionality to allow data for a UE that is received at an eNB to be sent from the 3GPP network to the UE, via a WLAN to which the UE is connected. One currently agreed architecture in 3GPP is illustrated in FIG. 1, where the WT is a logical node connected to a 3GPP network (e.g. an eNodeB in E-UTRAN). The WT is also connected to the WLAN.

One problem with existing solutions is that when the UE has found and connected to an AP in WLAN there is no mechanism for the eNodeB to find the UE on the WLAN side. Further, there is no mechanism for a WLAN AP to determine which WT is connected to the eNodeB serving the UE that is connected to the AP.

According to various embodiments of the techniques and apparatus disclosed herein, these problems are addressed by providing a UE with information enabling it to find the TNL (e.g. IP) address of the WT and an identifier of the UE. Using the TNL of the WT, the UE can establish a connection towards the WT (either connectionless or connection oriented) and provide the WT with the UE's identifier. The WT and eNodeB exchanges information about the UE ID and the UE is identified in both the 3GPP network and the WLAN. Once identified, user data can be sent to the UE via the WT.

Advantages of the presently disclosed techniques are that no changes to the IEEE specifications for WLAN are needed, and only a small amount of configuration is required. Further, the disclosed techniques work on WLAN where NAT (network address translation) is used.

The techniques described herein include various methods and signaling carried out at each of several nodes, including at a 3GPP network node (such as an eNB or Radio Network Controller, or RNC), a WLAN AP or AC, and a UE.

Figure 2:
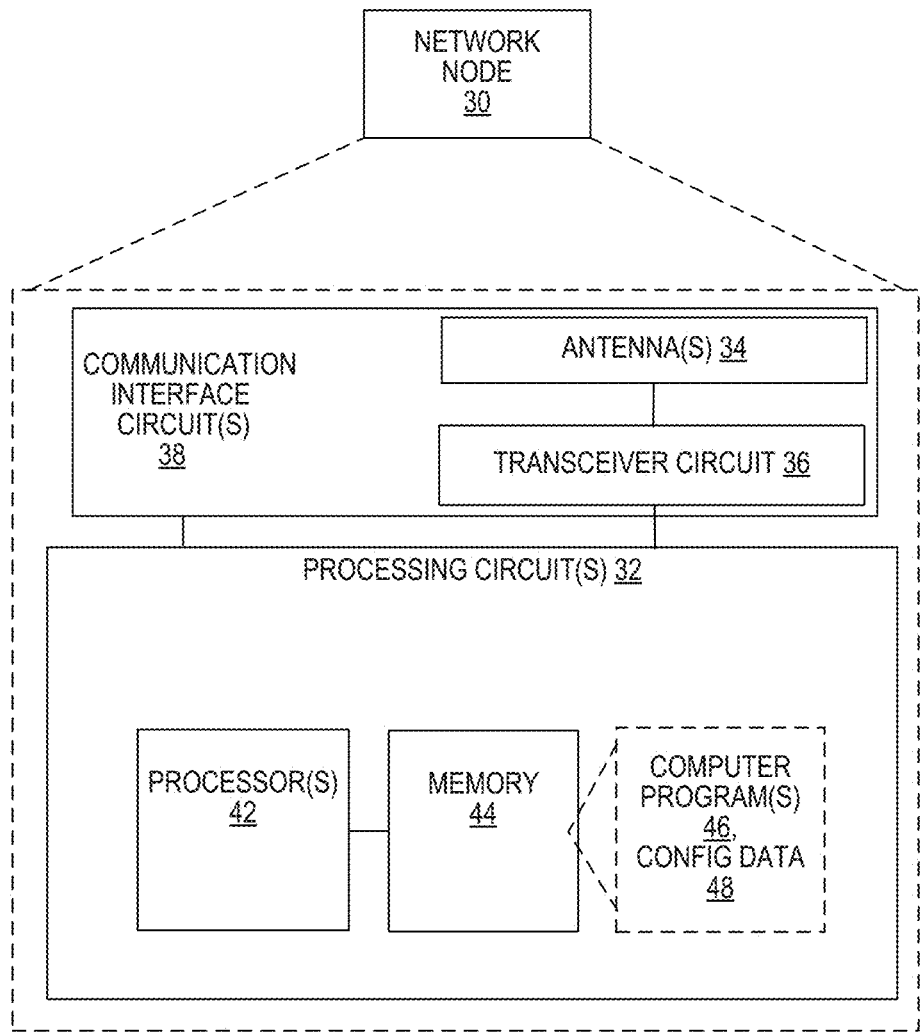
FIG. 2 illustrates a block diagram of a network node, such as a cellular network base station, a WLAN Termination or a WLAN access point, according to some embodiments.

FIG. 2 illustrates a diagram of a network node 30 that may be configured to carry out one or more of the disclosed techniques. The network node 30 can be any kind of network node that may include a network access node such as a base station, radio base station, base transceiver station, evolved Node B (eNodeB), Node B, relay node. Alternatively, the network node 30 can also be an RNC, an AP, a WLAN AP, WLAN AC, radio AP, UltraDense Network (UDN)/Software Defined Network (SDN) radio access node, Remote Radio Unit (RRU), Remote Radio Head (RRH), etc. In the non-limiting embodiments described below, the network node 30 will be described as operating as a cellular network access node, a logical node (connected to the cellular network and/or the WLAN), and an AP. It will be appreciated that each of these types of nodes will have different detailed designs, but each has components corresponding to the illustrated features of network node 30 (except that a logical node such as an WT may lack a transceiver circuit 36 and antennas 34). Those skilled in the art will readily appreciate how each type of node may be adapted to carry out one or more of the methods and signaling processes described herein, e.g., through the modification of and/or addition of appropriate program instructions for execution by processing circuits 32.

The network node 30 facilitates communication between wireless terminals, other network access nodes and/or the core network. The network node 30 includes a communication interface circuit 38 that includes circuitry for communicating with other nodes in the core network, radio nodes, and/or other types of nodes in the network for the purposes of providing data, WLAN and/or cellular communication services. In some embodiments, network node 30 uses the communication interface circuit 38 to communicate with wireless terminals, such as with antennas 34 and a transceiver circuit 36, which may be considered part of the communication interface circuit 38 for ease of discussion. The transceiver circuit 36 may include transmitter circuits, receiver circuits, and associated control circuits that are collectively configured to transmit and receive signals according to a radio access technology, for the purposes of providing WLAN and/or cellular communication services. The communication interface circuit 38 is configured to communicate with the cellular network and/or the WLAN using signals and/or interfaces that are setup between a cellular network and a WLAN.

The network node 30 also includes one or more processing circuits 32 that are operatively associated with the communication interface circuit 38. The network node 30 uses the communication interface circuit 38 to communicate with network nodes and the transceiver 36 to communicate with user equipments. For ease of discussion, the one or more processing circuits 32 are referred to hereafter as "the processing circuit 32." The processing circuit 32 comprises one or more digital processors 42, e.g., one or more microprocessors, microcontrollers, Digital Signal Processors (DSPs), Field Programmable Gate Arrays (FPGAs). Complex Programmable Logic Devices (CPLDs), Application Specific Integrated Circuits (ASICs), or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 42 may be multi-core, i.e., having two or more processor cores utilized for enhanced performance, reduced power consumption, and more efficient simultaneous processing of multiple tasks.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32. In general, the memory 44 comprises one or more types of computer-readable storage media providing non-transitory storage of the computer program 46 and any configuration data 48 used by the network access node 30. The processing circuit 32 may be configured, e.g., through the use of appropriate program code stored in memory 44, to carry out one or more of the methods and/or signaling processes detailed hereinafter.

Figure 3:
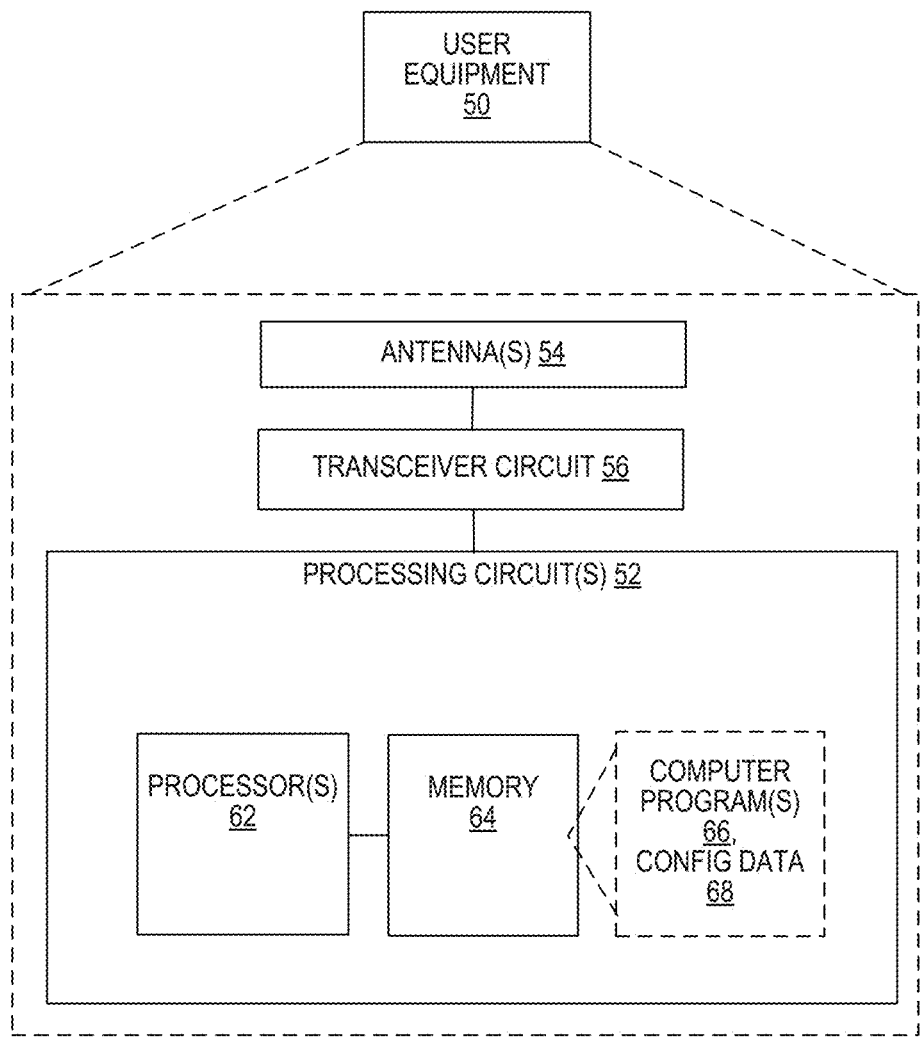
FIG. 3 illustrates a block diagram of a wireless terminal, such as a user equipment, according to some embodiments.

FIG. 3 illustrates a diagram of a wireless terminal, such as a user equipment 50, according to some embodiments, that can assist the networks in its identification in the cellular network and in the WLAN. To ease explanation, the UE 50 may be considered to represent any wireless terminals that may operate in a network, such as a UE in a cellular network or a station in a WLAN. The UE 50 herein can be any type of wireless device capable of communicating with a network node or another UE over radio signals or other interfaces. The UE 50 may also be radio communication device, target device, device to device (D2D) UE, machine type UE or UE capable of machine to machine communication (M2M), a sensor equipped with UE, PDA (personal digital assistant), Tablet, mobile terminal, smart phone, laptop embedded equipped (LEE), laptop mounted equipment (LME), USB dongles, Customer Premises Equipment (CPE), etc.

The UE 50 is configured to communicate with a radio node or base station in a wide-area cellular network and to communicate with an access point or other stations in a WLAN, via antennas 54 and a transceiver circuit 56. The transceiver circuit 56 may include transmitter circuits, receiver circuits, and associated control circuits that are collectively configured to transmit and receive signals according to a radio access technology, for the purposes of providing Wi-Fi or cellular communication services.

The UE 50 also includes one or more processing circuits 52 that are operatively associated with the radio transceiver circuit 56. The processing circuit 52 comprises one or more digital processing circuits, e.g., one or more microprocessors, microcontrollers, DSPs, FPGAs, CPLDs, ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50. The processing circuit 52 may be configured, e.g., through the use of appropriate program code stored in memory 64, to carry out one or more of the methods and/or signaling processes detailed hereinafter.

Following are details of a variety of techniques for addressing the problems discussed above. It will be appreciated that in all of the scenarios below the signaling should be adapted in consideration of whether there is network address translation (NAT) present or not in between the communicating nodes. In case NAT is present, a connection-oriented session is preferred to establish a communication channel which both nodes can communicate over. This session is kept for the duration of the required communication. It is possible to use connectionless session but it is much more cumbersome since it will require techniques such as port mapping, which then involves configuration of the NAT node.

In each of the scenarios described below, a logical node, referred to herein as a WLAN Termination or "WT", connects to one or more eNodeBs and/or RNCs. The WT is assigned at least: an identifier, here denoted WT ID, uniquely identifying the WT; and a TNL address. e.g., an IP address.

The eNodeB (or other network node communicating with the WT from the cellular network side) is assigned an identifier identifying the eNodeB in the network. The identifier needs to be unique at least among all eNodeBs connected to the same WT. This identifier is denoted eNodeB ID.

Each UE is identified by a UE ID, which may be an already existing parameter or an ID created for the purposes of carrying out the techniques described herein, in various embodiments. At least partly depending on the origin of the UE ID, there may be a number of starting conditions with respect to the knowledge of the UE ID among the involved nodes:

UE ID start condition 1: UE ID is known in the eNodeB and in the UE (e.g., retrieved from a database); or UE ID start condition 2: UE ID is assigned in the eNodeB (could be a random number unique in the eNodeB or a number carrying some additional information); or UE ID start condition 3: UE ID is known in the UE only (e.g., UE MAC address).

Independent of the UE ID type the general starting conditions for the scenarios described herein are additionally described by the bullets below:

the WT has been assigned a WT ID;
the eNodeB has been assigned an eNodeB ID;
the WT knows the eNodeB ID, either by pre-configuration or by receiving this information over an interface (e.g., the Xw interface);
the eNodeB knows the WT ID, either by pre-configuration or by receiving this information over an interface (e.g., the Xw interface);
the UE is in a mode which allows the eNodeB (base station) to transfer information to the UE;
a DNS contains the mapping of the WT ID to the TNL address (e.g., an IP address) of the WT. Within the context of this document, the DNS could be located in the UE as a simple table mapping the WT ID to an TNL Address (e.g. IP Address);
the UE has a connection to WLAN, allowing it to send and receive data over WLAN;
the UE knows how to contact the DNS server or how to otherwise access the DNS; and/or
the UE knows that it shall set up a WLAN link for communication.

eNodeB-Centric UE Matching

A first group of embodiments of the presently disclosed techniques may be understood as being "eNodeB-centric." In this document, eNodeB-centric UE matching means that the eNodeB is the node receiving the UE identifiers hence identifies the UE in both networks. It will be appreciated that some other network node in a wide-area cellular network may play the same or similar role to that ascribed to the eNodeB in the detailed scenarios that follow. It will also be appreciated that the functionality ascribed to the eNodeB herein may also be carried out by a combination of two or more cooperating nodes, in some embodiments.

Figure 4:
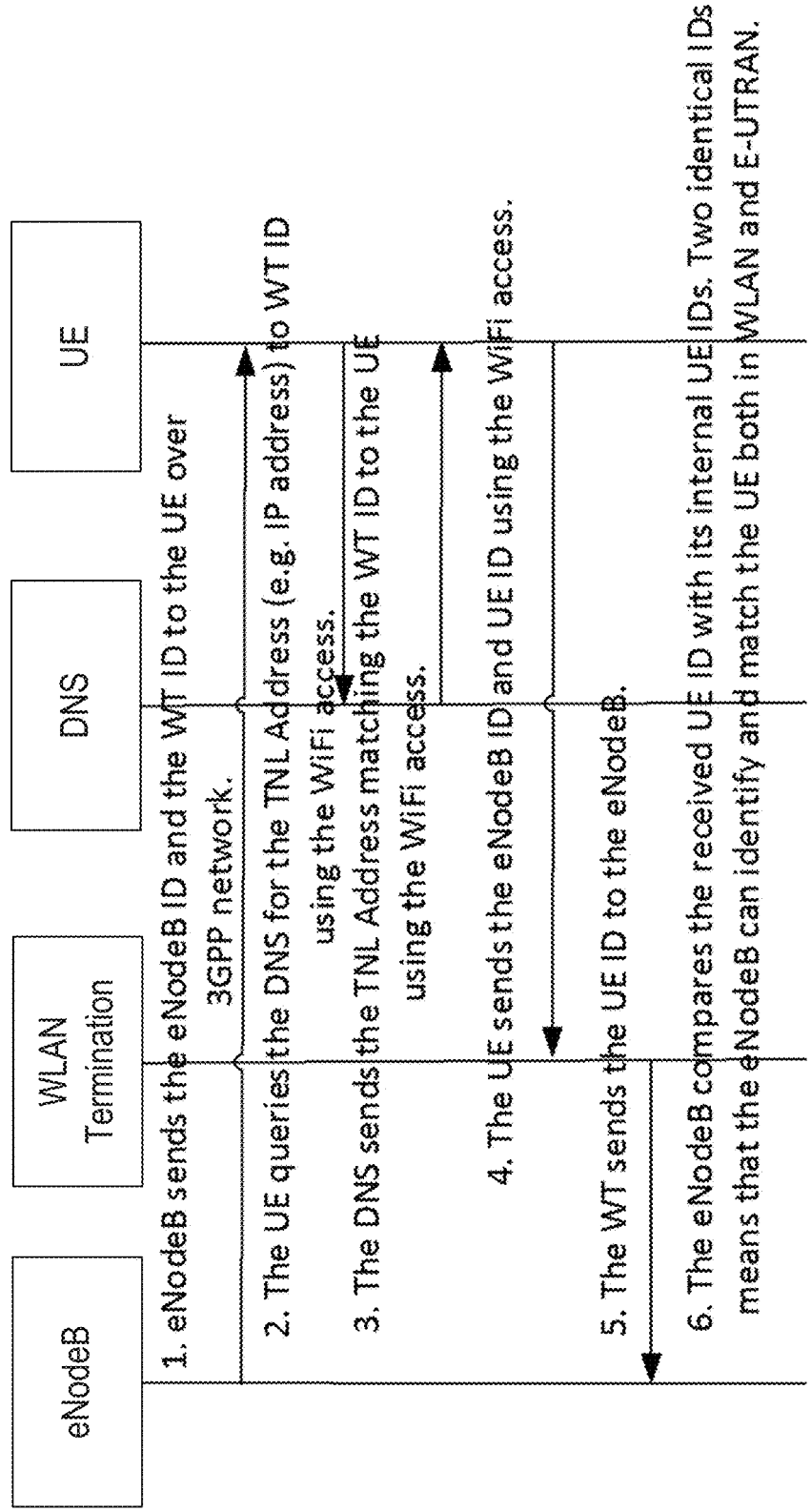
FIG. 4 illustrates a method of identifying a UE in a WLAN, according to some embodiments.

According to a first use case, the UE ID is known in the eNodeB and in the UE (UE ID start condition 1). FIG. 4 shows the information transferred between the network elements. These signaling operations are detailed below:

The eNodeB sends the WT ID and the eNodeB ID (the eNodeB ID does not need to be sent if already available in the UE) over radio to the UE. In LTE, the WT ID would be sent in connected mode using the Radio Resource Control (RRC) protocol, for example. The eNodeB ID would normally be known by the UE from reading the system information info (SystemInformationBlockType1) which contains the cell id which contains the cell identity. The cell identity is a 28-bit sequence which in combination with the primary PLMN in the cell provides a globally unique cell identifier. From this information, a globally unique eNodeB identifier can be obtained by removing the 8 bits in the cell identity specifying the cell.

If a TNL address to the WT identified by the WT ID is not available in the UE, the UE needs to find this address. This can be done by asking a database containing this information. The database may be a DNS server. The name of the WT in, for instance a DNS server, may be selected in an already existing set of WT names in the UE where the WT ID is an index indicating the correct one. In a solution where the WT ID is the TNL address for the WT, then step 2 and 3 are not needed.

The DNS returns the WT TNL address matching the WT ID to the UE.

The UE sends the eNodeB ID, UE ID and its own TNL address to the WT, with the WT TNL address received in step 3. The UE will provide enough information so the WT can reply back with responses or additional actions.

The WT sends the UE ID to the eNodeB identified by the eNodeB ID.

The eNodeB compares the received UE ID with its internal UE IDs. Two identical IDs means that the eNodeB can identify and match the UE both in WLAN and E-UTRAN. The eNodeB can send and receive data to the UE via the WT which knows the UE TNL address. Note that the UE TNL address may be used to reach the UE, but if there is an NAT in between the UE and the WT, the TNL address the WT sends the data towards may be different than the UE TNL address.

Accordingly, in an embodiment corresponding to FIG. 4, the network access node 30 (e.g., eNodeB) of a wide-area cellular network is associated with a node ID and configured to communicate with a wireless terminal that is associated with a wireless terminal ID and configured for operation in the cellular network and in a WLAN. The network access node 30 includes a communication interface circuit 38 configured to send and receive communications in the cellular network and in the WLAN and a processing circuit 32. The processing circuit 32 is configured to send, to the wireless terminal via the cellular network, a logical node ID associated with a logical node that is operatively connected to the cellular network and the WLAN and receive, from the logical node, the wireless terminal ID of the wireless terminal via the WLAN. The processing circuit 32 is also configured to compare the received wireless terminal ID with stored wireless terminal IDs and, responsive to a match of the received wireless terminal ID and one of the stored wireless terminal IDs, identify the wireless terminal in both the WLAN and the cellular network.

Figure 5:
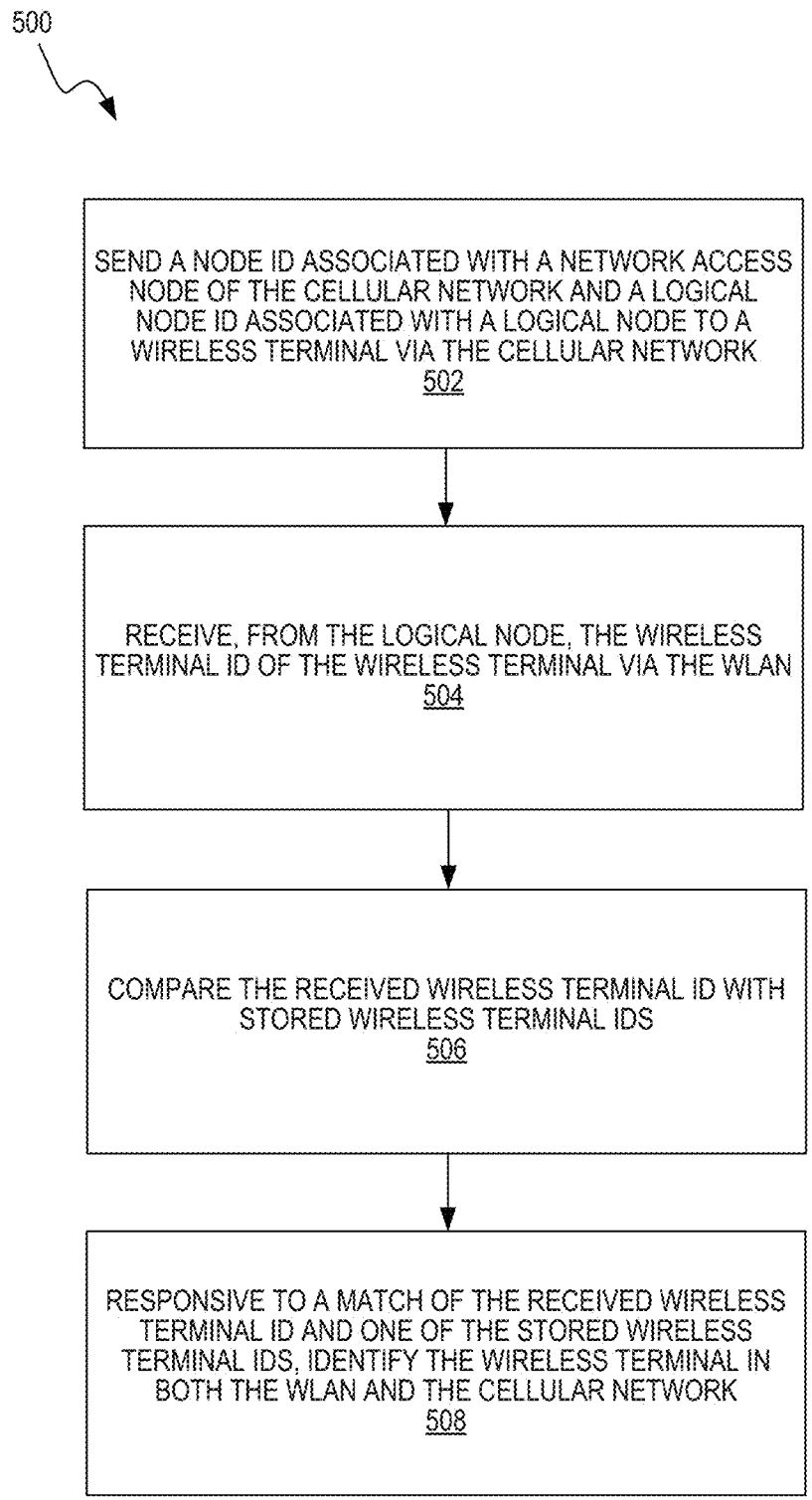
FIG. 5 is a process flow diagram illustrating a method according to some embodiments.
Figure 6:
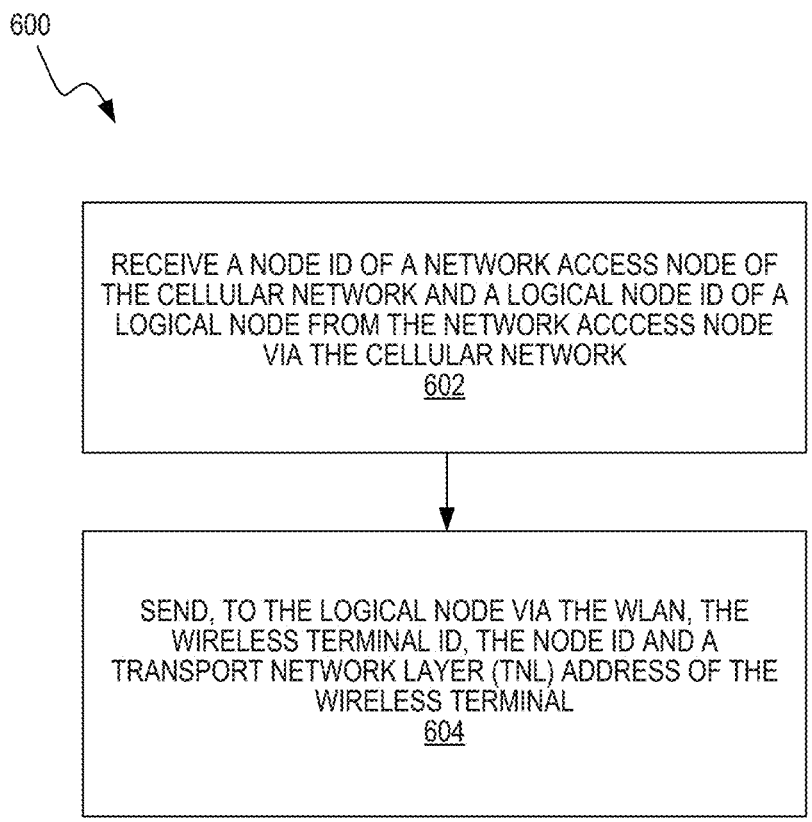
FIG. 6 is a process flow diagram illustrating another method according to some embodiments.
Figure 7:
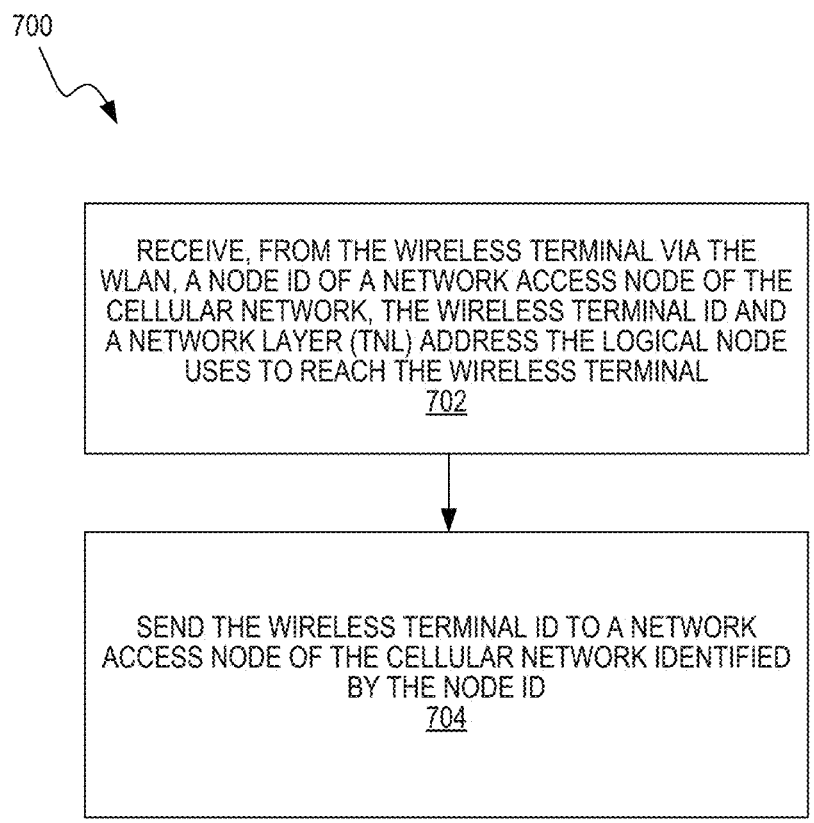
FIG. 7 is a process flow diagram illustrating still another method according to some embodiments.

The process flow diagrams of FIGS. 5-7 correspond to the detailed explanation of the signaling flow in FIG. 4, as provided above. FIG. 5 shows a process flow diagram illustrating example method 500 carried out by the network access node 30 (e.g., eNodeB or, more generally, a network node in a wide-area cellular network). The method 500 includes sending, to the wireless terminal via the cellular network, a logical node ID associated with a logical node that is operatively connected to the cellular network and the WLAN (block 502) and receiving, from the logical node, the wireless terminal ID of the wireless terminal via the WLAN (block 504). The method 500 also includes comparing the received wireless terminal ID with stored wireless terminal IDs (block 506) and, responsive to a match of the received wireless terminal ID and one of the stored wireless terminal IDs, identifying the wireless terminal in both the WLAN and the cellular network (block 508).

The method 500 may include sending the node ID to the wireless terminal, sending data to the wireless terminal (50) via the logical node and/or sending the wireless terminal ID to the wireless terminal (50) via the cellular network.

In some cases, the wireless terminal ID is a first wireless terminal ID and the method 500 further includes receiving a second wireless terminal ID associated with the wireless terminal from the wireless terminal via the cellular network. The comparing includes comparing the second wireless terminal ID received from the wireless terminal with the stored wireless terminal IDs, and the identifying includes identifying the wireless terminal in both the WLAN and the cellular network responsive to an association of the received wireless terminal ID with one of the stored wireless terminal IDs.

According to the same group of embodiments, a wireless terminal 50 of a wide-area cellular network is associated with a wireless terminal ID and configured for operation in the wide-area cellular network and in a WLAN. The wireless terminal 50 includes a transceiver circuit 56 configured to send and receive communications in the cellular network and in the WLAN and a processing circuit 52. The processing circuit 32 is configured to receive, from a network access node 30 of the cellular network via the cellular network, a node ID of the network access node 30 and a logical node ID of a logical node that is operatively connected to the cellular network and the WLAN. The processing circuit 32 is also configured to send, to the logical node via the WLAN, the wireless terminal ID and a TNL address of the wireless terminal 50. Again, in the case where there is an NAT between the UE and the WT, the TNL address of the wireless terminal may be changed to something else.

Likewise, FIG. 6 shows a process flow diagram illustrating example method 600 carried out by the wireless terminal 50 (e.g., a 3GPP UE capable of WLAN operation). The method 600 includes receiving, from a network access node of the cellular network via the cellular network, a node ID of the network access node and a logical node ID of a logical node that is operatively connected to the cellular network and the WLAN (block 602) and sending, to the logical node via the WLAN, the wireless terminal ID and a TNL address of the wireless terminal (block 604). The method 600 may include requesting a TNL address of the logical node from a domain name system (DNS) or database, receiving the TNL address of the logical node and using the TNL address to send the wireless terminal ID to the logical node.

The method 600 may include sending the node ID to the logical node via the WLAN, which may include using the TNL address to send the node ID to the logical node. The method 600 may also include receiving the wireless terminal ID from the network access node via the cellular network and/or sending the wireless terminal ID to the network access node via the WLAN.

According to the same group of embodiments, a logical node (now identified as logical node 30) is associated with a logical node ID and configured to communicate with a wireless terminal that is associated with a wireless terminal ID and configured for operation in a wide-area cellular network and in a WLAN. The logical node 30 includes a communication interface circuit 38 configured to send and receive communications in the cellular network and in the WLAN and a processing circuit 32. The processing circuit 32 is configured to receive, from the wireless terminal via the WLAN via the communication interface circuit 38, the wireless terminal ID and a TNL address the logical node 30 uses to reach the wireless terminal. The processing circuit 32 is also configured to send the wireless terminal ID to a network access node of the cellular network identified by a node ID of the network access node via the communication interface circuit 38.

Likewise, FIG. 7 shows a process flow diagram illustrating example method 700 carried out by the logical node 30 (e.g., WT or, more generally, a logical node having connections to both the wide-area cellular network and the WLAN). Method 700 includes receiving, from the wireless terminal via the WLAN, the wireless terminal ID and a TNL address the logical node uses to reach the wireless terminal (block 702) and sending the wireless terminal ID to a network access node of the cellular network identified by a node ID of the network access node (block 704). The method 700 may include sending and receiving data between the network access node and the wireless terminal.

Figure 8:
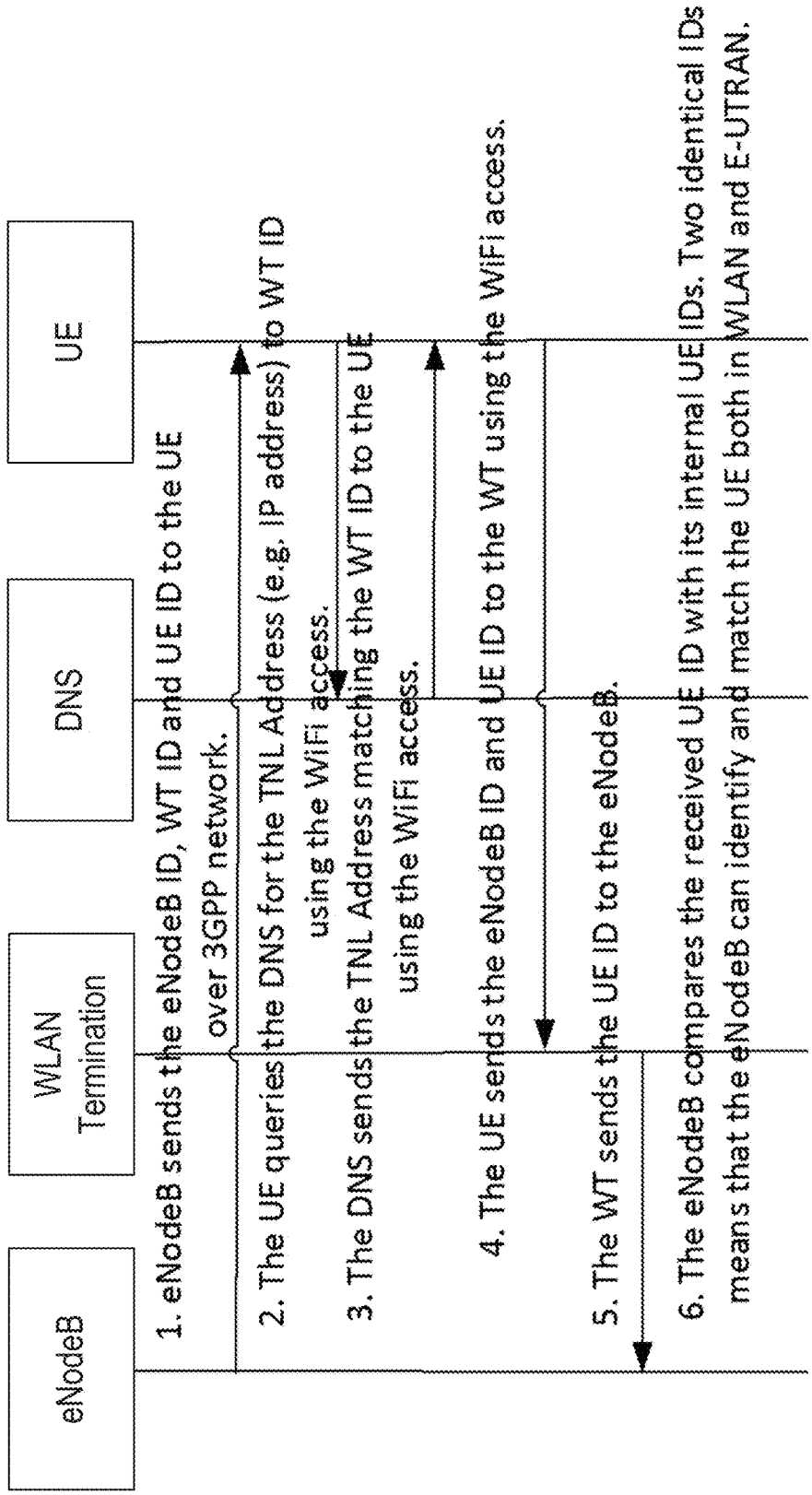
FIGS. 8, 9, and 10 are signal flow diagrams illustrating embodiments of the presently disclosed techniques.

FIG. 8 is a signaling flow diagram illustrating an example eNodeB-centric solution corresponding to the UE starting condition 2. The difference in UE ID start condition 2, compared to UE ID start condition 1, is that the UE ID is transferred to the UE from the eNodeB. The information transfer between the nodes given this starting condition is provided in FIG. 8.

Figure 9:
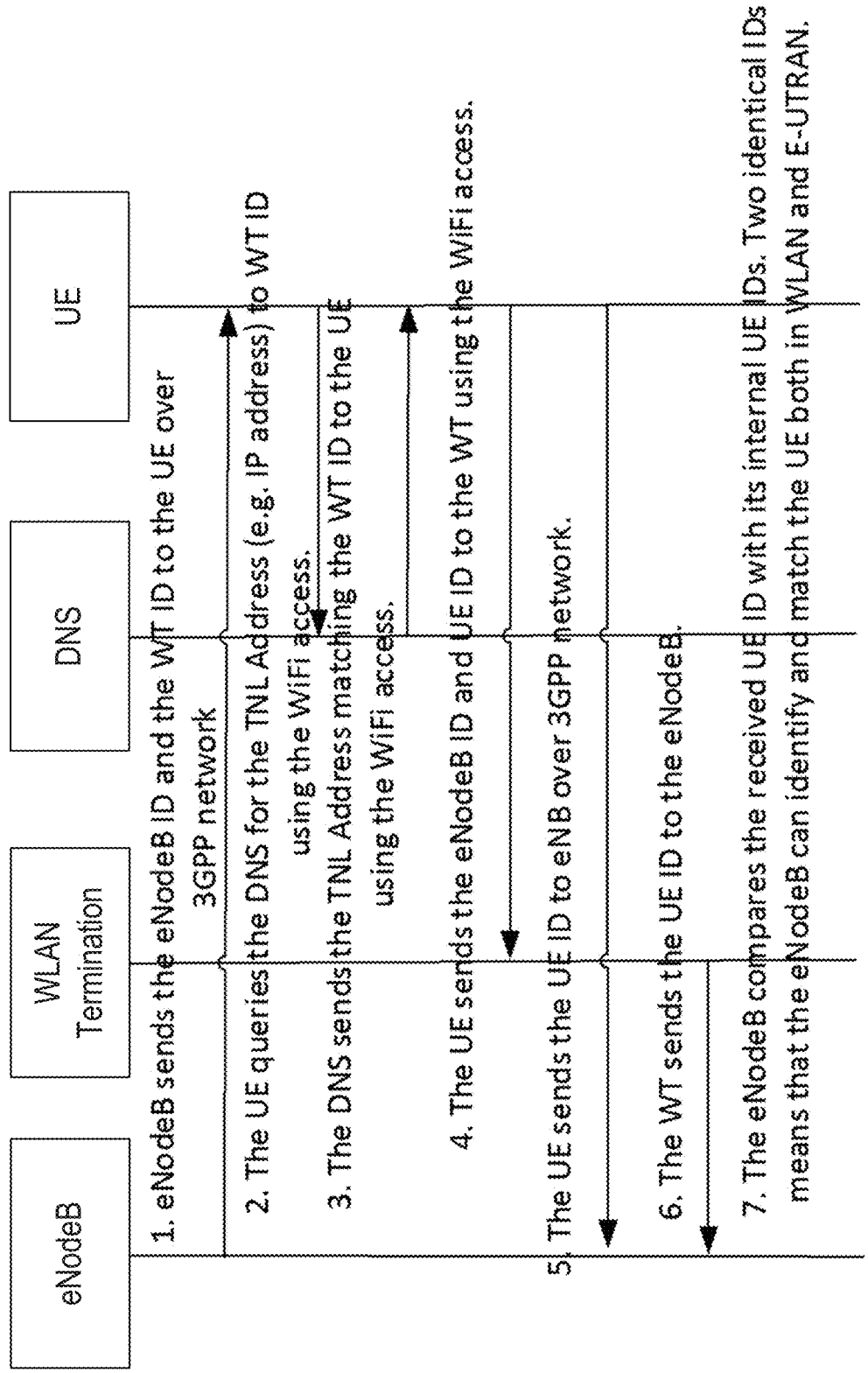

The difference in UE ID start condition 3 compared to UE ID start condition 1 is that the UE ID is transferred from the UE to the eNodeB. The information transfer between the nodes is shown in the signaling flow diagram shown in FIG. 9. Note that the transfer of the UE ID from the UE to the eNodeB can be done first or last in the sequence. One possibility is to always transfer the UE ID from the UE at connection setup, which means that step 6 would be performed before step 1.

WT-Centric UE Matching

A second group of embodiments of the presently disclosed techniques may be understood as being "WT-centric." In this document, WT-centric UE matching means that the WT is the node receiving the UE identifiers and which thus identifies the UE in both networks.

Figure 10:
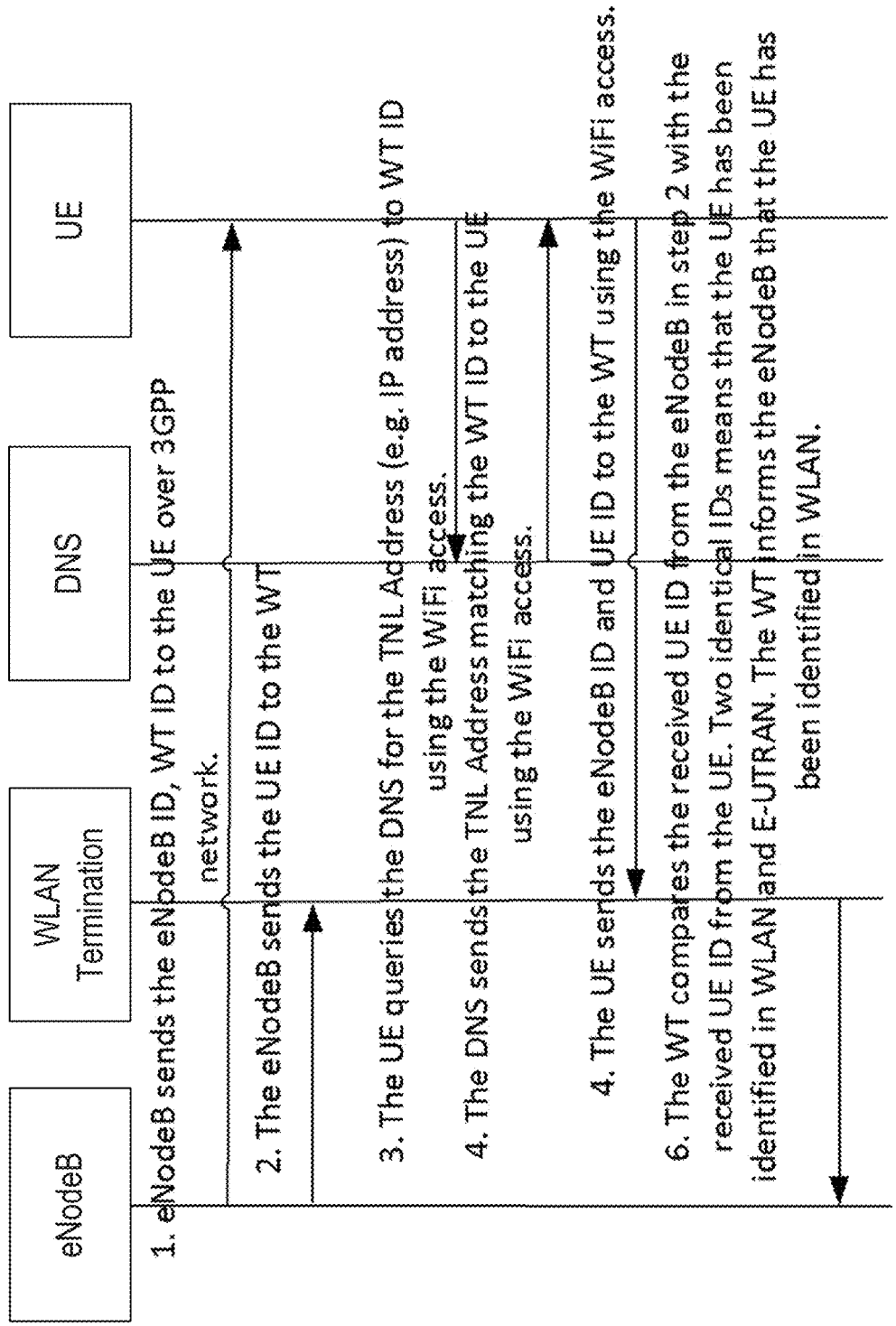

According to a first use case, the UE ID is known in the eNodeB and in the UE. This corresponds to the UE ID start condition 1 discussed above. The example signal flow diagram of FIG. 10 shows the information transferred between the network elements for this scenario. The steps in the figure are detailed below:

The eNodeB sends the WT ID and the eNodeB ID (the eNodeB ID does not need to be sent if already available in the UE) over radio to the UE. The eNodeB ID would normally be known by the UE from reading the system information info (SystemInformationBlockType1), which contains the cell id which contains the cell identity. The cell identity is a 28-bit sequence which in combination with the primary public land mobile network (PLMN) in the cell provides a globally unique cell identifier. From this information, a globally unique eNodeB identifier can be obtained by removing the 8 bits in the cell identity specifying the cell.

The eNodeB sends the UE ID to the WT.

If a TNL address to the WT identified by the WT ID is not available in the UE, the UE needs to find this address which can be done by asking a database containing this information. The database may be a DNS server. The name of the WT in for instance a DNS server may be selected in an already existing set of WT names in the UE where the WT ID is an index pointing to the correct one. In a solution where the WT ID is the TNL Address to the WT step 3 and 4 are not needed.

The DNS returns the WT TNL address matching the WT ID to the UE.

The UE sends the eNodeB ID, UE ID and its own TNL address towards the WT with the WT TNL address received in step 4. The UE will provide enough information so the WT can reply back with responses or additional actions.

The WT checks the eNodeB ID and compares received UE IDs (step 2) to check if the eNodeB is waiting for a response from this UE. If the eNodeB is not waiting for the received UE ID the WT discards the information. If the eNodeB is waiting for the UE ID, the WT understands that a successful match has been made. The WT then informs the eNodeB that the UE identified by the UE ID received in step 1 has been identified.

At this point, the eNodeB can send and receive data to the UE via the WT, which knows the UE TNL address to use.

Accordingly, in an embodiment corresponding to FIG. 10, the processing circuit 32 of the network access node 30 is configured to send, via the communication interface circuit 38, the wireless terminal ID to a logical node that is operatively connected to the wide-area cellular network and the WLAN and receive, via the communication interface circuit 38, an indication from the logical node that the wireless terminal has been identified in the WLAN.

Figure 11:
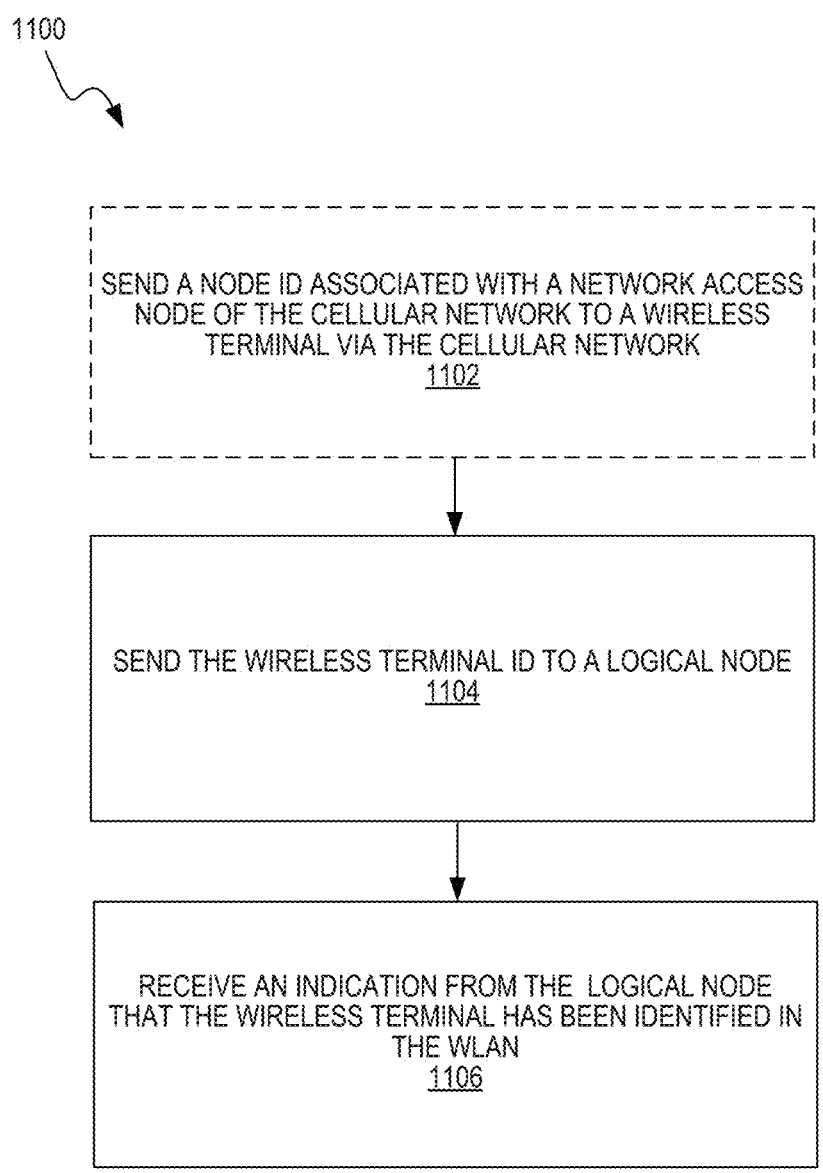
FIGS. 11 and 12 are process flow diagrams illustrating example methods.
Figure 12:
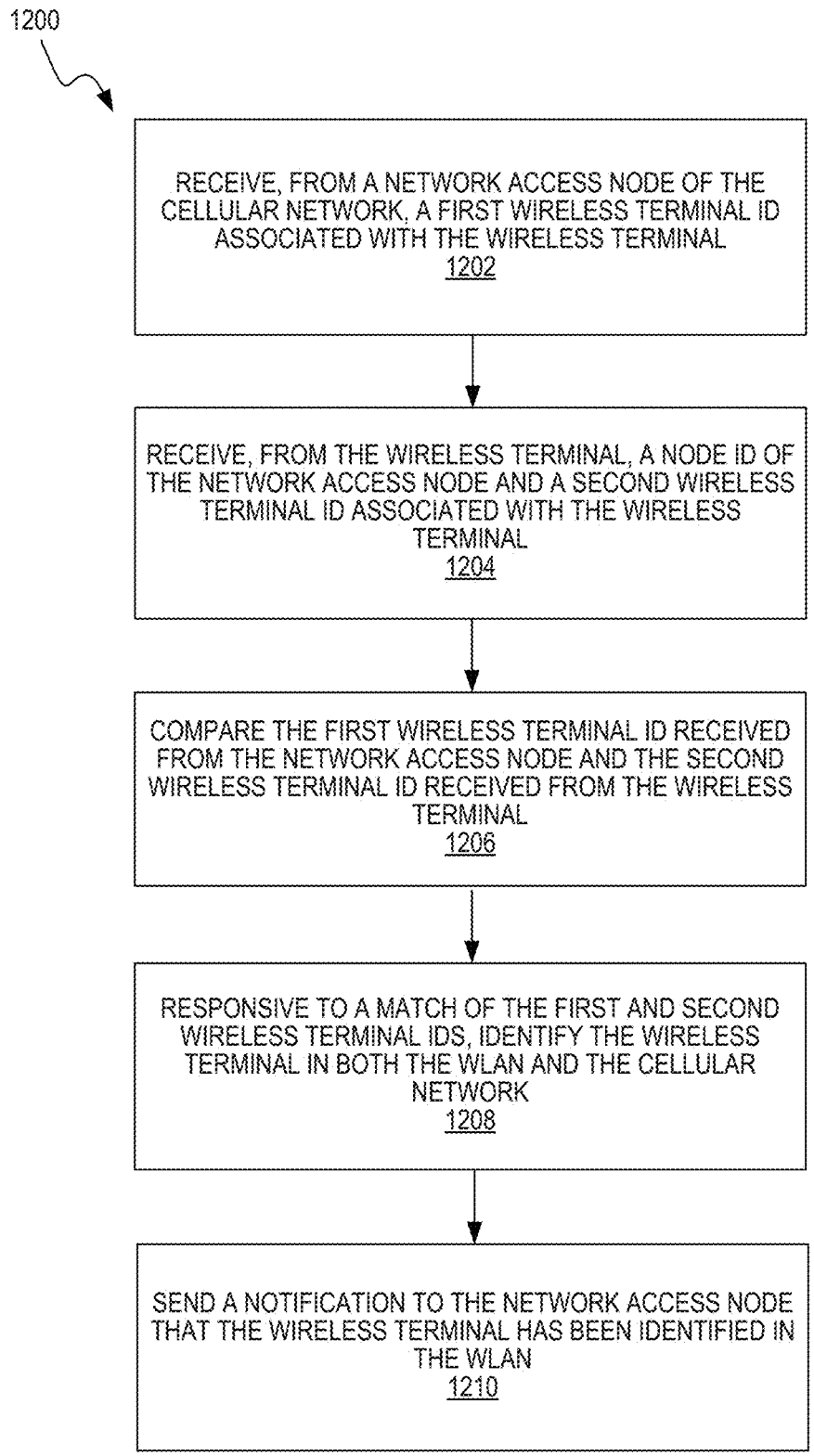

FIGS. 11 and 12 are process flow diagrams illustrating example methods 1100 and 1200 carried out by the network access node 30 and the logical node. The method 1100 includes sending the wireless terminal ID to a logical node that is operatively connected to the cellular network and to the WLAN (block 1104) and receiving an indication from the logical node that the wireless terminal has been identified in the WLAN (block 1106). The method 1100 may include sending the node ID to the wireless terminal via the cellular network (block 1102).

The method 1100 may include sending a logical node ID of the logical node to the wireless terminal via the cellular network, where the logical node ID may include a TNL address to the logical node. The method 1100 may include sending data to the wireless terminal via the logical node, sending the wireless terminal ID to the wireless terminal and/or receiving the wireless terminal ID from the wireless terminal via the cellular network.

According to the same group of embodiments, the processing circuit 32 of the logical node 30 is configured to receive, from a network access node of the cellular network via the communication interface circuit 38, a first wireless terminal ID associated with the wireless terminal and receive, from the wireless terminal via the communication interface circuit 38, a second wireless terminal ID associated with the wireless terminal. The processing circuit 32 of the logical node 30 is also configured to compare the first wireless terminal ID received from the network access node and the second wireless terminal ID received from the wireless terminal and, responsive to a match of the first and second wireless terminal IDs, identify the wireless terminal in both the WLAN and the cellular network. The processing circuit 32 of the logical node 30 is also configured to send a notification to the network access node via the communication interface circuit 38 that the wireless terminal has been identified in the WLAN.

Likewise, the method 1200 includes receiving, from a network access node of the cellular network, a first wireless terminal ID associated with the wireless terminal (block 1202) and receiving, from the wireless terminal, a second wireless terminal ID associated with the wireless terminal (block 1204). The method 1200 includes comparing the first wireless terminal ID received from the network access node and the second wireless terminal ID received from the wireless terminal (block 1206). The method 1200 also includes, responsive to a match of the first and second wireless terminal IDs, identifying the wireless terminal in both the WLAN and the cellular network (block 1208) and sending a notification to the network access node that the wireless terminal has been identified in the WLAN (block 1210).

The comparing may include determining, from the first and second wireless terminal IDs, whether the network access node is waiting for a response from the wireless terminal identified by the first and second wireless terminal IDs. The comparing may also include, responsive to a determination that the network access node is not waiting for the response, discarding the first and second wireless terminal IDs and, responsive to a determination that the network access node is waiting for the response, determining that a match has been established.

Figure 13:
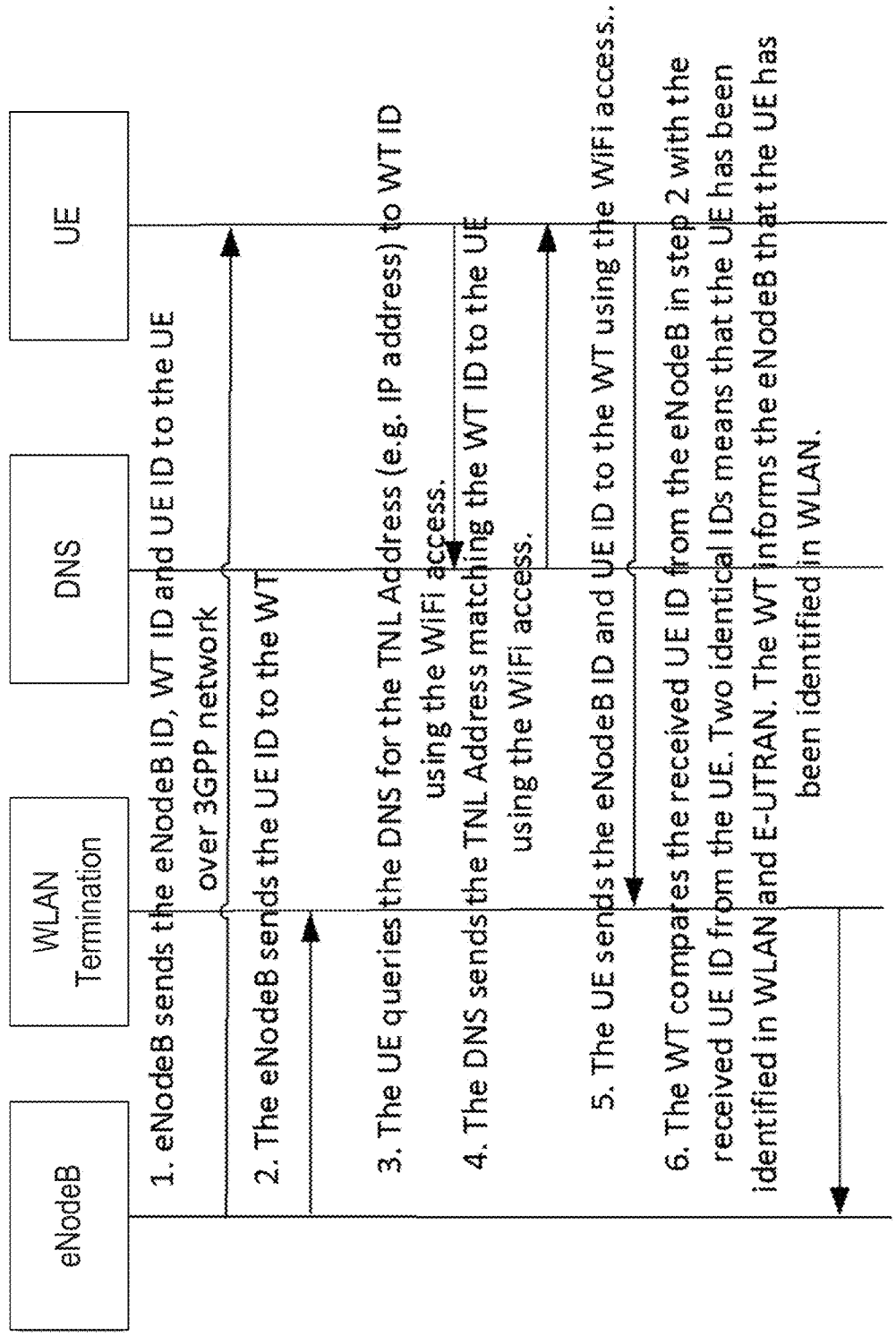
FIGS. 13 and 14 are signal flow diagrams illustrating additional embodiments of the presently disclosed techniques.

FIG. 13 is a signaling flow diagram illustrating a variant of the signaling flow of FIG. 10, for UE ID start condition 2. The difference in UE ID start condition 2 compared to UE ID start condition 1 is that the UE ID is transferred to the UE from the eNodeB.

Figure 14:
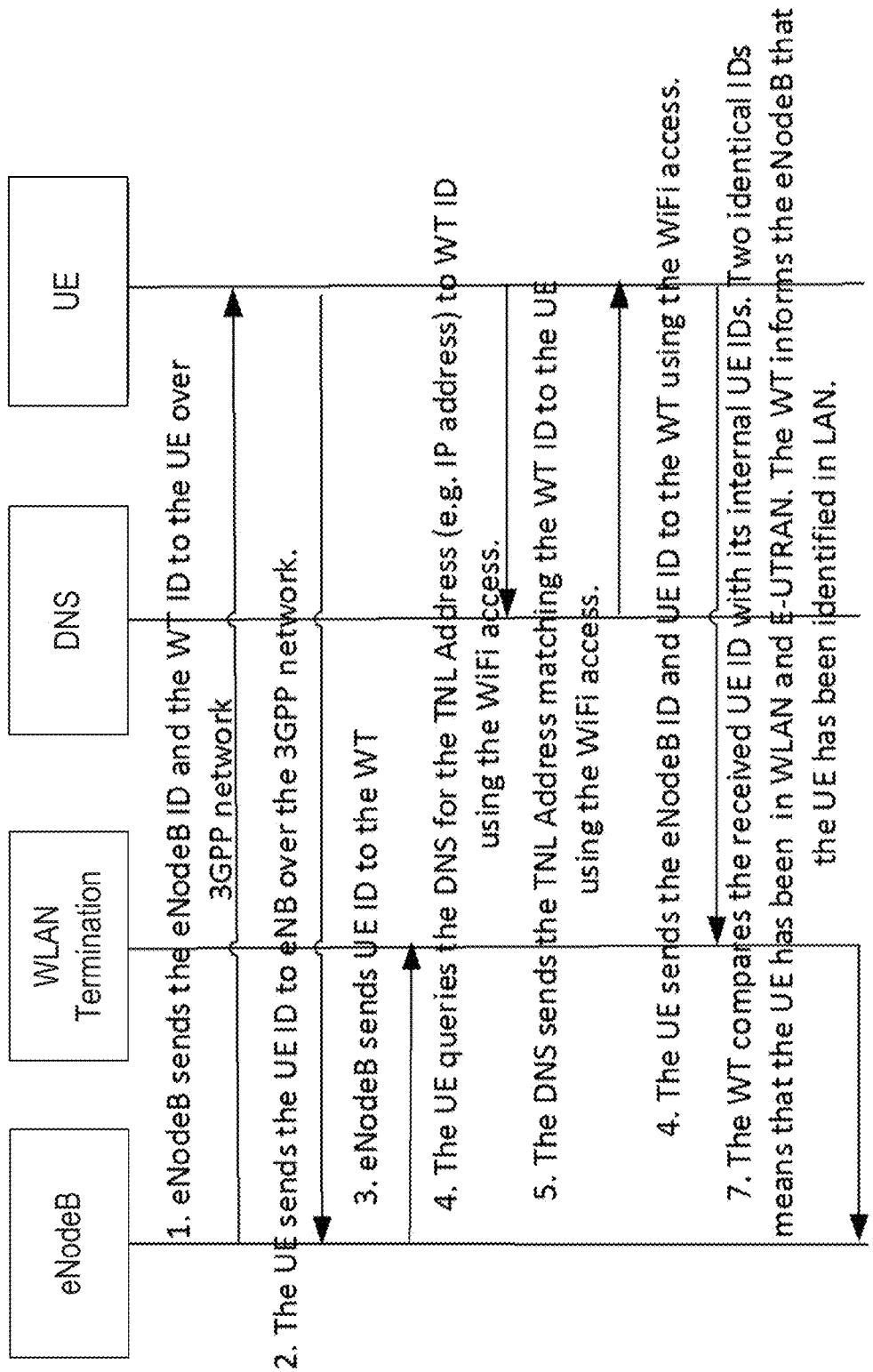

The difference in UE ID start condition 3 compared to UE ID start condition 1 is that the UE ID is transferred from the UE to the eNodeB. The information transfer between the nodes is shown in FIG. 14. Note that the precise timing of the transfer of the UE ID from the UE to the eNodeB is not important. One possibility is to always transfer the UE ID from the UE at connection setup, which means that step 6 would be performed before step 1.

Accordingly, in an embodiment, the processing circuit 32 of the logical node 30 is configured to receive, from a network access node of the cellular network via the communication interface circuit 38, a first wireless terminal ID associated with the wireless terminal and receive, from the wireless terminal via the communication interface circuit 38, a node ID of the network access node and a second wireless terminal ID associated with the wireless terminal. The processing circuit 32 of the logical node 30 is also configured to compare the first and second wireless terminal IDs and, responsive to a match of the first and second wireless terminal IDs, identify the wireless terminal in the WLAN. A notification is sent to the network access node via the communication interface circuit 38 that the wireless terminal has been identified in the WLAN.

Figure 15:
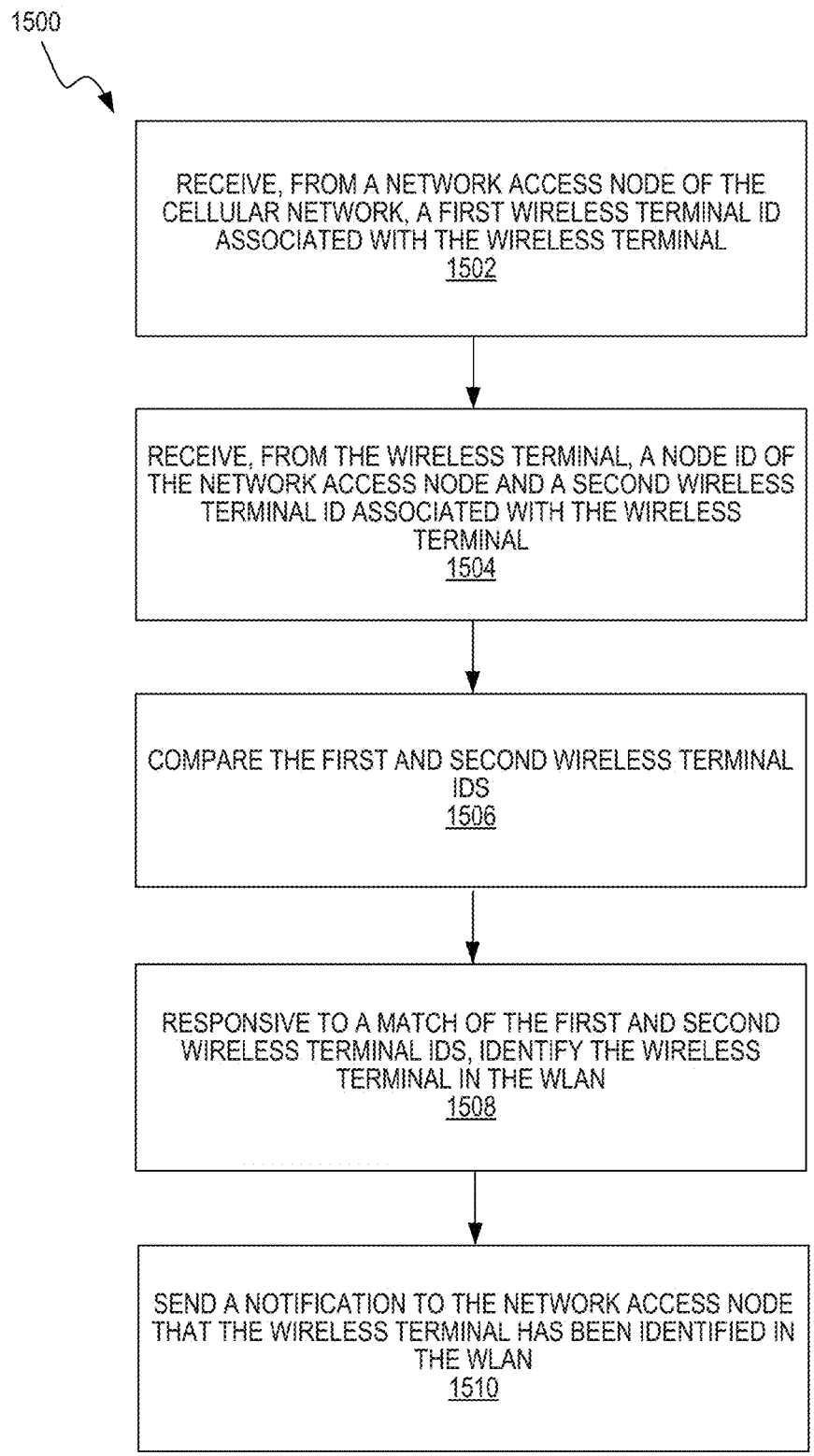
FIG. 15 is a process flow diagram illustrating another method according to some embodiments.

FIG. 15 is a process flow diagram illustrating a method 1500 carried out in the logical node (e.g., WT) corresponding to the signal flow of FIG. 14. The method 1500 includes receiving, from a network access node of the cellular network, a first wireless terminal ID associated with the wireless terminal (block 1502) and receiving, from the wireless terminal, a node ID of the network access node and a second wireless terminal ID associated with the wireless terminal (block 1504). The method 1500 also includes comparing the first and second wireless terminal IDs (block 1506) and, responsive to a match of the first and second wireless terminal IDs, identifying the wireless terminal in the WLAN (block 1508). The method 1500 includes sending a notification to the network access node that the wireless terminal has been identified in the WLAN (block 1510).

Extreme Network Deployments with Respect to WTs

In the case that there is only one WT in the network and the UE is configured with the TNL address of the WT or sufficient information to make a DNS lookup to find the IP address (e.g., the name of the WT) the WT ID does not need to be sent over radio to the UE. In the event that a WT is connected to all eNodeBs, the UE could be configured with the names of the WT and the WT ID would not need to otherwise be provided to the UE. In the WT-centric solution, the eNodeB would provide the UE ID to all WTs, and one of the WTs would receive the UE ID and perform the connection. In the eNodeB-centralized solution, one of the WTs would provide the UE ID and the eNodeB makes the connection.

eNodeB-Centric Matching with AP Involvement

Figure 16:
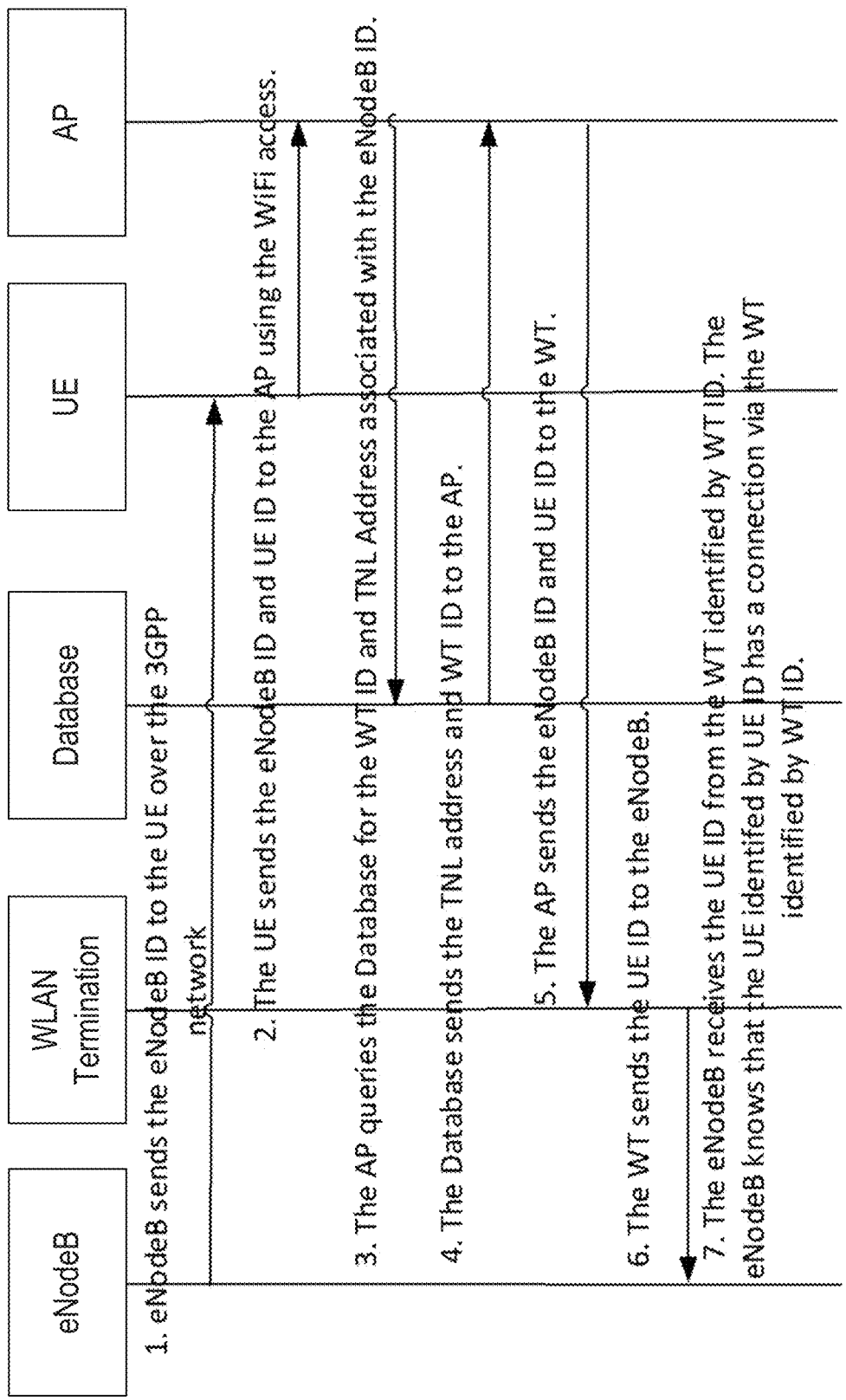
FIG. 16 is another signal flow diagram according to some embodiments.
Figure 17:
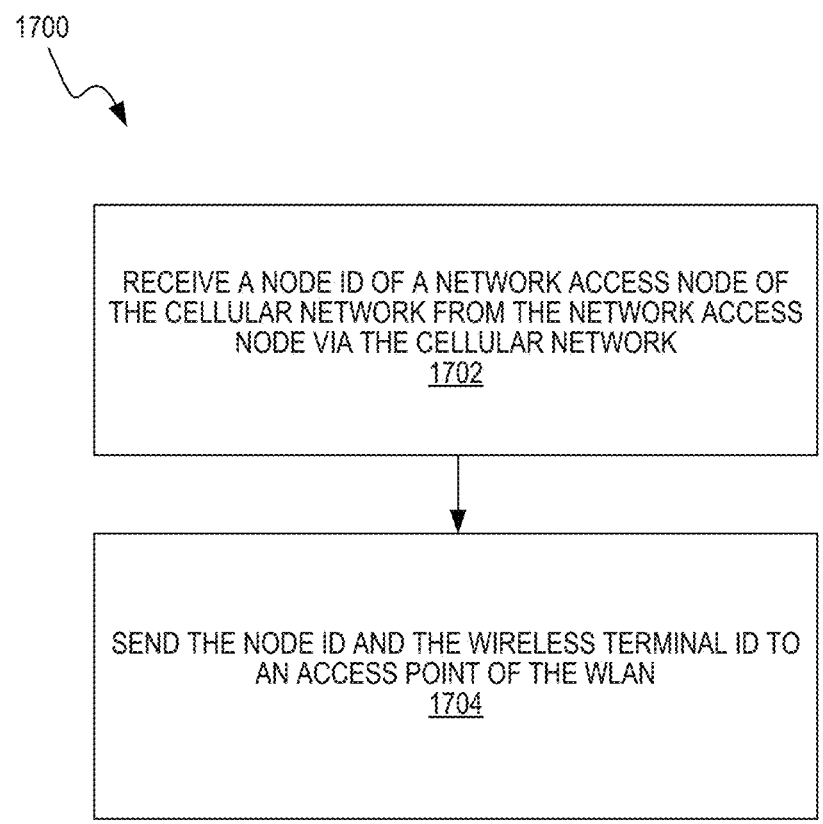
FIGS. 17, 18, 19, and 20 illustrate additional methods according to some embodiments.
Figure 18:
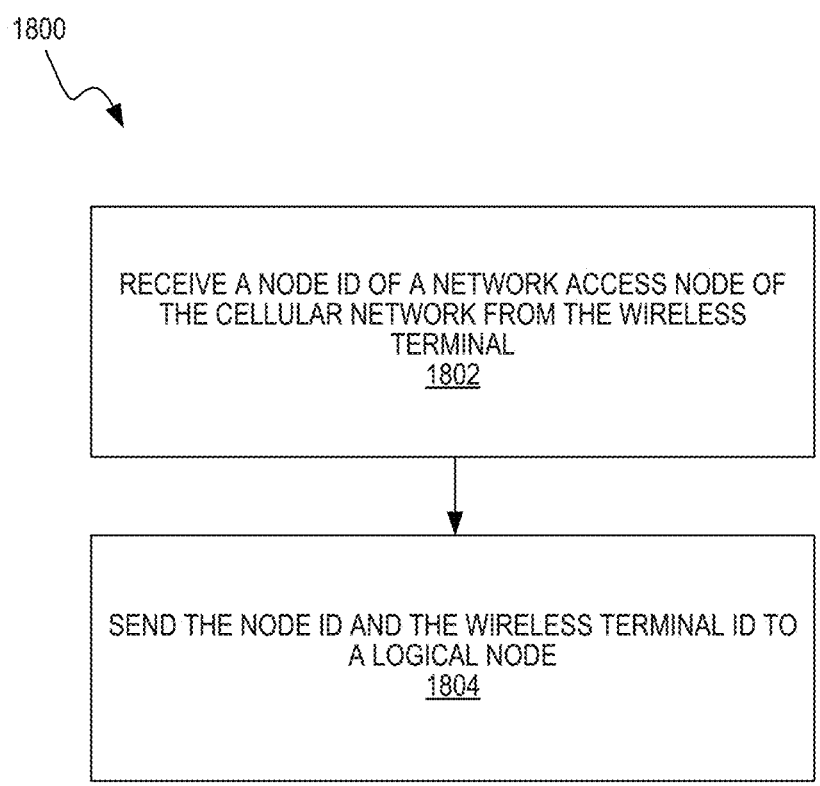
Figure 19:
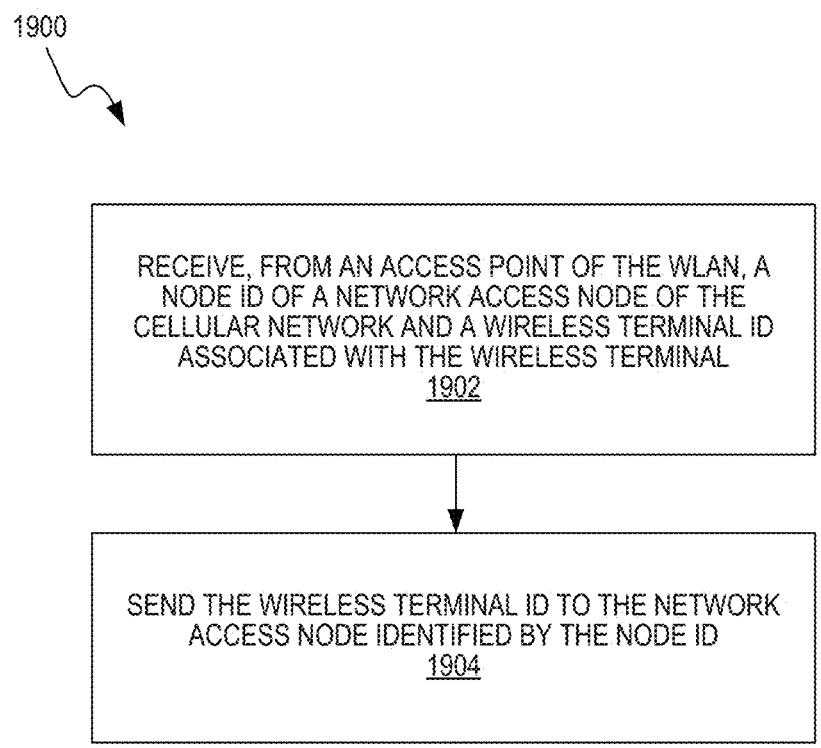
Figure 20:
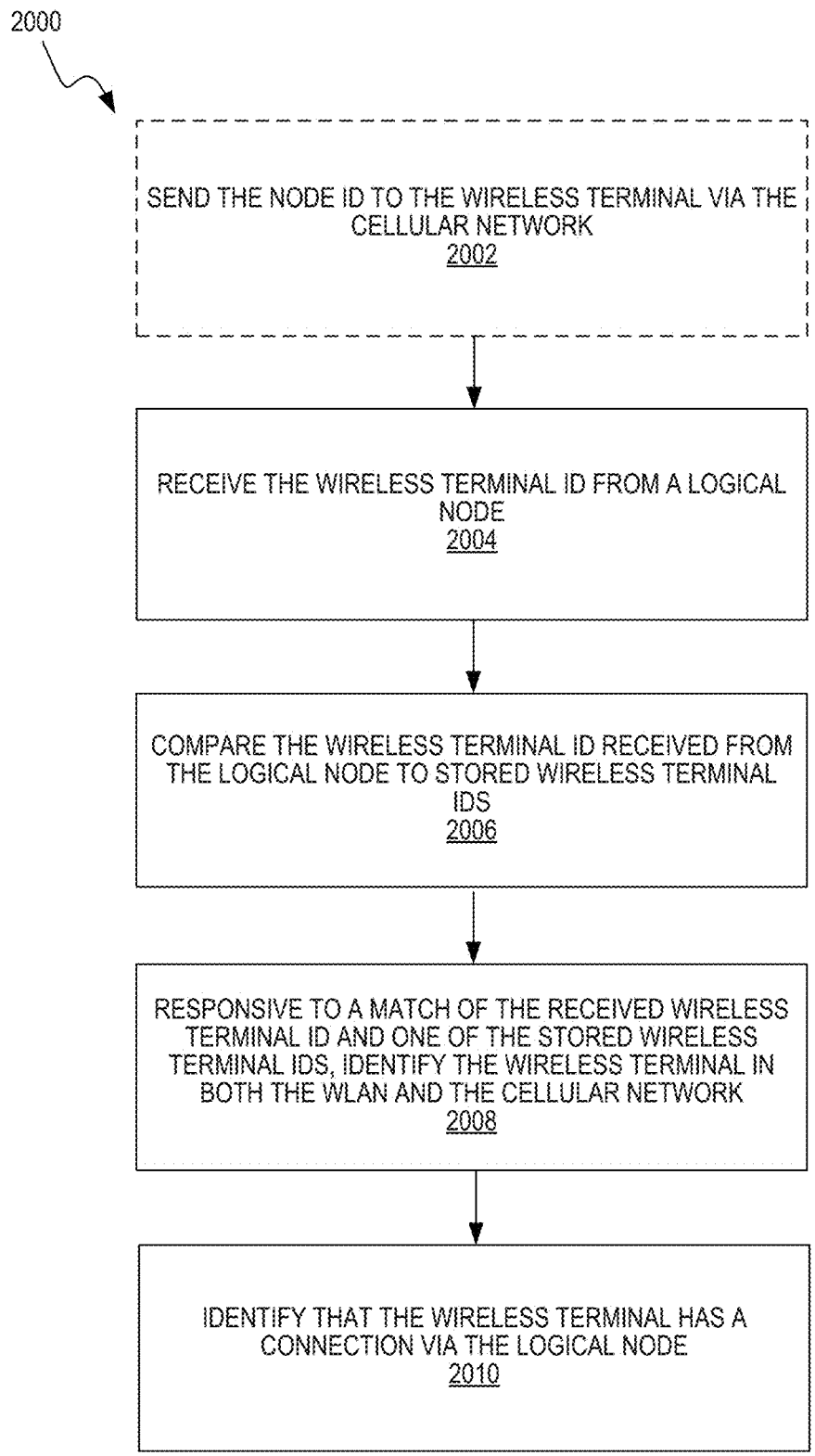

The signal flow diagram of FIG. 16 shows the information transferred between the network elements in a variation of the eNodeB-centric matching approach, where a WLAN AP is involved. The signaling steps are detailed below:

The eNodeB sends the eNodeB ID over radio to the UE. In LTE, the eNodeB ID would normally be known by the UE from reading the system information info (SystemInformationBlockType1), which contains the cell id which contains the cell identity. The cell identity is a 28-bit sequence which in combination with the primary PLMN in the cell provides a globally unique cell identifier. From this information a globally unique eNodeB identifier can be obtained by removing the 8 bits in the cell identity specifying the cell.

The UE Sends the eNodeB ID and the UE ID to the WLAN AP.

If the AP does not know which WT to contact in order to communicate with the eNodeB indicated by the eNodeB ID, it requests this information from a database. The database returns the WT ID and TNL address. In some networks there may be possible to use several WTs, hence the database may provide several pairs of WT ID and TNL addresses.

The database returns the WT ID/WT IDs and corresponding WT TNL address/WT TNL addresses.

The AP sends the UE ID and eNodeB ID to the WT indicated by the received WT TNL address. In the case of several WT TNL addresses, the eNodeB may send to all, a subset, or one WT. The AP will provide enough information so the WT can reply back with responses or additional actions.

The WT sends the UE ID to the eNodeB indicated by the eNodeB ID.

The eNodeB compares the received UE ID with its internal UE IDs. Two identical IDs means that the eNodeB can identify and match the UE both in WLAN and E-UTRAN.

At this point, the eNodeB can send and receive data to the UE via the WT, which is in contact with the AP in contact with the UE in WLAN.

Accordingly, in a group of embodiments, the processing circuit 52 of the wireless terminal 50 is configured to receive, via the transceiver circuit 56, a node ID of a network access node of the cellular network from the network access node via the cellular network and send the node ID and the wireless terminal ID to an access point of the WLAN via the transceiver circuit 56.

FIGS. 17, 18, 19, and 20 are process flow diagrams illustrating example methods 1700, 1800, 1900 and 2000 carried out by the wireless terminal 50 (e.g., a 3GPP UE), a WLAN AP, the logical node and the network access node, respectively. The method 1700 implemented by the wireless terminal 50 includes receiving a node ID of a network access node of the cellular network from the network access node via the cellular network (block 1702) and sending the node ID and the wireless terminal ID to an access point of the WLAN (block 1704).

According to the same group of embodiments, an AP (identified here as access point 30) of a WLAN is configured for communication with a wireless terminal that is associated with a wireless terminal ID and configured for operation in the WLAN and in a wide-area cellular network. The access point 30 includes a communication interface circuit 38 configured to send and receive communications in the cellular network and in the WLAN and a processing circuit 32. The processing circuit 32 of the access point 30 is configured to receive a node ID of a network access node of the cellular network and the wireless terminal ID from the wireless terminal via the communication interface circuit and send, via the communication interface circuit 38, the node ID and the wireless terminal ID to a logical node that is operatively connected to the wide-area cellular network and the WLAN.

Likewise, the method 1800 implemented by the access point 30 includes receiving a node ID of a network access node of the cellular network and the wireless terminal ID from the wireless terminal (block 1802) and sending the node ID and the wireless terminal ID to a logical node that is operatively connected to the cellular network and the WLAN (block 1804). The method 1800 may include requesting, from a database, a logical node ID of the logical node and a TNL address associated with the node ID and receiving the logical node ID and the TNL address and using the TNL address to send the node ID and the wireless terminal ID to the logical node.

According to the same group of embodiments, the processing circuit of the logical node is configured to receive, from an access point of the WLAN via the communication interface circuit, a node ID of a network access node of the cellular network and a wireless terminal ID associated with the wireless terminal and send the wireless terminal ID to the network access node identified by the node ID via the communication interface circuit.

Likewise, the method 1900 implemented by the logical node includes receiving, from an access point of the WLAN, a node ID of a network access node of the cellular network and a wireless terminal ID associated with the wireless terminal (block 1902) and sending the wireless terminal ID to the network access node identified by the node ID (block 1904).

According to the same group of embodiments, the processing circuit of the network access node is configured to receive, via the communication interface circuit, the wireless terminal ID from a logical node that is operatively connected to the wide-area cellular network and the WLAN and compare the wireless terminal ID received from the logical node to stored wireless terminal IDs. The processing circuit of the network access node is also configured to, responsive to a match of the received wireless terminal ID and one of the stored wireless terminal IDs, identify the wireless terminal in both the WLAN and the cellular network and identify that the wireless terminal has a connection via the logical node.

Likewise, the method 2000 implemented by the network access node includes receiving the wireless terminal ID from a logical node that is operatively connected to the cellular network and the WLAN (block 2004) and comparing the wireless terminal ID received from the logical node to stored wireless terminal IDs (block 2006). The method 2000 also includes, responsive to a match of the received wireless terminal ID and one of the stored wireless terminal IDs, identifying the wireless terminal in both the WLAN and the cellular network (block 2008) and identifying that the wireless terminal has a connection via the logical node (block 2010). The method 2000 may include sending the node ID to the wireless terminal via the cellular network (block 2002) and/or sending the wireless terminal ID to the wireless terminal.

Figure 21:
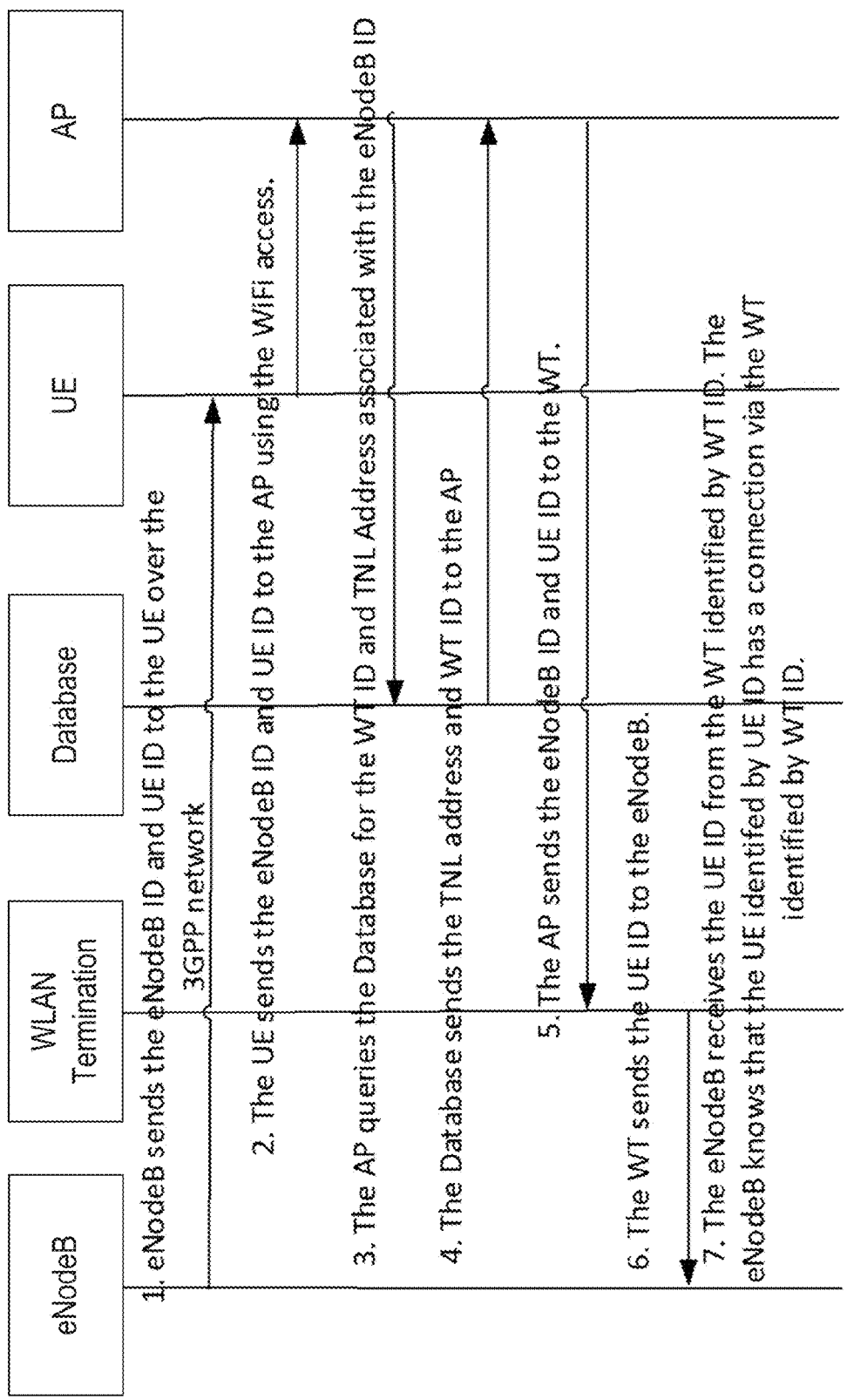
FIGS. 21 and 22 are additional signal flow diagrams according to some embodiments.

As noted above, the difference in UE ID start condition 2, compared to UE ID start condition 1, is that the UE ID is transferred to the UE from the eNodeB. An example information transfer between the nodes for this starting condition, but otherwise corresponding to the signaling flow of FIG. 16, is provided in FIG. 21.

Figure 22:
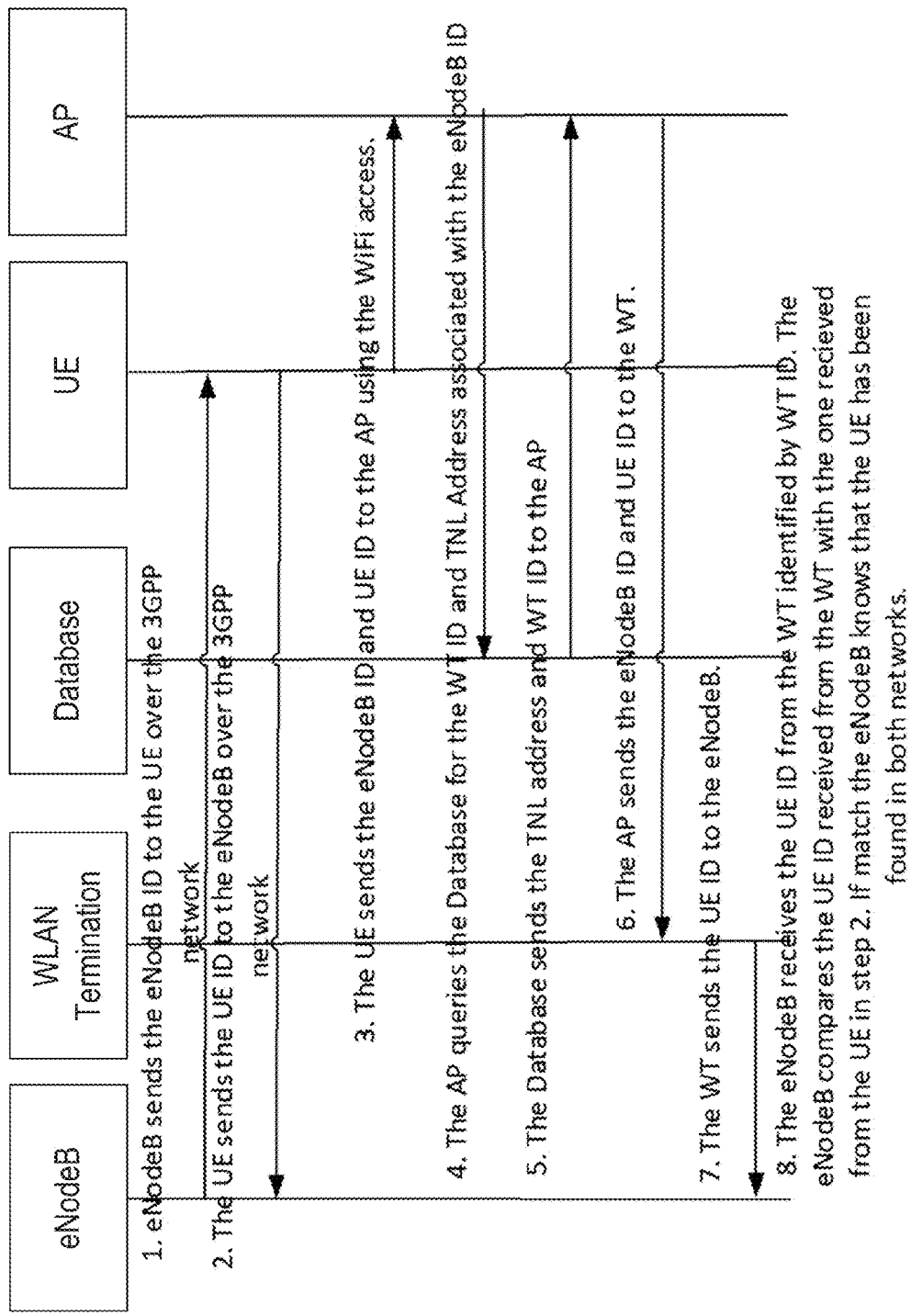

The difference in UE ID start condition 3, compared to UE ID start condition 1, is that the UE ID is transferred from the UE to the eNodeB. The information transfer between the nodes for this start condition is shown in FIG. 22. Exactly when in the sequence the transfer of the UE ID from the UE to the eNodeB is done may not be important.

Accordingly, in an embodiment, the processing circuit 32 of the network access node 30 is configured to send a node ID associated with the network access node 30 to the wireless terminal via the cellular network and receive, via the communication interface circuit 38, the first wireless terminal ID from the wireless terminal 50 via the cellular network. The processing circuit 32 of the network access node 30 is also configured to receive, via the communication interface circuit 38, a second wireless terminal ID of the wireless terminal from a logical node that is operatively connected to the wide-area cellular network and the WLAN, compare the first wireless terminal ID received from the wireless terminal and the second wireless terminal ID received from the logical node, and, responsive to a match of the first and second wireless terminal IDs, identify the wireless terminal in both the WLAN and the cellular network.

Figure 23:
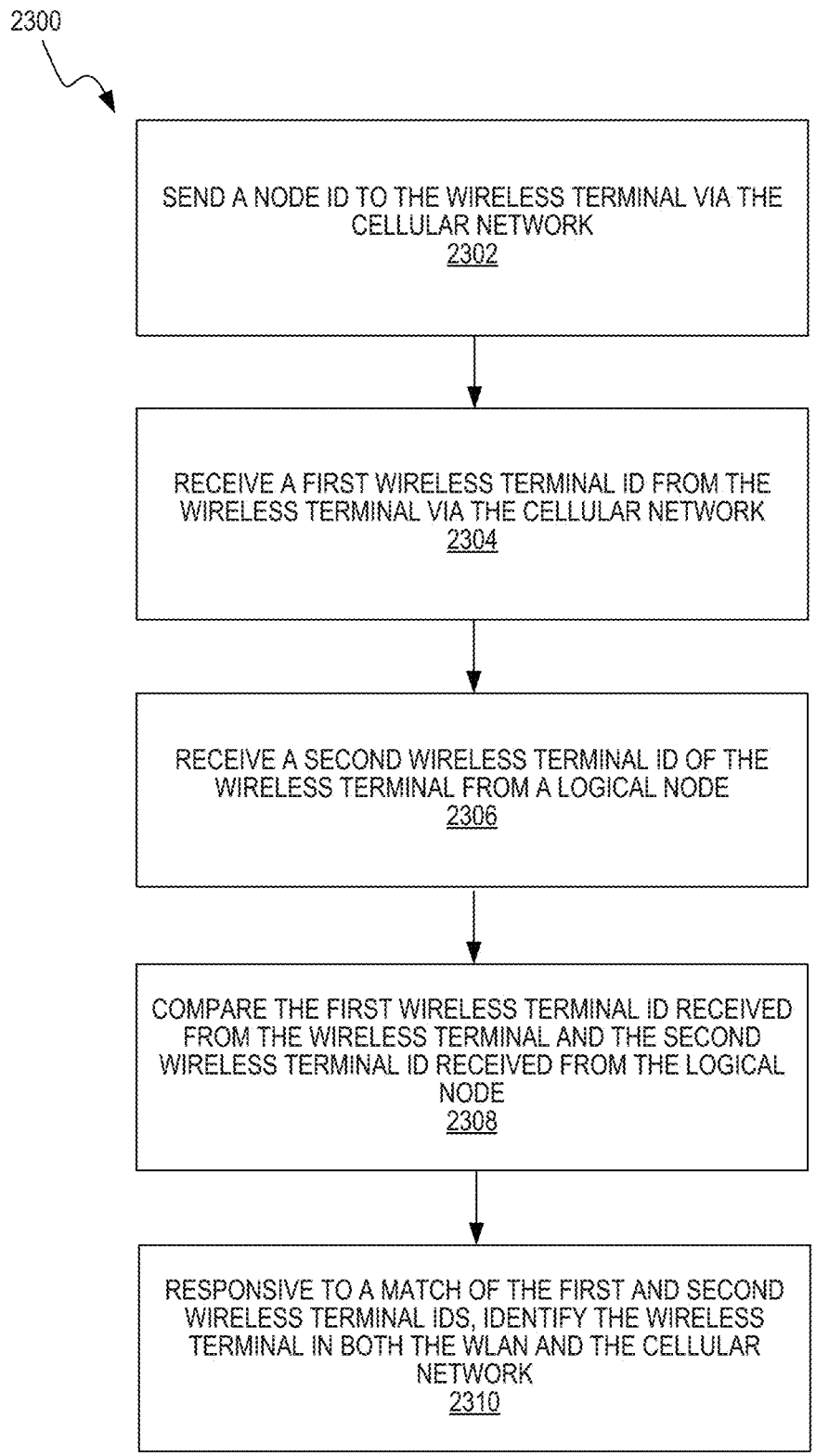
FIG. 23 is another process flow diagram according to some embodiments.

The process flow diagram of FIG. 23 illustrates a corresponding method 2300, as implemented in the network access node 30. The method 2300 includes sending a node ID associated with the network access node 30 to the wireless terminal via the cellular network (block 2302) and receiving the first wireless terminal ID from the wireless terminal via the cellular network (block 2304). The method 2300 also includes receiving a second wireless terminal ID of the wireless terminal from a logical node that is operatively connected to the cellular network and the WLAN (block 2306) and comparing the first wireless terminal ID received from the wireless terminal and the second wireless terminal ID received from the logical node (block 2308). The method 2300 further includes, responsive to a match of the first and second wireless terminal IDs, identifying the wireless terminal in both the WLAN and the cellular network (block 2310).

Note that if using TCP, one stream in each direction between the WT and AP is established, hence the user data sent between the nodes needs to carry information identifying the UE. This will enable more than one UE to be connected to the same eNodeB via the same AP and WT. The UE identifier could be the UE ID.

WT-Centric Matching with AP Involvement

Figure 24:
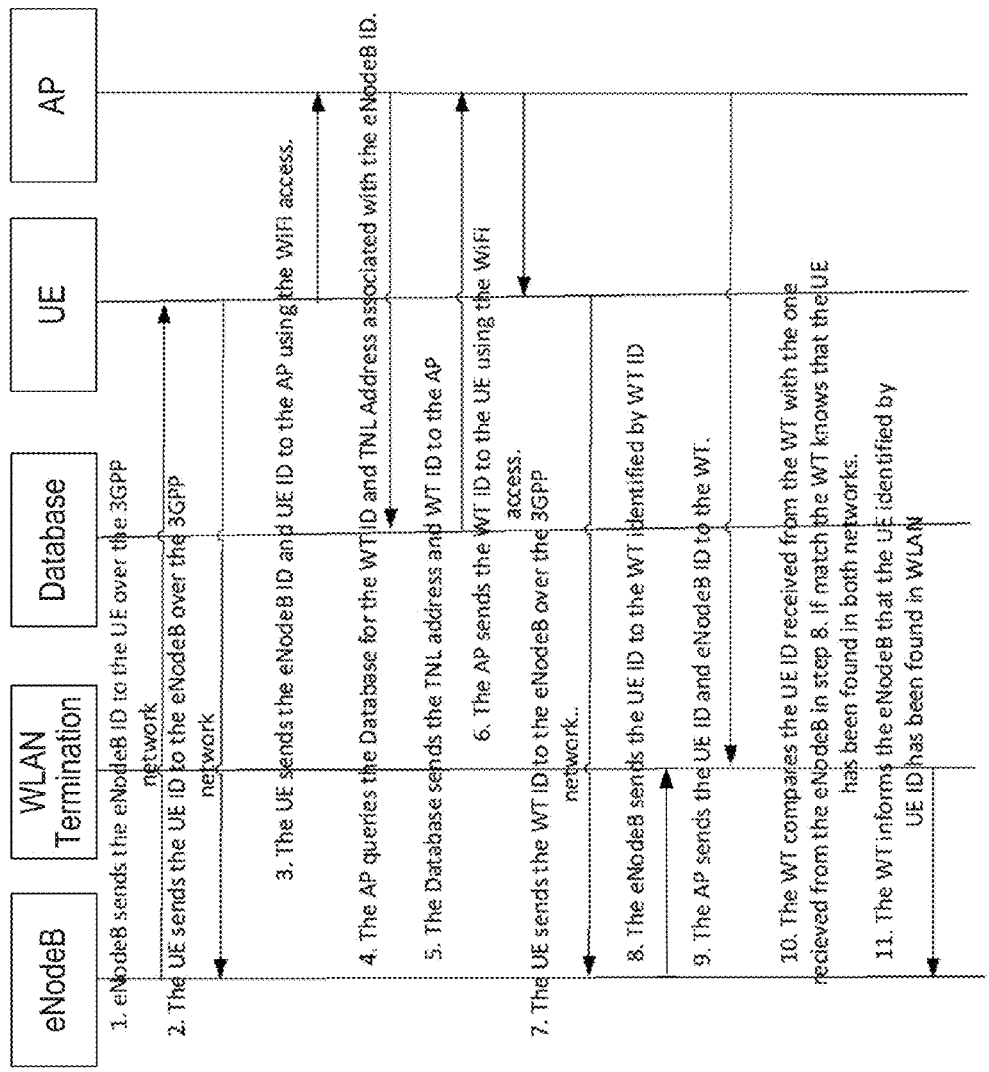
FIG. 24 is an additional signal flow diagram according to some embodiments.

In order to support the UE matching in the WT, the eNodeB needs to send the UE ID to the WT that the AP has selected (from the database). In the event that the eNodeB is connected to several WTs, the eNodeB does not know which WT the AP has selected. By sending this information from the UE to the eNodeB, the eNodeB can select the appropriate WT. When the WT has received a matching UE ID from the eNodeB and the WLAN, it informs the eNodeB that a match has been made. This is shown for UE ID start condition 3 (UE ID known in UE) in FIG. 24. Note that steps 6, 7 and 8 can be made before, after or in parallel with steps 9 and 10.

Accordingly, in a group of embodiments, the processing circuit 32 of the network access node 30 is configured to receive, via the communication interface circuit 38, the wireless terminal ID from the wireless terminal via the cellular network and receive, from the wireless terminal via the communication interface circuit, a logical node ID of a logical node that is operatively connected to the wide-area cellular network and the WLAN. The processing circuit 32 of the network access node 30 is also configured to send, via the communication interface circuit 38, the wireless terminal ID to the logical node identified by the logical node ID and receive, via the communication interface circuit 38, an indication from the logical node that the wireless terminal has been identified in the WLAN.

Figure 25:
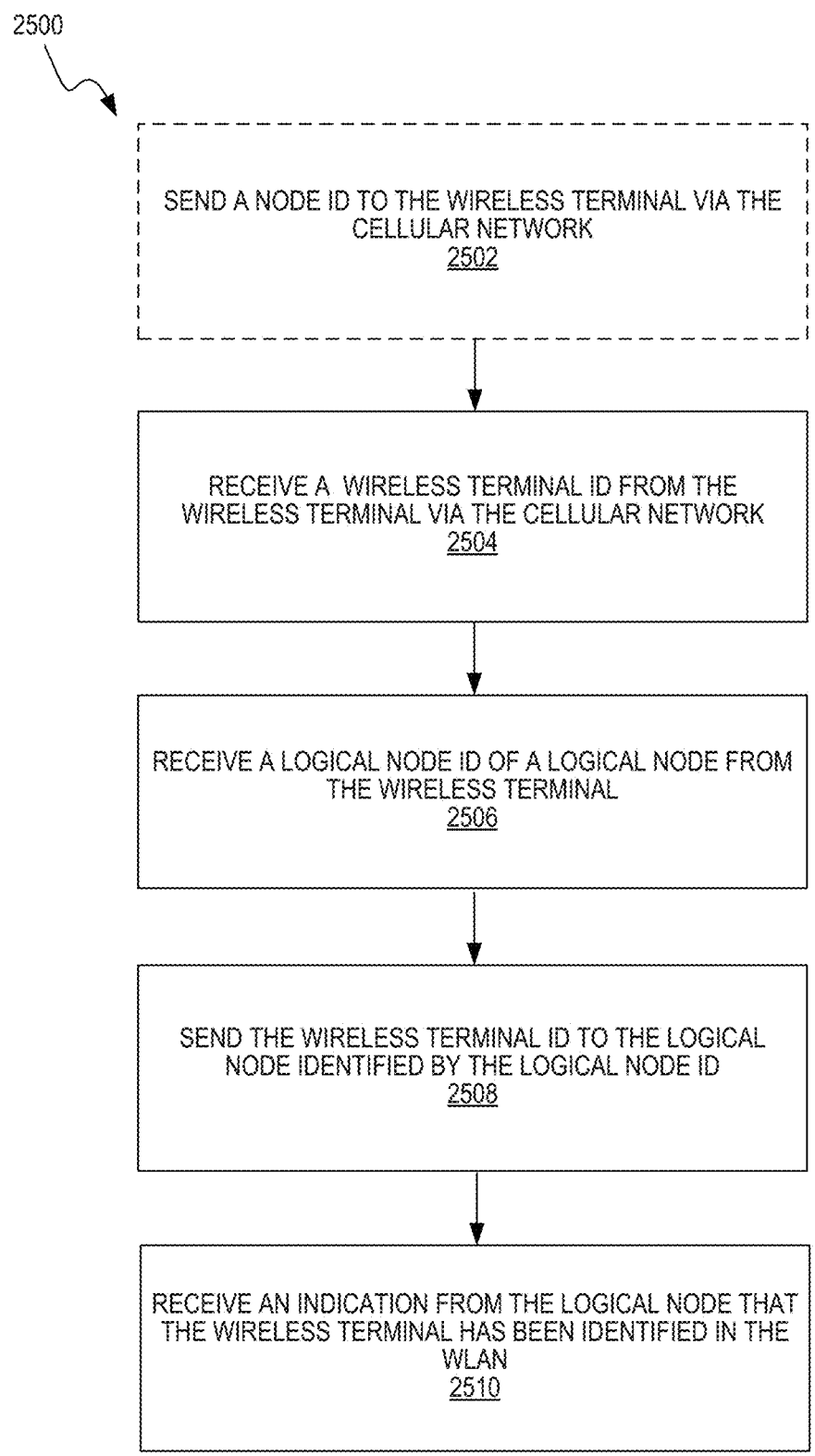
FIGS. 25 and 26 illustrate additional methods according to some embodiments.
Figure 26:
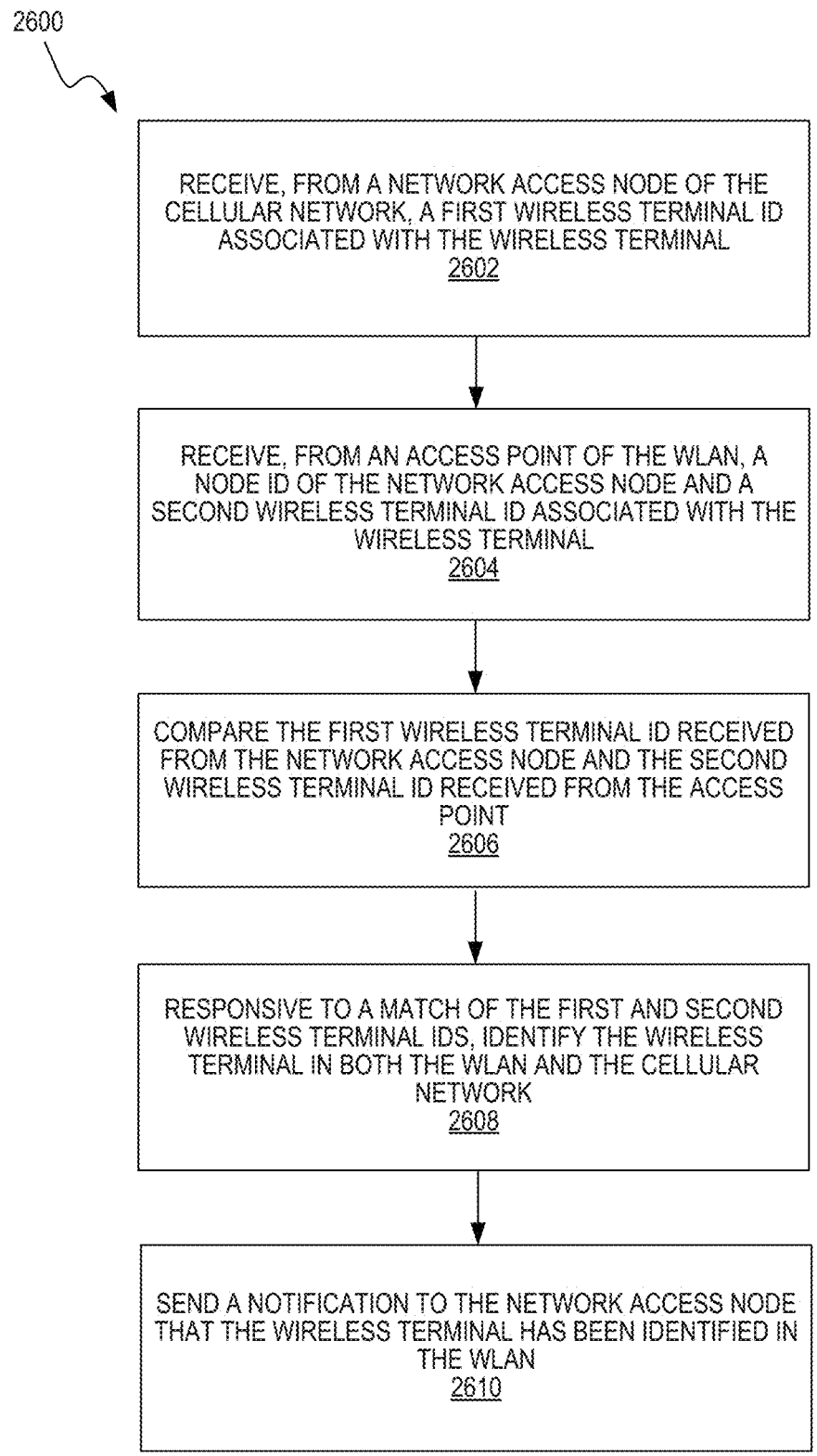

FIGS. 25 and 26 are process flow diagrams illustrating example methods 2500 and 2600 carried out by the network access node and the logical node, respectively. The method 2500 implemented by the network access node includes receiving a wireless terminal ID associated with the wireless terminal from the wireless terminal via the cellular network (block 2504) and receiving, from the wireless terminal, a logical node ID of a logical node that is operatively connected to the cellular network and the WLAN (block 2506). The method 2500 also includes sending the wireless terminal ID to the logical node identified by the logical node ID (block 2508) and receiving an indication from the logical node that the wireless terminal has been identified in the WLAN (block 2510). The method 2500 may also include sending a node ID associated with the network access node to the wireless terminal via the cellular network (block 2502).

According to the same group of embodiments, the processing circuit of the logical node is configured to receive, from a network access node of the cellular network via the communication interface circuit, a first wireless terminal ID associated with the wireless terminal and receive, from an access point of the WLAN via the communication interface circuit, a node ID of the network access node and a second wireless terminal ID associated with the wireless terminal. The processing circuit of the logical node is also configured to compare the first wireless terminal ID received from the network access node and the second wireless terminal ID received from the access point and, responsive to a match of the first and second wireless terminal IDs, identify the wireless terminal in both the WLAN and the cellular network. The processing circuit of the logical node is configured to send, via the communication interface circuit, a notification to the network access node that the wireless terminal has been identified in the WLAN.

Likewise, the method 2600 implemented by the logical node includes receiving, from a network access node of the cellular network, a first wireless terminal ID associated with the wireless terminal (block 2602) and receiving, from an access point of the WLAN, a node ID of the network access node and a second wireless terminal ID associated with the wireless terminal (block 2604). The method 2600 also includes comparing the first wireless terminal ID received from the network access node and the second wireless terminal ID received from the access point (block 2606) and, responsive to a match of the first and second wireless terminal IDs, identifying the wireless terminal in both the WLAN and the cellular network (block 2608). The method 2600 also includes sending a notification to the network access node that the wireless terminal has been identified in the WLAN (block 2610). The method 2600 may include sending a logical node ID of the logical node to the wireless terminal via the WLAN.

Additional Example Configurations

Figure 27:
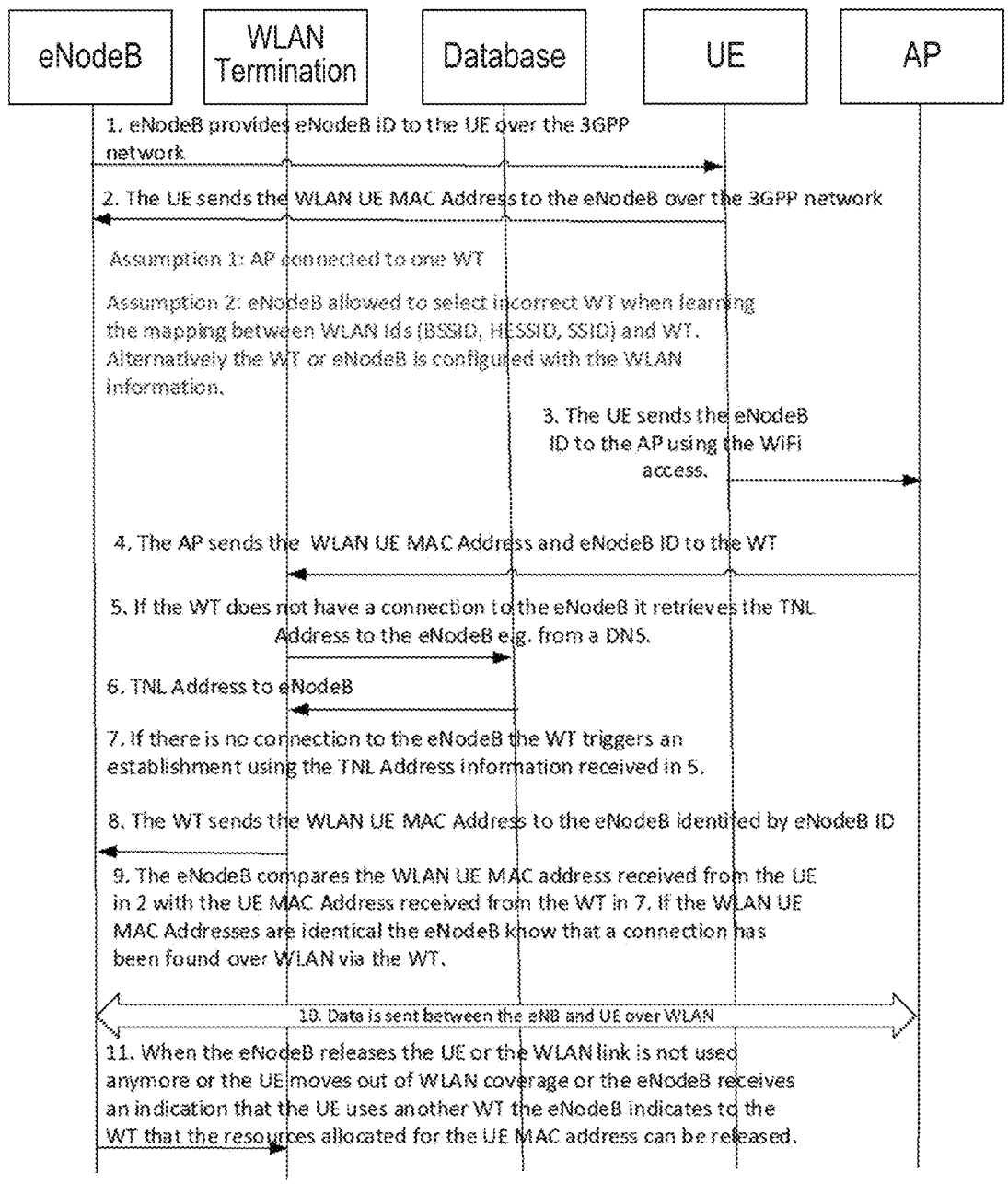
FIG. 27 is an additional signal flow diagram according to some embodiments.

If it is assumed that an involved WLAN AP is connected to one WT and that the UE ID is the UE MAC address in the WLAN, then the signaling can be simplified. FIG. 27 is an example signaling flow corresponding to an eNodeB-centric deployment, under these assumptions. The illustrated signaling flow includes selection of eNodeB by the WT and release of the WLAN link when not needed anymore. The steps are detailed below:

The eNodeB sends the eNodeB ID over radio to the UE. In LTE, the eNodeB ID would normally be known by the UE from reading the system information info (SystemInformationBlockType1), which contains the cell id which contains the cell identity. The cell identity is a 28-bit sequence, which in combination with the primary PLMN in the cell provides a globally unique cell identifier. From this information a globally unique eNodeB identifier can be obtained by removing the 8 bits in the cell identity specifying the cell.

The UE ID, or in this case the WLAN MAC address, is sent to the eNodeB from the UE. This information can be combined with other messages exchanged between the UE and eNodeB. It needs to be available for step 8 when it is compared to the UE WLAN MAC address received from the WT.

The UE sends the eNodeB ID to the AP.

The AP sends the eNodeB ID and the UE WLAN MAC address to the WT.

If the WT does not have a connection/interface to the eNodeB indicated by the eNodeB ID it retrieves this information from a database which could be a DNS.

The database, e.g., DNS provides the TNL address to the eNodeB.

If there is no connection/interface setup between the WT and eNodeB, this is triggered by the WT. Possible protocols for control plane signaling is Stream Control Transmission Protocol (SCTP).

The WT sends the WLAN UE MAC address to the eNodeB.

The eNodeB compares the WLAN UE MAC addresses received in step 2 and 8. If they match the eNodeB has a connection to the UE in WLAN via the WT.

Data is sent between the eNodeB and the UE, via the WLAN.

When the eNodeB releases the UE or the WLAN link is not used anymore or the UE moves out of WLAN coverage or the eNodeB receives an indication that the UE uses another WT the eNodeB indicates to the WT that the resources allocated for the UE MAC address can be released.

The AP knows the WLAN UE MAC address, and the UE contains functionality to communicate with WLAN and a network such as E-UTRAN.

Accordingly, in an embodiment, the processing circuit 32 of the network access node 30 is configured to receive, via the communication interface circuit 38, a first WLAN MAC address of the wireless terminal via the cellular network and receive, via the communication interface circuit 38, a second WLAN MAC address from a logical node that is operatively connected to the cellular network and the WLAN. The processing circuit 32 of the network access node 30 is also configured to compare the first WLAN MAC address received from the wireless terminal and the second WLAN MAC address received from the logical node, and, responsive to a match of the first and second WLAN MAC addresses, identify the wireless terminal in the WLAN via the logical node.

Figure 28:
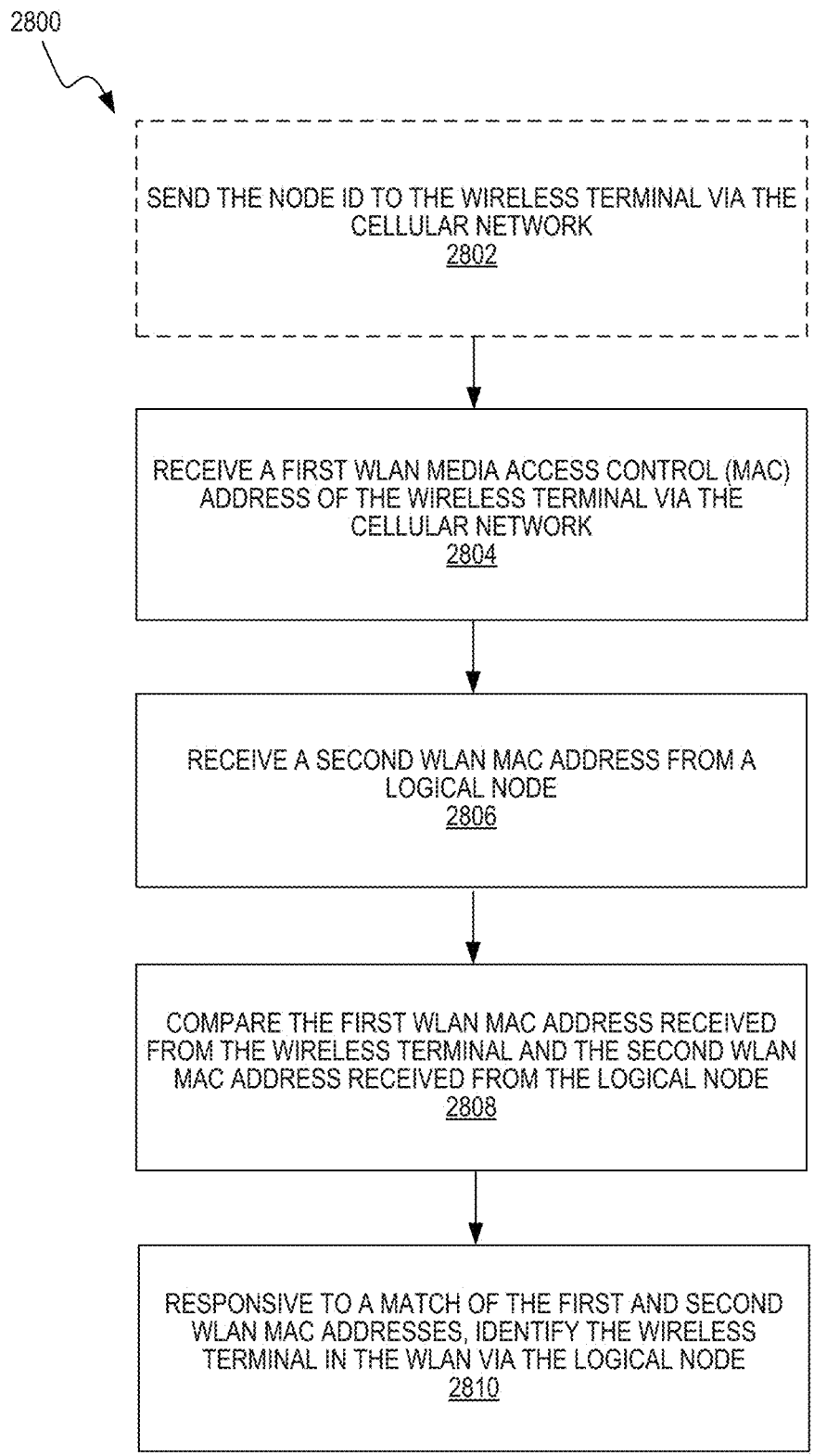
FIG. 28 is another process flow diagram according to some embodiments.

FIG. 28 is a process flow diagram illustrating an example method 2800 carried out by the network access node 30. The method 2800 includes receiving a first WLAN MAC address of the wireless terminal via the cellular network (block 2804) and receiving a second WLAN MAC address from a logical node that is operatively connected to the cellular network and the WLAN (block 2806). The method 2800 includes comparing the first WLAN MAC address received from the wireless terminal and the second WLAN MAC address received from the logical node (block 2808) and, responsive to a match of the first and second WLAN MAC addresses, identifying the wireless terminal in the WLAN via the logical node (block 2810). The method 2800 may include sending the node ID to the wireless terminal via the cellular network (block 2802) and/or sending data to the wireless terminal via the WLAN.

The method 2800 may also include, responsive to at least one of: a release of the wireless terminal; moving out of the wireless terminal; lack of use of the wireless terminal; and receiving a message that the wireless terminal is using another logical node, sending an indication to the logical node that resources for the WLAN MAC address associated with the wireless terminal can be released.

Figure 29:
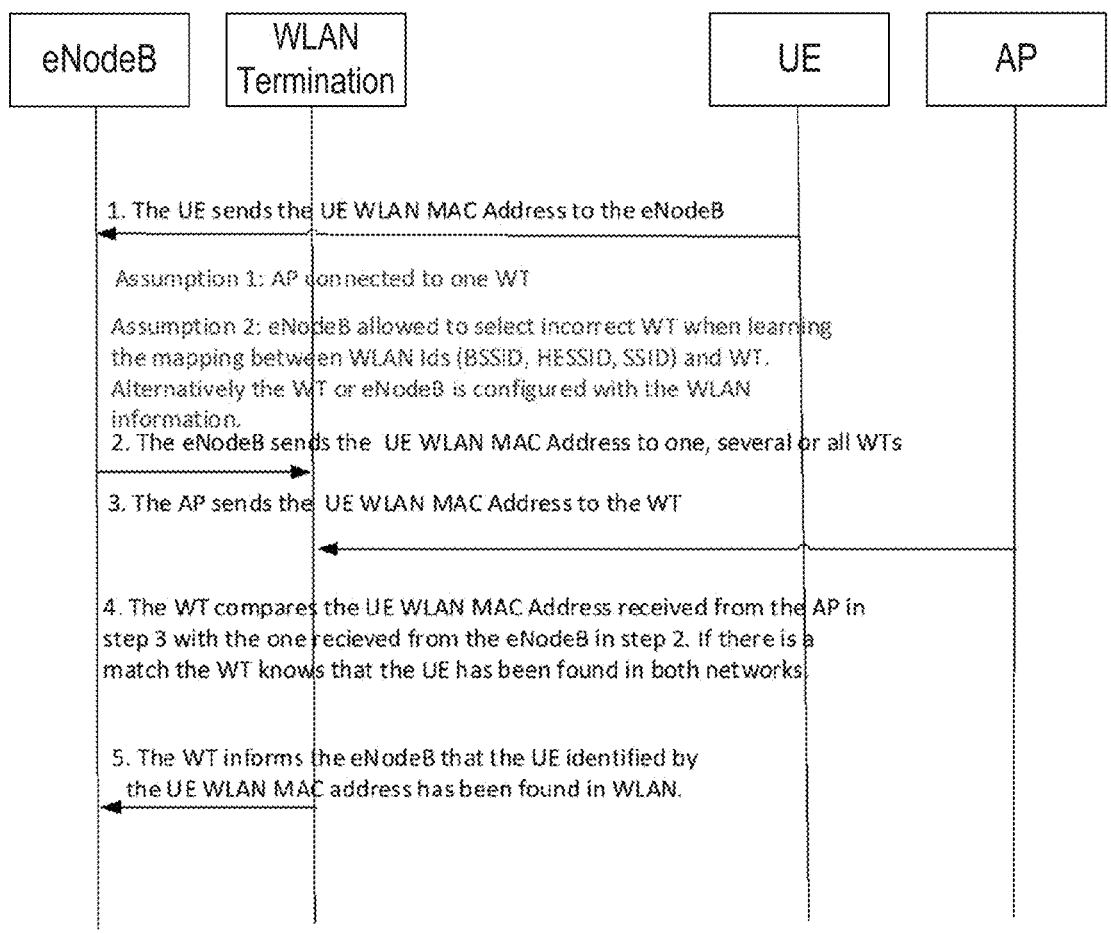
FIG. 29 is an additional signal flow diagram according to some embodiments.

FIG. 29 is a signaling flow diagram illustrating an example information exchange in a WT-centric scenario, under the same simplified assumptions (the AP is connected to one WT the UE ID is the UE MAC address) discussed above. The steps are detailed below:

The UE sends the UE WLAN MAC address to the eNodeB.

The eNodeB sends the UE WLAN MAC address to one, several or all WTs.

The AP sends the UE WLAN MAC address to the WT.

The WT compares the UE WLAN MAC address received from the eNodeB with the UE WLAN MAC address received from the AP. If a match is made, the WT knows to which eNodeB the UE WLAN MAC address received from the AP belongs.

The WT informs the eNodeB that the UE identified by the UE WLAN MAC address on the WLAN side has been found. The eNodeB knows via which WT data shall be sent to the UE over WLAN.

The eNodeB has received the following pieces of information: 1.) which Basic Service Set Identifier (BSSID)/Homogeneous Extended SSID(HESSID)/SSID the UE is connected to in WLAN; 2.) which WT is connected to the BSSID/HESSID/SSID. This information can be used internally the eNodeB to learn which WT to select when it tells a UE connect to a specific WLAN ID. The AP knows the UE MAC address, and the UE contains functionality to communicate with WLAN and a network such as E-UTRAN.

Accordingly, in a group of embodiments, the processing circuit of the network access node is configured to receive, via the communication interface circuit, a WLAN media access control, MAC, address of the wireless terminal via the cellular network and send, via the communication interface circuit, the WLAN MAC address to one or more logical nodes. The processing circuit of the network access node is also configured to receive, via the communication interface circuit, an indication from one of the logical nodes that the wireless terminal associated with the WLAN MAC address has been identified in the WLAN.

Figure 30:
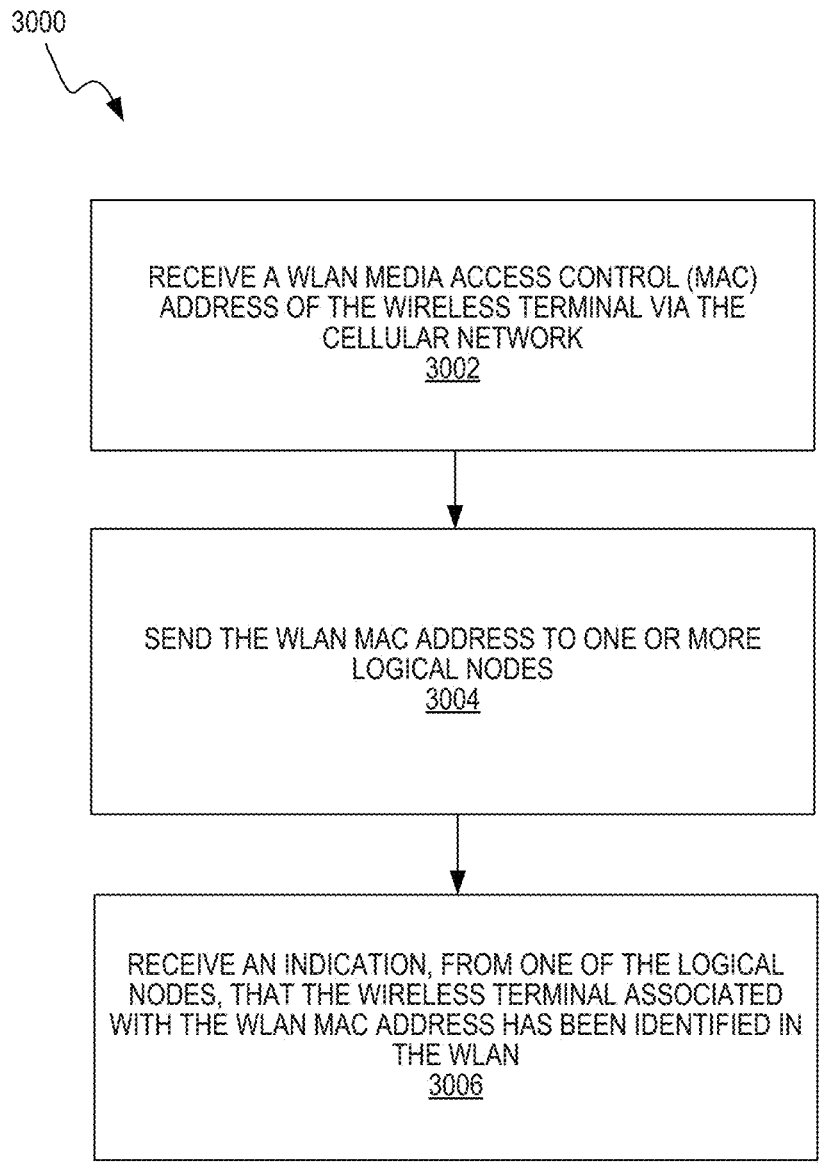
FIGS. 30 and 31 illustrate additional methods according to some embodiments.
Figure 31:
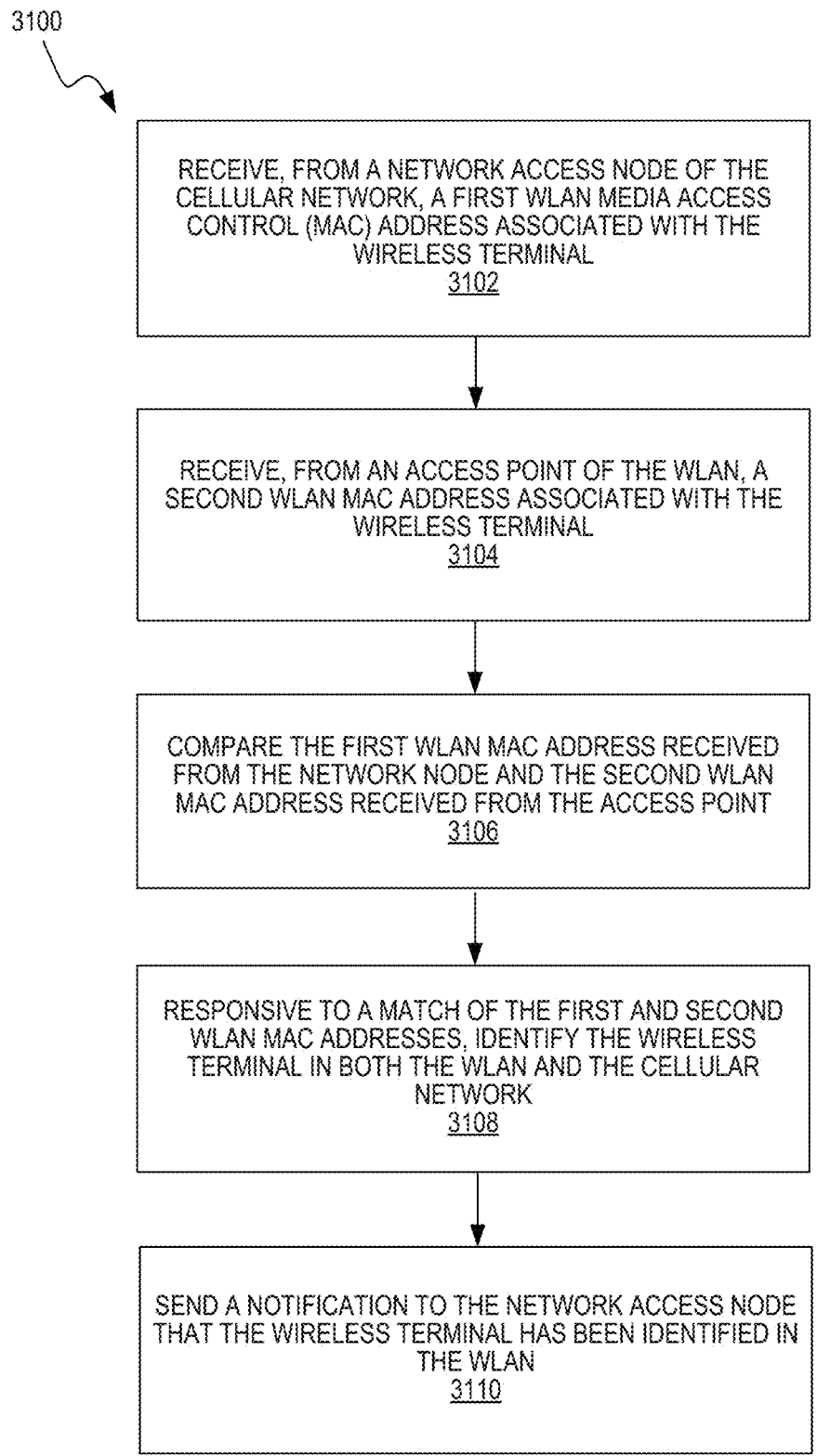

FIGS. 30 and 31 are process flow diagrams illustrating example methods 3000 and 3100 carried out by the network access node and the logical node, respectively. The method 3000 includes receiving a WLAN MAC address of the wireless terminal via the cellular network (block 3002), sending the WLAN MAC address to one or more logical nodes (block 3004) and receiving an indication from one of the logical nodes that the wireless terminal associated with the WLAN MAC address has been identified in the WLAN (block 3006).

According to the same group of embodiments, the processing circuit of the logical node is configured to receive, from a network access node of the cellular network via the communication interface circuit, a first WLAN MAC address associated with the wireless terminal, receive, from an access point of the WLAN via the communication interface circuit, a second WLAN MAC address associated with the wireless terminal, and compare the first WLAN MAC address received from the network node and the second WLAN MAC address received from the access point. The processing circuit of the logical node is also configured to, responsive to a match of the first and second WLAN MAC addresses, identify the wireless terminal in both the WLAN and the cellular network and send, via the communication interface circuit, a notification to the network access node that the wireless terminal has been identified in the WLAN.

Likewise, the method 3100 implemented by the logical node includes receiving, from a network access node of the cellular network, a first WLAN MAC address associated with the wireless terminal (block 3102), receiving, from an access point of the WLAN, a second WLAN MAC address associated with the wireless terminal (block 3104), and comparing the first WLAN MAC address received from the network access node and the second WLAN MAC address received from the access point (block 3106). The method 3100 includes, responsive to a match of the first and second WLAN MAC addresses, identifying the wireless terminal (50) in both the WLAN and the cellular network (block 3108) and sending a notification to the network access node that the wireless terminal has been identified in the WLAN (block 3110).

The signaling flows and process flows illustrated in FIGS. 4-31, and variants thereof, may be carried out in wireless network access nodes, wireless terminals, WLAN nodes, and logical nodes having physical configurations like those shown in FIGS. 2 and 3, in various embodiments. It will be appreciated that specific embodiments, corresponding to one or more of the techniques detailed above, may be represented in terms of an apparatus having functional "modules" that each carry out one or more of the signaling or process flow steps described above. These modules may correspond to software modules, software routines executing in a corresponding processor, digital hardware modules, or combinations thereof. Accordingly, FIGS. 32-47 are examples of such functional representations.

Figure 32:
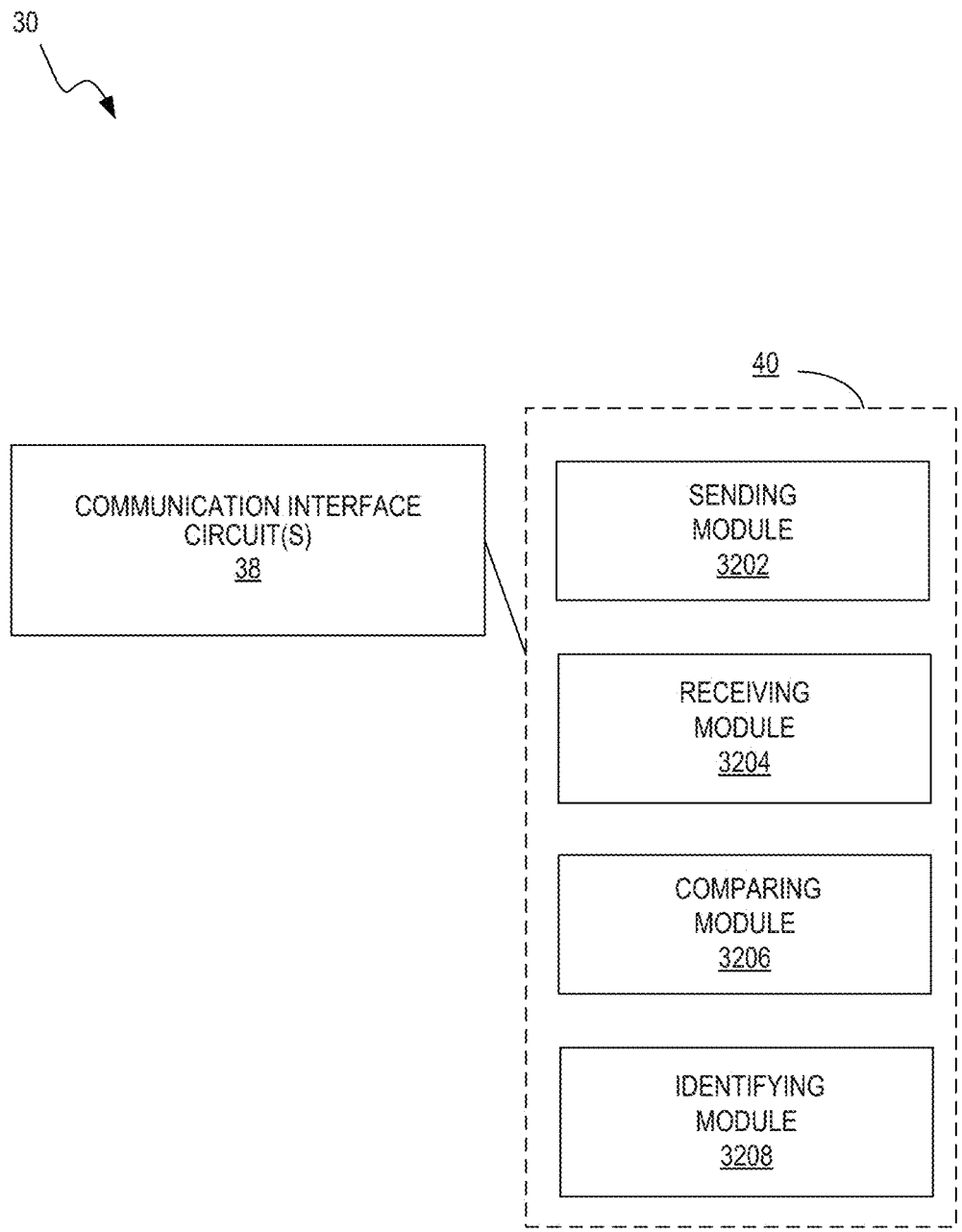
FIGS. 32-47 are block diagrams illustrating functional representations of various nodes according to the presently disclosed embodiments.
Figure 33:
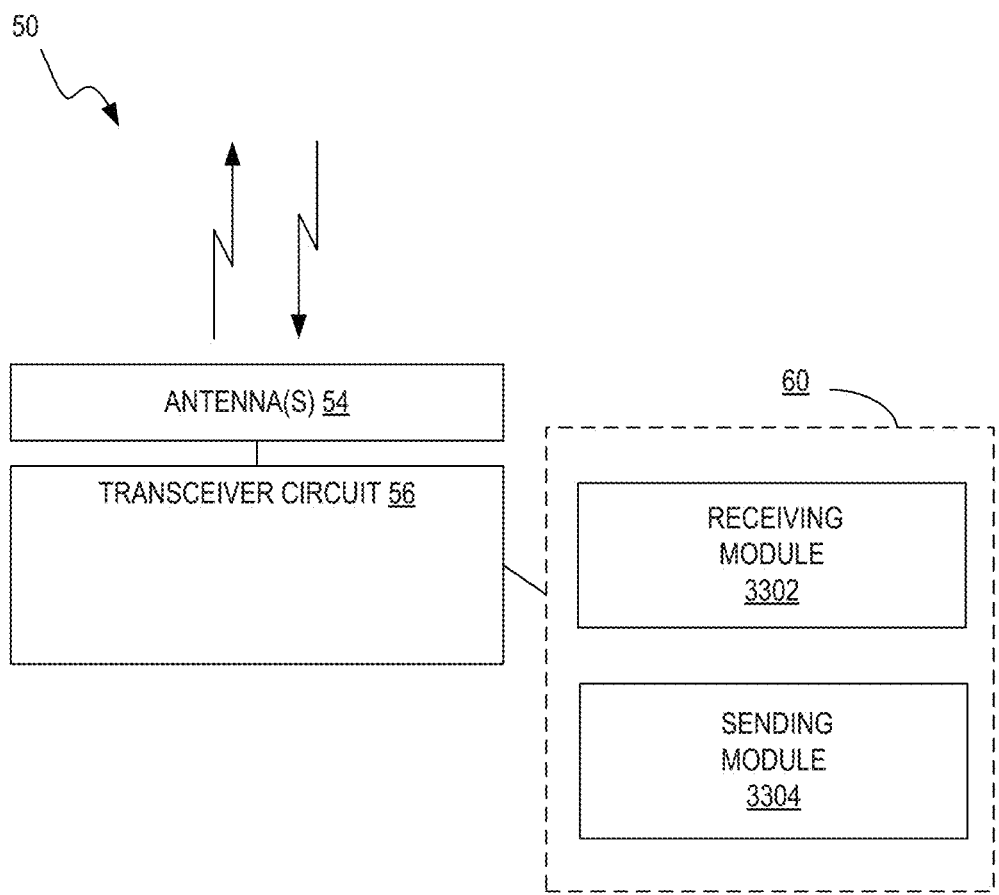
Figure 34:
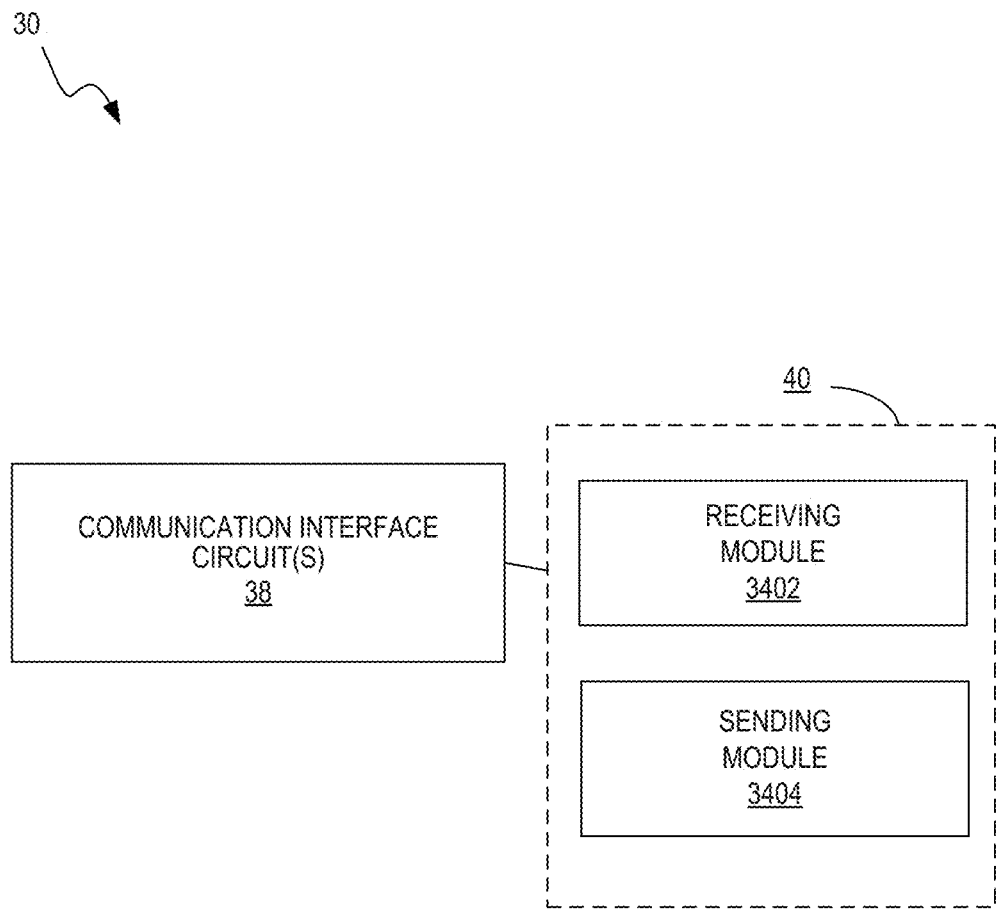

FIGS. 32, 33, and 34 correspond to the process flows in FIGS. 5, 6, and 7, respectively. FIG. 32 illustrates an example functional module or circuit architecture as may be implemented in a network access node 30 associated with a node ID and configured to communicate with a wireless terminal that is associated with a wireless terminal ID and that is configured for operation in the cellular network and in a WLAN, e.g., based on the processing circuit 32. The illustrated embodiment at least functionally includes a sending module 3202 for sending, to the wireless terminal via the cellular network, a logical node ID associated with a logical node that is operatively connected to the cellular network and the WLAN and a receiving module 3204 for receiving, from the logical node, the wireless terminal ID of the wireless terminal via the WLAN. The implementation also includes a comparing module 3206 for comparing the received wireless terminal ID with stored wireless terminal IDs and an identifying module 3208 for, responsive to a match of the received wireless terminal ID and one of the stored wireless terminal IDs, identifying the wireless terminal in both the WLAN and the cellular network.

FIG. 33 illustrates an example functional module or circuit architecture as may be implemented in a wireless terminal 50 of a wide-area cellular network that is associated with a wireless terminal ID and configured for operation in the cellular network and in a WLAN, e.g., based on processing circuit 52. The implementation includes a receiving module 3302 for receiving, from a network access node of the cellular network via the cellular network, a node ID of the network access node and a logical node ID of a logical node that is operatively connected to the cellular network and the WLAN and a sending module 3304 for sending, to the logical node via the WLAN, the wireless terminal ID and a TNL address of the wireless terminal.

FIG. 34 illustrates an example functional module or circuit architecture as may be implemented in a logical node associated 30 with a logical node ID and configured to communicate with a wireless terminal that is associated with a wireless terminal ID and configured for operation in a wide-area cellular network and in a WLAN, e.g. based on processing circuitry 32. The implementation includes a receiving module 3402 for receiving, from the wireless terminal via the WLAN, the wireless terminal ID and a TNL address the logical node uses to reach the wireless terminal and a sending module 3404 for sending the wireless terminal ID to a network access node of the cellular network identified by a node ID of the network access node.

Figure 35:
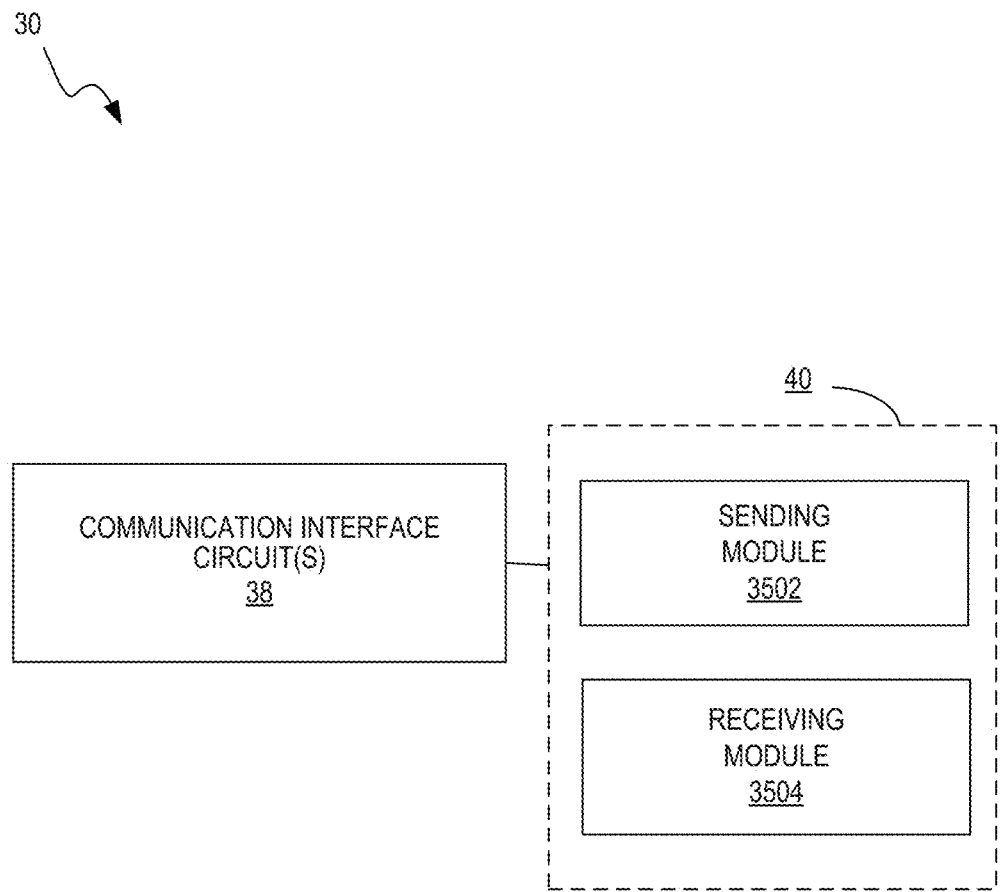
Figure 36:
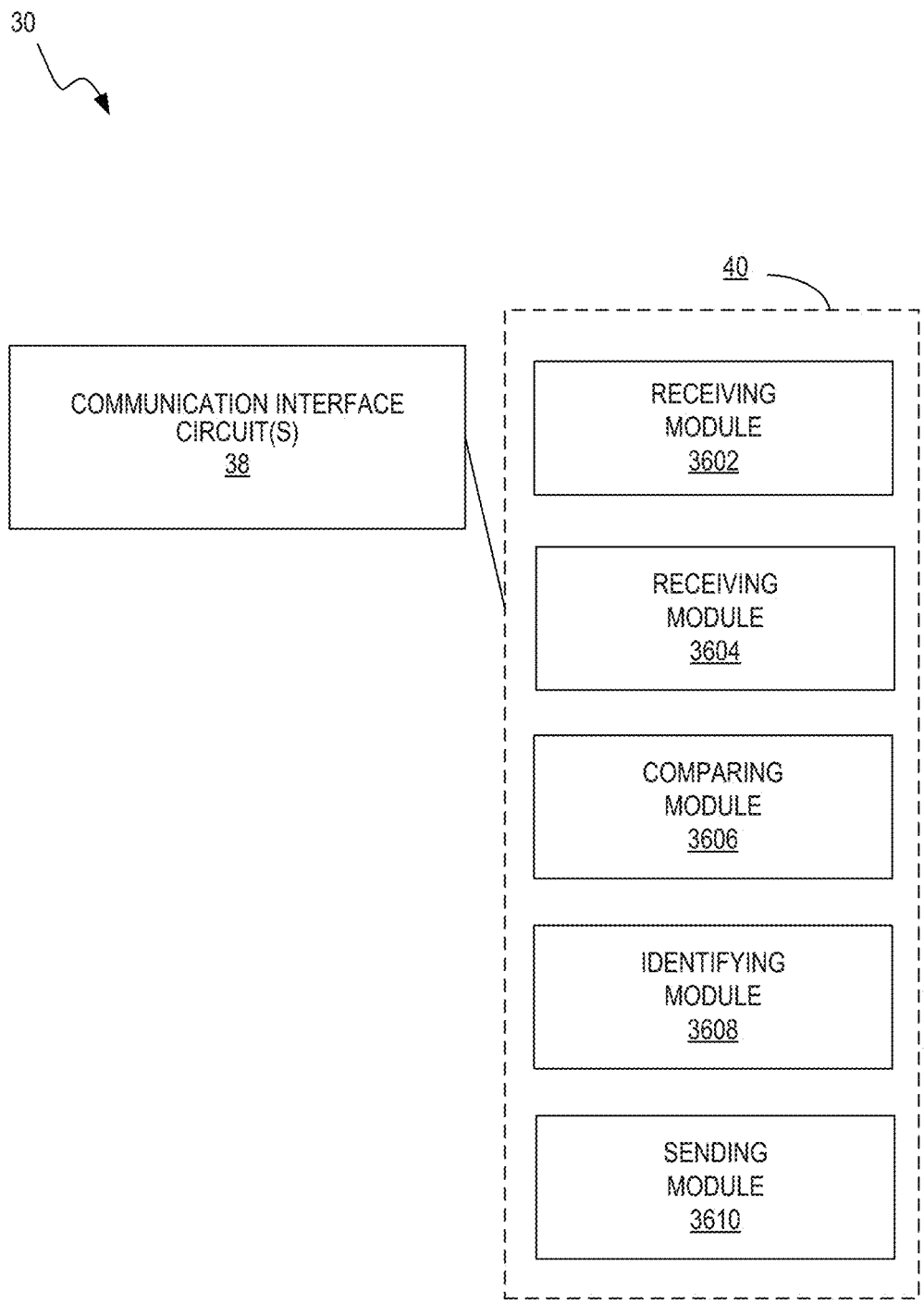

FIGS. 35 and 36 correspond to FIGS. 11 and 12, respectively. FIG. 35 illustrates an example functional module or circuit architecture as may be implemented in a network access node 30 associated with a node ID and configured to communicate with a wireless terminal that is associated with a wireless terminal ID and that is configured for operation in the cellular network and in a WLAN, e.g., based on the processing circuit 32. The illustrated embodiment at least functionally includes a sending module 3502 for sending the wireless terminal ID to a logical node that is operatively connected to the cellular network and to the WLAN and a receiving module 3504 for receiving an indication from the logical node that the wireless terminal has been identified in the WLAN.

FIG. 36 illustrates an example functional module or circuit architecture as may be implemented in a logical node associated 30 with a logical node ID and configured to communicate with a wireless terminal that is associated with a wireless terminal ID and configured for operation in a wide-area cellular network and in a WLAN, e.g. based on processing circuit 32. The implementation at least functionally includes a receiving module 3602 for receiving, from a network access node of the cellular network, a first wireless terminal ID associated with the wireless terminal and a receiving module 3604 for receiving, from the wireless terminal, a second wireless terminal ID associated with the wireless terminal. The implementation also includes a comparing module 3606 for comparing the first wireless terminal ID received from the network access node and the second wireless terminal ID received from the wireless terminal and an identifying module 3608 for, responsive to a match of the first and second wireless terminal IDs, identifying the wireless terminal in both the WLAN and the cellular network. The implementation further includes a sending module 3610 for sending a notification to the network access node that the wireless terminal has been identified in the WLAN.

Figure 37:
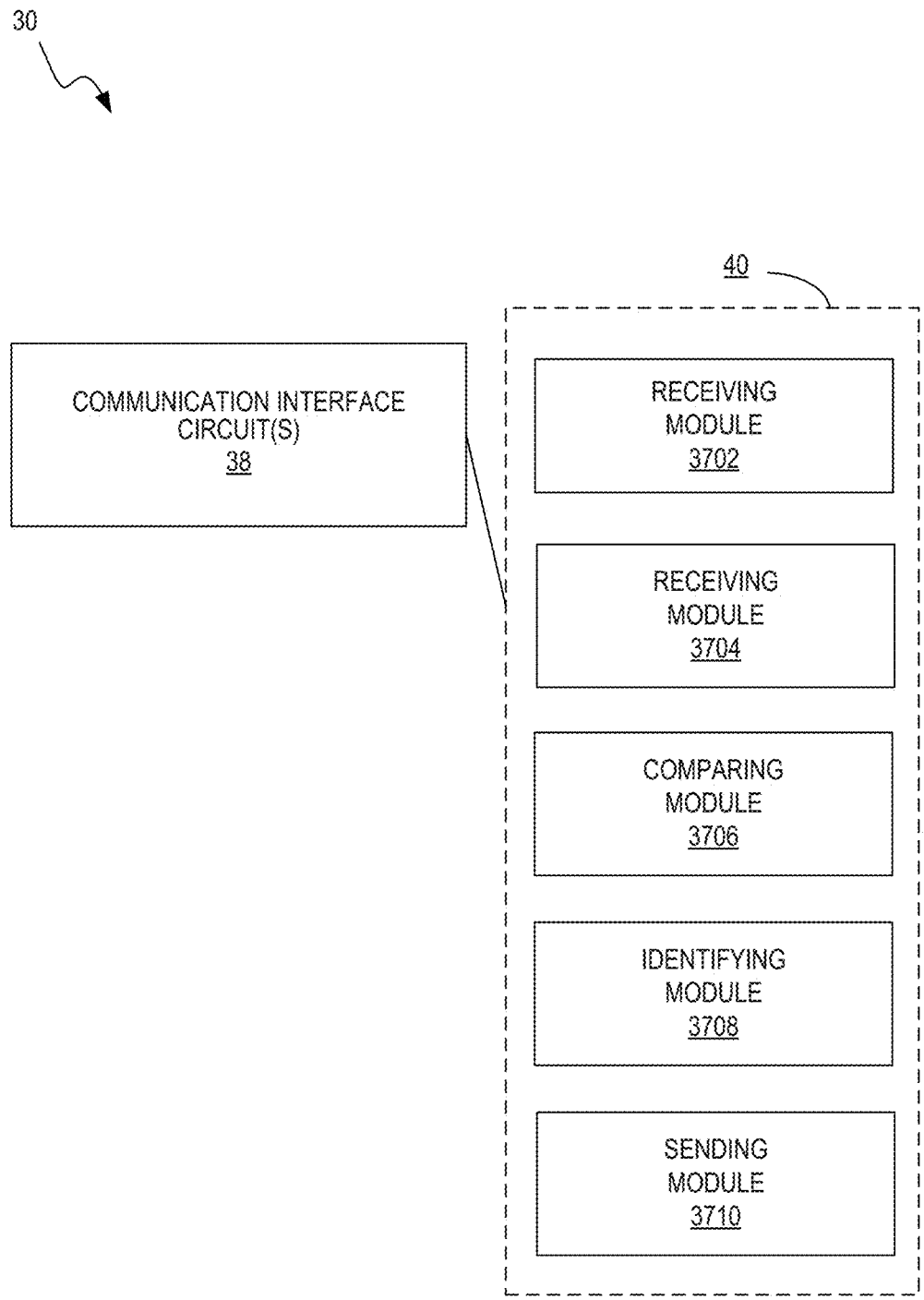

FIG. 37 corresponds to FIG. 15. FIG. 37 illustrates an example functional module or circuit architecture as may be implemented in a logical node associated 30 with a logical node ID and configured to communicate with a wireless terminal that is associated with a wireless terminal ID and configured for operation in a wide-area cellular network and in a WLAN, e.g. based on processing circuit 32. The implementation at least functionally includes a receiving module 3702 for receiving, from a network access node of the cellular network, a first wireless terminal ID associated with the wireless terminal and a receiving module 3704 for receiving, from the wireless terminal, a node ID of the network access node and a second wireless terminal ID associated with the wireless terminal. The implementation also includes a comparing module 3706 for comparing the first and second wireless terminal IDs and an identifying module 3708 for, responsive to a match of the first and second wireless terminal IDs, identifying the wireless terminal in the WLAN. The implementation further includes a sending module 3710 for sending a notification to the network access node that the wireless terminal has been identified in the WLAN.

Figure 38:
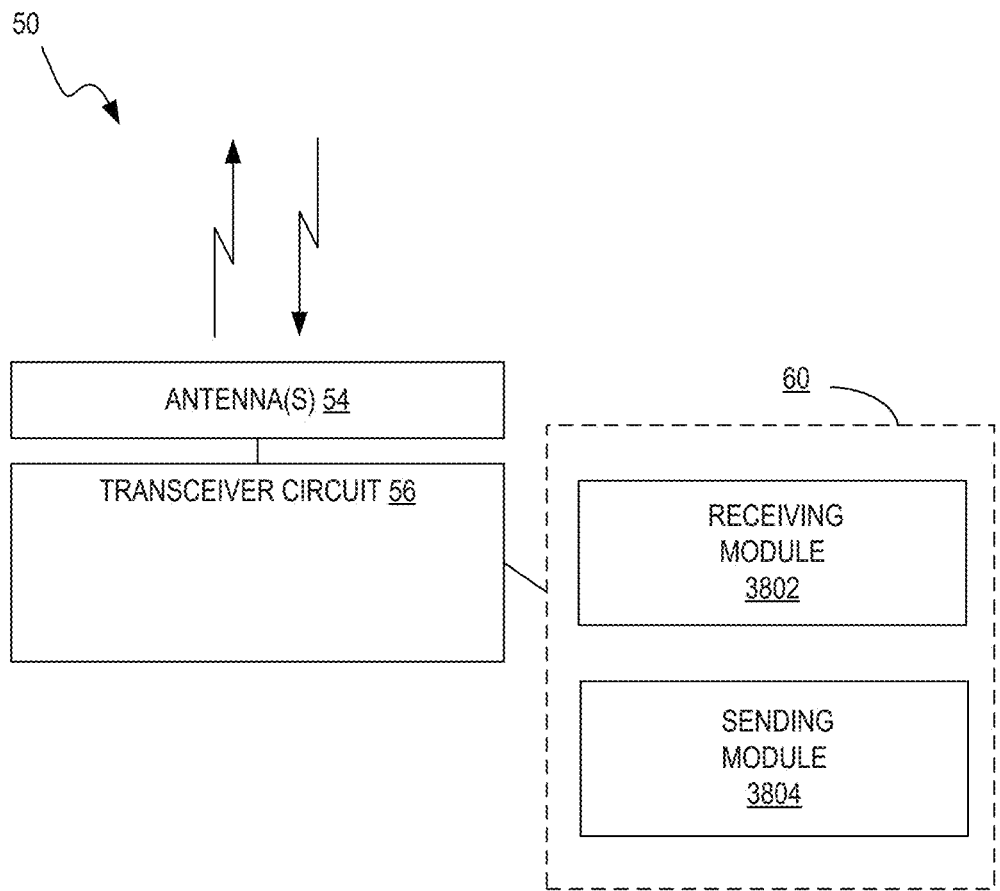

FIGS. 38, 39, 40, and 41 correspond to FIGS. 17, 18, 19, and 20, respectively. FIG. 38 illustrates an example functional module or circuit architecture as may be implemented in a wireless terminal 50 of a wide-area cellular network that is associated with a wireless terminal ID and configured for operation in the cellular network and in a WLAN, e.g., based on processing circuit 52. The implementation at least functionally includes a receiving module 3802 for receiving a node ID of a network access node of the cellular network from the network access node via the cellular network and a sending module 3804 for sending the node ID and the wireless terminal ID to an access point of the WLAN.

Figure 39:
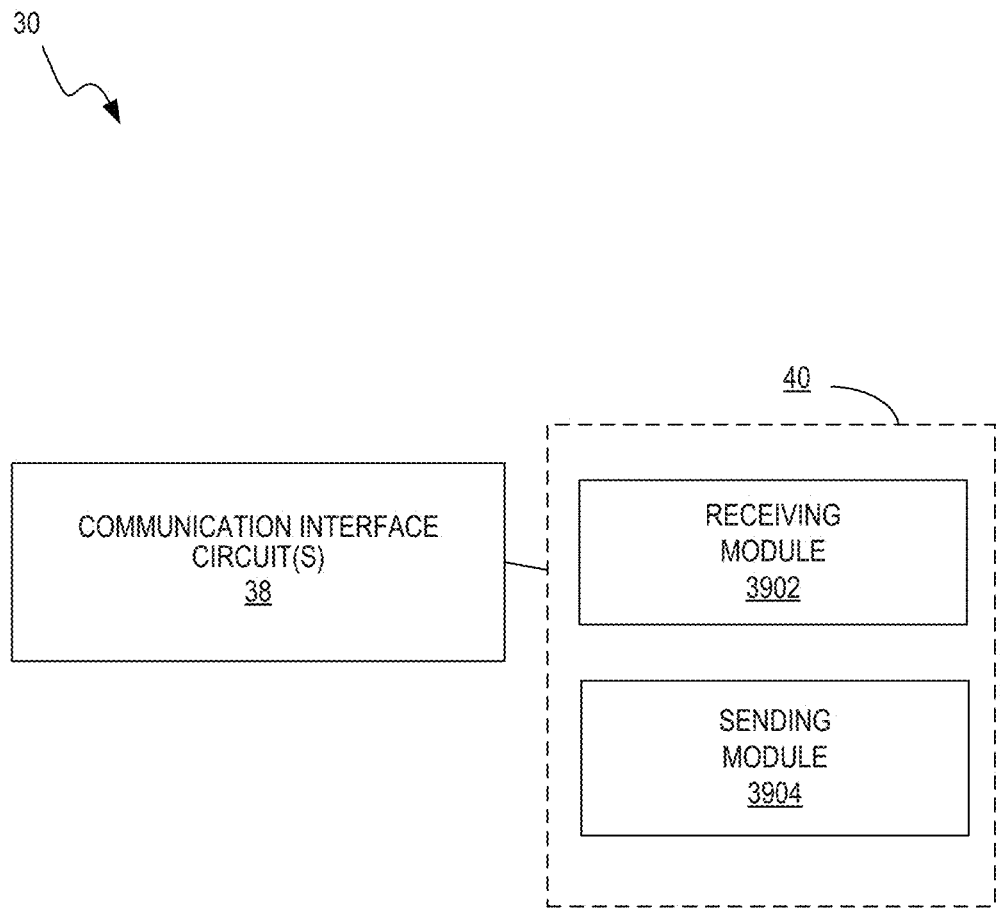

FIG. 39 illustrates an access point 30 of a WLAN configured for communication with a wireless terminal that is associated with a wireless terminal ID and configured for operation in the WLAN and in a wide-area cellular network, e.g., based on processing circuit 32. The implementation at least functionally includes a receiving module 3902 for receiving a node ID of a network access node of the cellular network and the wireless terminal ID from the wireless terminal and a sending module 3904 for sending the node ID and the wireless terminal ID to a logical node that is operatively connected to the cellular network and the WLAN.

Figure 40:
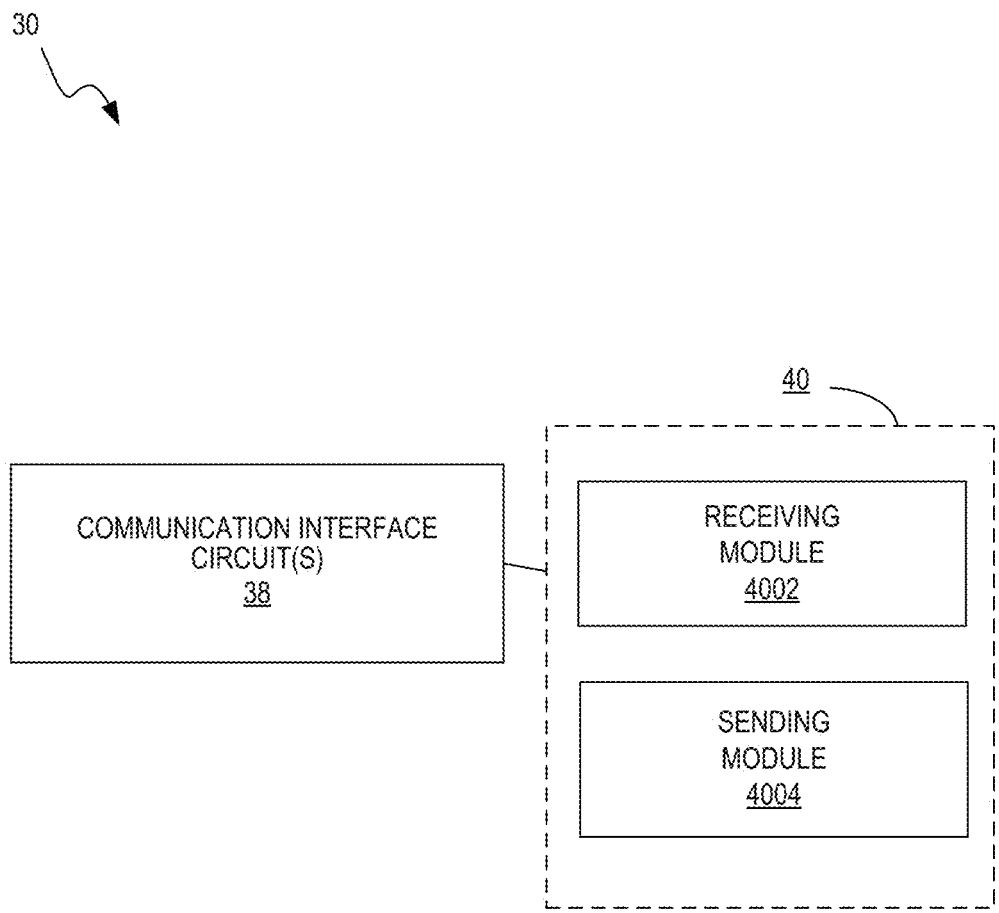

FIG. 40 illustrates an example functional module or circuit architecture as may be implemented in a logical node associated 30 with a logical node ID and configured to communicate with a wireless terminal that is associated with a wireless terminal ID and configured for operation in a wide-area cellular network and in a WLAN, e.g. based on processing circuit 32. The implementation at least functionally includes a receiving module 4002 for receiving, from an access point of the WLAN, a node ID of a network access node of the cellular network and a wireless terminal ID associated with the wireless terminal and a sending module 4004 for sending the wireless terminal ID to the network access node identified by the node ID.

Figure 41:
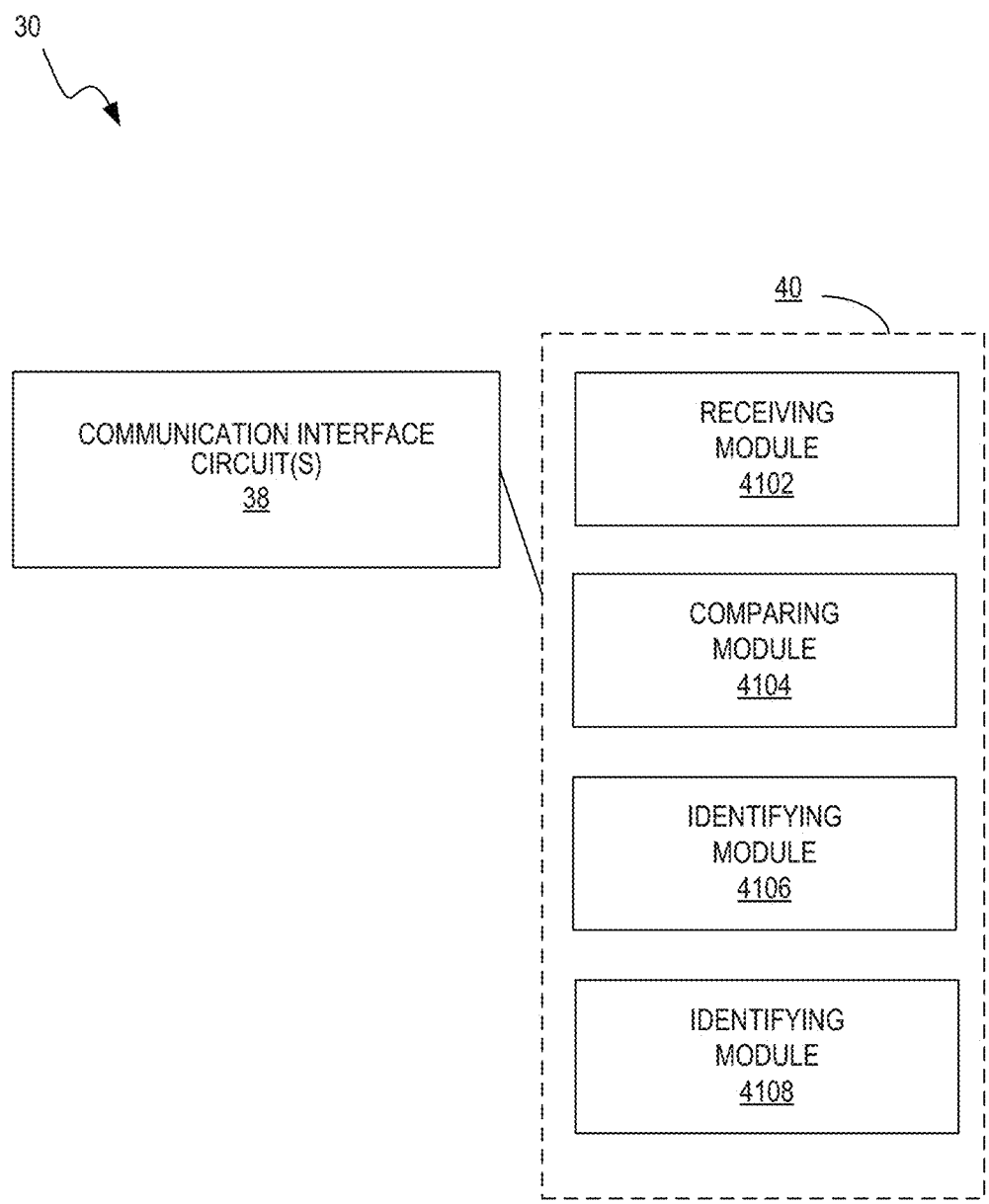

FIG. 41 illustrates an example functional module or circuit architecture as may be implemented in a network access node 30 associated with a node ID and configured to communicate with a wireless terminal that is associated with a wireless terminal ID and that is configured for operation in the cellular network and in a WLAN, e.g., based on the processing circuit 32. The implementation at least functionally includes a receiving module 4102 for receiving the wireless terminal ID from a logical node that is operatively connected to the cellular network and the WLAN and a comparing module 4104 for comparing the wireless terminal ID received from the logical node to stored wireless terminal IDs. The implementation also includes an identifying module 4106 for, responsive to a match of the received wireless terminal ID and one of the stored wireless terminal IDs, identifying the wireless terminal in both the WLAN and the cellular network and an identifying module 4108 for identifying that the wireless terminal has a connection via the logical node.

Figure 42:
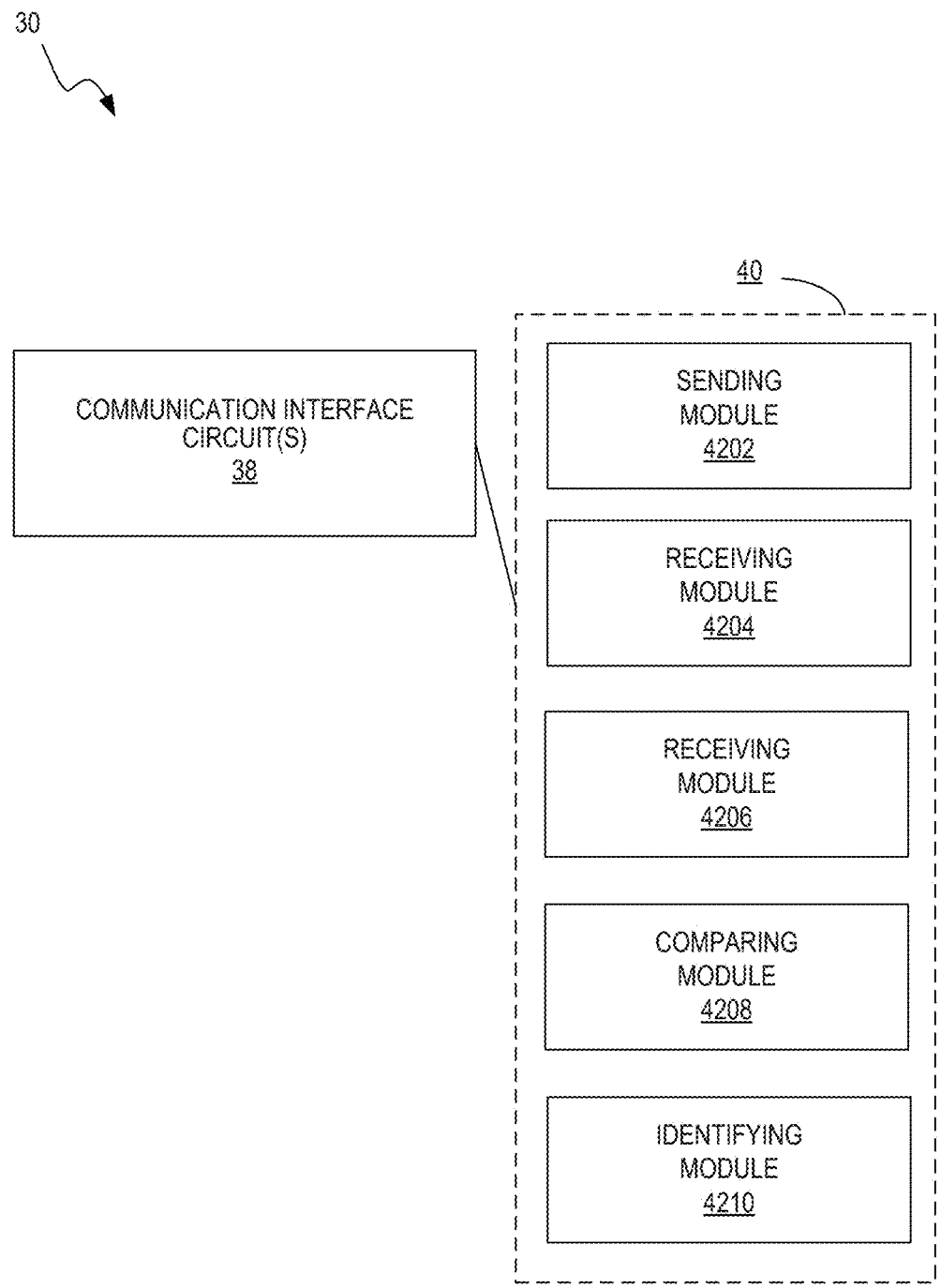

FIG. 42 corresponds to FIG. 23. FIG. 42 illustrates an example functional module or circuit architecture as may be implemented in a network access node 30 associated with a node ID and configured to communicate with a wireless terminal that is associated with a wireless terminal ID and that is configured for operation in the cellular network and in a WLAN, e.g., based on the processing circuit 32. The implementation at least functionally includes a sending module 4202 for sending a node ID associated with the network access node to the wireless terminal via the cellular network, a receiving module 4204 for receiving the first wireless terminal ID from the wireless terminal via the cellular network, and a receiving module 4206 for receiving a second wireless terminal ID of the wireless terminal from a logical node that is operatively connected to the cellular network and the WLAN. The implementation also includes a comparing module 4208 for comparing the first wireless terminal ID received from the wireless terminal and the second wireless terminal ID received from the logical node and an identifying module 4210 for, responsive to a match of the first and second wireless terminal IDs, identifying the wireless terminal in both the WLAN and the cellular network.

Figure 43:
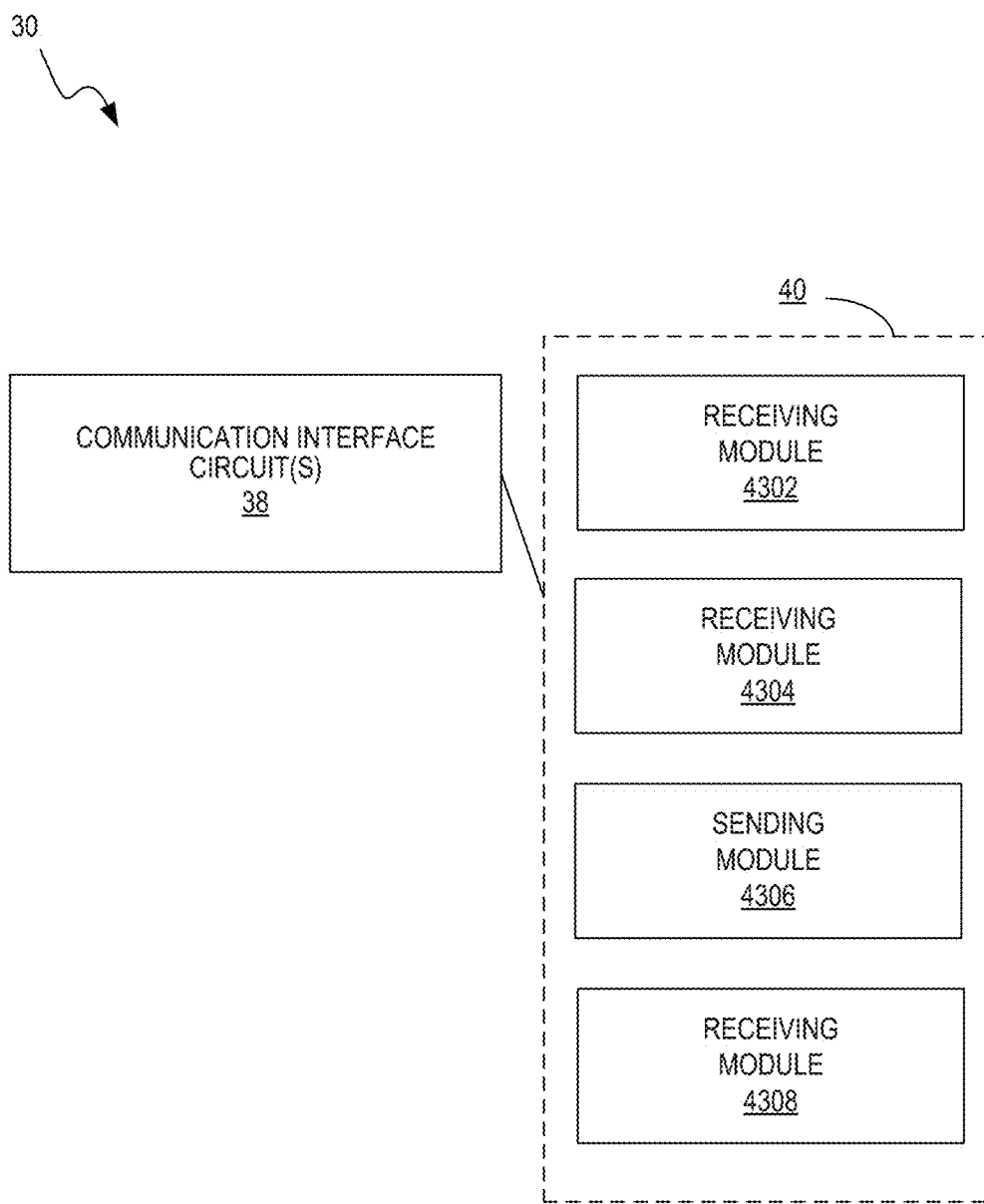
Figure 44:
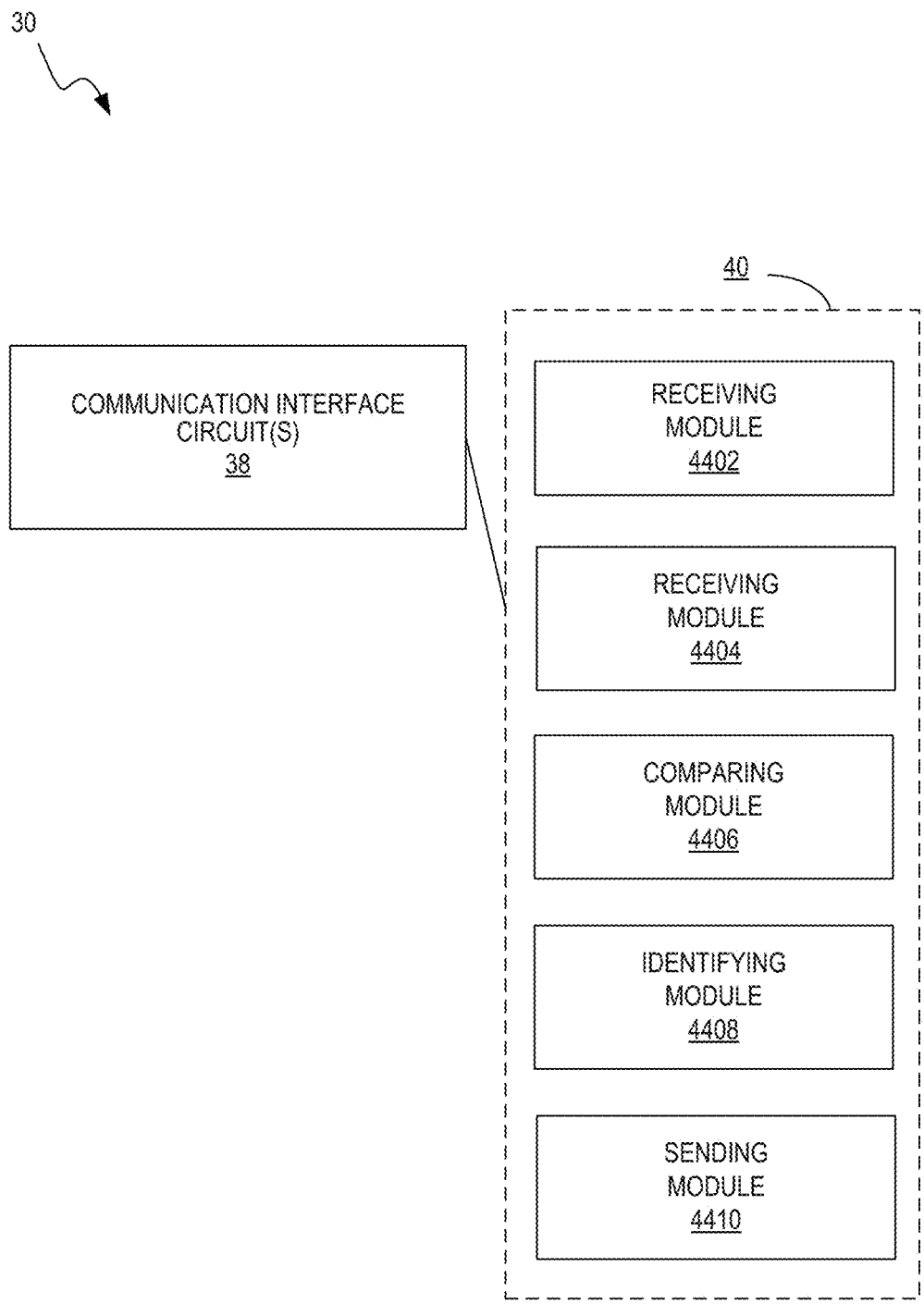

FIGS. 43 and 44 correspond to FIGS. 25 and 26, respectively. FIG. 43 illustrates an example functional module or circuit architecture as may be implemented in a network access node 30 associated with a node ID and configured to communicate with a wireless terminal that is associated with a wireless terminal ID and that is configured for operation in the cellular network and in a WLAN, e.g., based on the processing circuit 32. The implementation at least functionally includes a receiving module 4302 for receiving a wireless terminal ID associated with the wireless terminal from the wireless terminal via the cellular network and a receiving module 4304 for receiving, from the wireless terminal, a logical node ID of a logical node that is operatively connected to the cellular network and the WLAN. The implementation also includes a sending module 4306 for sending the wireless terminal ID to the logical node identified by the logical node ID and a receiving module 4308 for receiving an indication from the logical node that the wireless terminal has been identified in the WLAN.

FIG. 44 illustrates an example functional module or circuit architecture as may be implemented in a logical node associated 30 with a logical node ID and configured to communicate with a wireless terminal that is associated with a wireless terminal ID and configured for operation in a wide-area cellular network and in a WLAN, e.g. based on processing circuit 32. The implementation at least functionally includes a receiving module 4402 for receiving, from a network access node of the cellular network, a first wireless terminal ID associated with the wireless terminal, a receiving module 4404 for receiving, from an access point of the WLAN, a node ID of the network access node and a second wireless terminal ID associated with the wireless terminal, and a comparing module 4406 for comparing the first wireless terminal ID received from the network access node and the second wireless terminal ID received from the access point. The implementation also includes an identifying module 4408 for, responsive to a match of the first and second wireless terminal IDs, identifying the wireless terminal in both the WLAN and the cellular network and a sending module 4410 for sending a notification to the network access node that the wireless terminal has been identified in the WLAN.

Figure 45:
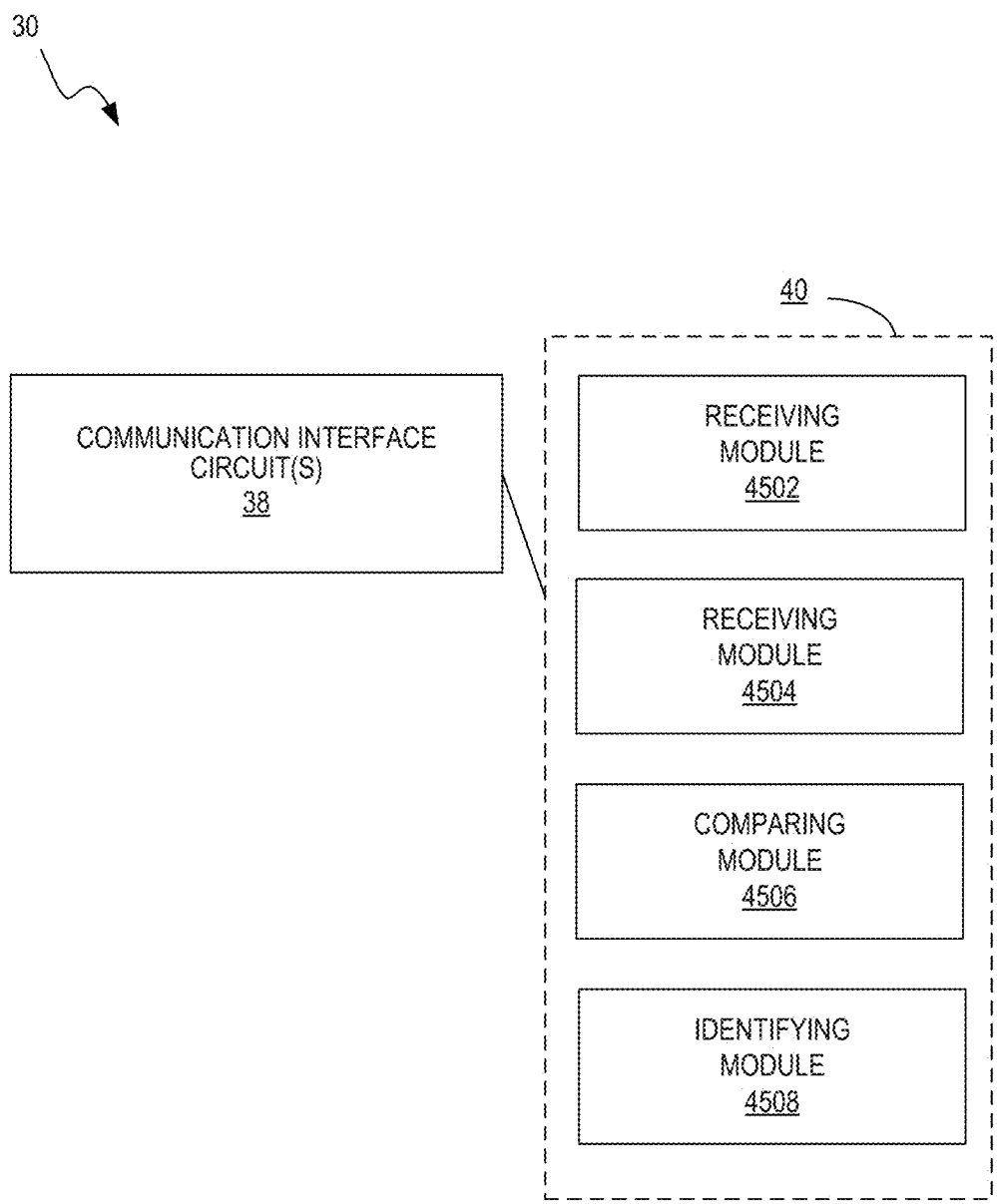

FIG. 45 corresponds to FIG. 28. FIG. 45 illustrates an example functional module or circuit architecture as may be implemented in a network access node 30 associated with a node ID and configured to communicate with a wireless terminal that is associated with a wireless terminal ID and that is configured for operation in the cellular network and in a WLAN, e.g., based on the processing circuit 32. The implementation at least functionally includes a receiving module 4502 for receiving a first WLAN MAC address of the wireless terminal via the cellular network and a receiving module 4504 for receiving a second WLAN MAC address from a logical node that is operatively connected to the cellular network and the WLAN. The implementation also includes a comparing module 4506 for comparing the first WLAN MAC address received from the wireless terminal and the second WLAN MAC address received from the logical node and an identifying module 4508 for, responsive to a match of the first and second WLAN MAC addresses, identifying the wireless terminal in the WLAN via the logical node.

Figure 46:
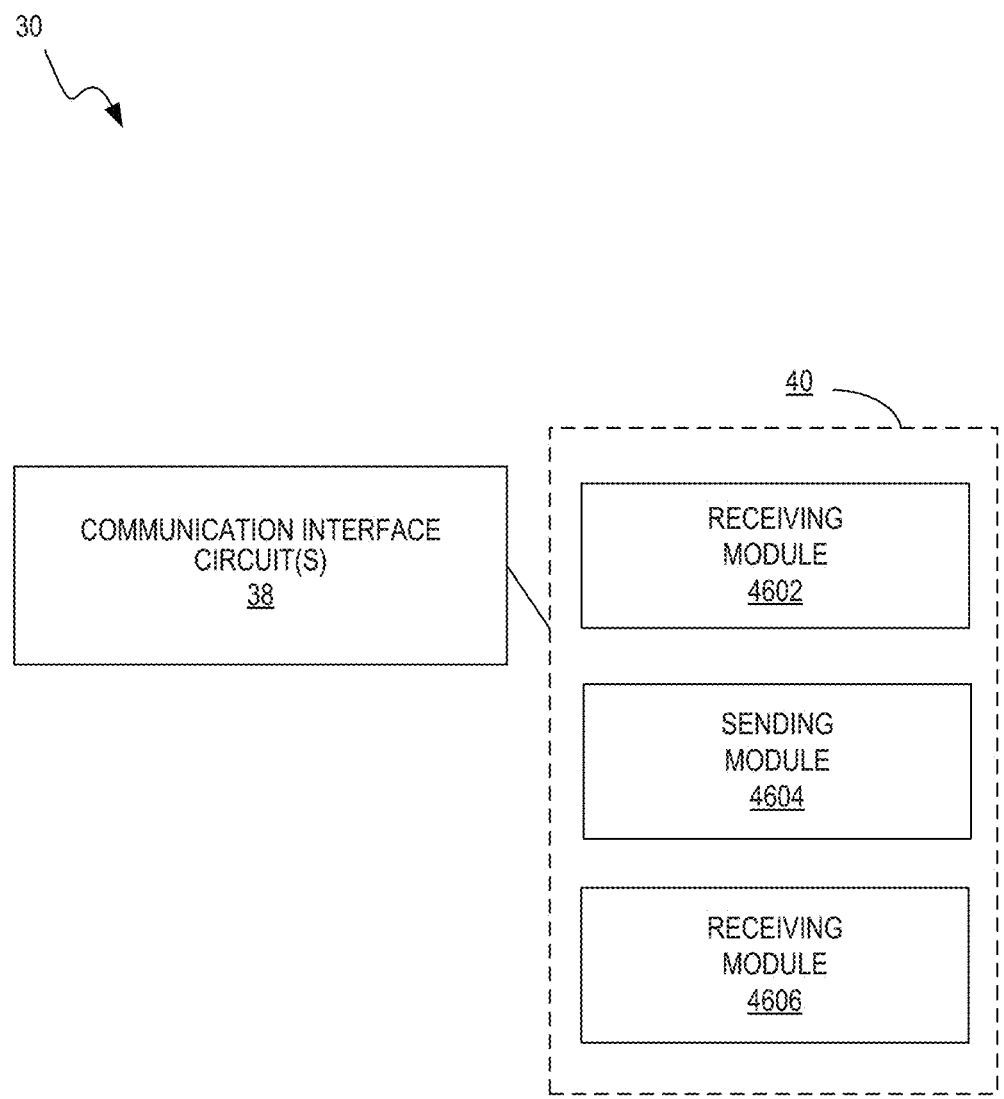
Figure 47:
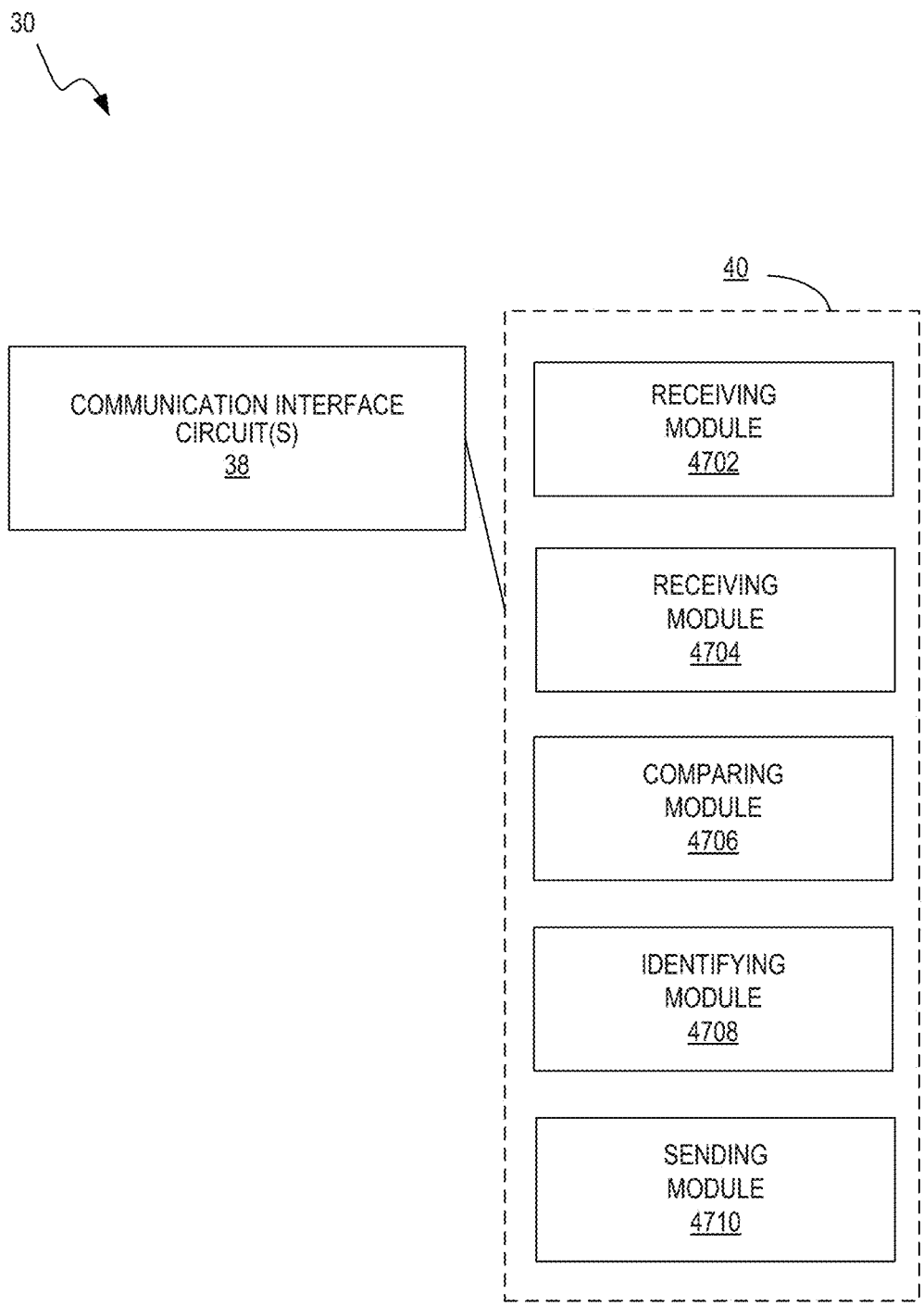

Finally, FIGS. 46 and 47 correspond to FIGS. 30 and 31, respectively. FIG. 46 illustrates an example functional module or circuit architecture as may be implemented in a network access node 30 associated with a node ID and configured to communicate with a wireless terminal that is associated with a wireless terminal ID and that is configured for operation in the cellular network and in a WLAN, e.g., based on the processing circuit 32. The implementation at least functionally includes a receiving module 4602 for receiving a WLAN MAC address of the wireless terminal via the cellular network, a sending module 4604 for sending the WLAN MAC address to one or more logical nodes, and a receiving module 4606 for receiving an indication from one of the logical nodes that the wireless terminal associated with the WLAN MAC address has been identified in the WLAN.

FIG. 47 illustrates an example functional module or circuit architecture as may be implemented in a logical node associated 30 with a logical node ID and configured to communicate with a wireless terminal that is associated with a wireless terminal ID and configured for operation in a wide-area cellular network and in a WLAN, e.g. based on processing circuit 32. The implementation at least functionally includes a receiving module 4702 for receiving, from a network access node of the cellular network, a first WLAN MAC address associated with the wireless terminal, a receiving module 4704 for receiving, from an access point of the WLAN, a second WLAN MAC address associated with the wireless terminal, and a comparing module 4706 for comparing the first WLAN MAC address received from the network access node and the second WLAN MAC address received from the access point. The implementation also includes an identifying module 4708 for, responsive to a match of the first and second WLAN MAC addresses, identifying the wireless terminal in both the WLAN and the cellular network and a sending module 4710 for sending a notification to the network access node that the wireless terminal has been identified in the WLAN.

The techniques presented herein allow the UE to be identified in (all) types of WLAN configurations (e.g., NAT functionality). Trying to find the UE using WLAN identifiers (BSSID, HESSID, SSID, UE MAC Address) would require more of the WLAN implementation and it is unclear if it is even possible. In order for this to work, the UE needs to be provided with sufficient information to be able to trigger a message in WLAN back to the 3GPP WT node in contact with the eNodeB the UE ID has been exchanged with. The provided techniques solve at least this problem.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a network access node of a wide-area cellular network, the network access node associated with a node ID and configured to communicate with a wireless terminal that is associated with a wireless terminal ID and that is configured for operation in the cellular network and in a wireless local area network (WLAN), the method comprising:
   sending, to the wireless terminal via the cellular network, a logical node ID associated with a logical node that is operatively connected to the cellular network and the WLAN;
   receiving, from the logical node, the wireless terminal ID of the wireless terminal via the WLAN;
   comparing the received wireless terminal ID with stored wireless terminal IDs; and
   responsive to a match of the received wireless terminal ID and one of the stored wireless terminal IDs, identifying the wireless terminal in both the WLAN and the cellular network.

2. The method of claim 1, further comprising sending the node ID to the wireless terminal.

3. The method of claim 1, further comprising sending data to the wireless terminal via the logical node.

4. The method of claim 1, further comprising sending the wireless terminal ID to the wireless terminal via the cellular network.

5. The method of claim 1, wherein the wireless terminal ID is a first wireless terminal ID and the method further comprises receiving a second wireless terminal ID associated with the wireless terminal from the wireless terminal via the cellular network, and wherein the comparing comprises comparing the second wireless terminal ID received from the wireless terminal with the stored wireless terminal IDs, and wherein the identifying comprises identifying the wireless terminal in both the WLAN and the cellular network responsive to an association of the received wireless terminal ID with one of the stored wireless terminal IDs.

6. A method, in a wireless terminal of a wide-area cellular network, the wireless terminal associated with a wireless terminal ID and configured for operation in the cellular network and in a wireless local area network (WLAN), the method comprising:
   receiving, from a network access node of the cellular network via the cellular network, a node ID of the network access node and a logical node ID of a logical node that is operatively connected to the cellular network and the WLAN; and
   sending, to the logical node via the WLAN, the wireless terminal ID and a transport network layer (TNL) address of the wireless terminal.

7. The method of claim 6, further comprising:
   requesting a TNL address of the logical node from a domain name system (DNS) or database;
   receiving the TNL address of the logical node; and
   using the TNL address to send the wireless terminal ID to the logical node.

8. The method of claim 6, further comprising sending the node ID to the logical node via the WLAN.

9. The method of claim 8, further comprising using the TNL address to send the node ID to the logical node.

10. The method of claim 6, further comprising receiving the wireless terminal ID from the network access node via the cellular network.

11. The method of claim 6, further comprising sending the wireless terminal ID to the network access node via the WLAN.

12. A method, in a logical node associated with a logical node ID and configured to communicate with a wireless terminal configured for operation in a wide-area cellular network and in a wireless local area network (WLAN), the method comprising:
   receiving, from a network access node of the cellular network, a first wireless terminal ID associated with the wireless terminal;
   receiving, from the wireless terminal, a second wireless terminal ID associated with the wireless terminal;
   comparing the first wireless terminal ID received from the network access node and the second wireless terminal ID received from the wireless terminal;
   responsive to a match of the first and second wireless terminal IDs, identifying the wireless terminal in both the WLAN and the cellular network; and
   sending a notification to the network access node that the wireless terminal has been identified in the WLAN.

13. The method of claim 12, wherein the comparing comprises:
   determining, from the first and second wireless terminal IDs, whether the network access node is waiting for a response from the wireless terminal identified by the first and second wireless terminal IDs;
   responsive to a determination that the network access node is not waiting for the response, discarding the first and second wireless terminal IDs; and
   responsive to a determination that the network access node is waiting for the response, determining that a match has been established.

14. A method, in a network access node of a wide-area cellular network, the network access node associated with a node ID and configured to communicate with a wireless terminal that is associated with a wireless terminal ID and configured for operation in the cellular network and in a wireless local area network (WLAN), the method comprising:
   receiving the wireless terminal ID from a logical node that is operatively connected to the cellular network and the WLAN;
   comparing the wireless terminal ID received from the logical node to stored wireless terminal IDs;
   responsive to a match of the received wireless terminal ID and one of the stored wireless terminal IDs, identifying the wireless terminal in both the WLAN and the cellular network; and
   identifying that the wireless terminal has a connection via the logical node.

15. The method of claim 14, further comprising sending the node ID to the wireless terminal via the cellular network.

16. The method of claim 14, further comprising sending the wireless terminal ID to the wireless terminal.

17. A method, in a network access node of a wide-area cellular network configured to serve a wireless terminal configured for operation in the cellular network and in a wireless local area network (WLAN), the method comprising:
   sending a node ID associated with the network access node to the wireless terminal via the cellular network;
   receiving the first wireless terminal ID from the wireless terminal via the cellular network;
   receiving a second wireless terminal ID of the wireless terminal from a logical node that is operatively connected to the cellular network and the WLAN;

comparing the first wireless terminal ID received from the wireless terminal and the second wireless terminal ID received from the logical node; and responsive to a match of the first and second wireless terminal IDs, identifying the wireless terminal in both the WLAN and the cellular network.

18. A method, in a logical node associated with a logical node ID and configured to communicate with a wireless terminal configured for operation in a wide-area cellular network and in a wireless local area network (WLAN), the method comprising:

receiving, from a network access node of the cellular network, a first wireless terminal ID associated with the wireless terminal;

receiving, from an access point of the WLAN, a node ID of the network access node and a second wireless terminal ID associated with the wireless terminal;

comparing the first wireless terminal ID received from the network access node and the second wireless terminal ID received from the access point;

responsive to a match of the first and second wireless terminal IDs, identifying the wireless terminal in both the WLAN and the cellular network; and sending a notification to the network access node that the wireless terminal has been identified in the WLAN.

19. The method of claim 18, further comprising sending a logical node ID of the logical node to the wireless terminal via the WLAN.

20. A method, in a network access node of a wide-area cellular network, the network access node associated with a node ID and configured to communicate with a wireless terminal configured for operation in the cellular network and in a wireless local area network (WLAN), the method comprising:

receiving a first WLAN media access control (MAC) address of the wireless terminal via the cellular network;

receiving a second WLAN MAC address from a logical node that is operatively connected to the cellular network and the WLAN;

comparing the first WLAN MAC address received from the wireless terminal and the second WLAN MAC address received from the logical node; and responsive to a match of the first and second WLAN MAC addresses, identifying the wireless terminal in the WLAN via the logical node.

21. The method of claim 20, further comprising sending the node ID to the wireless terminal via the cellular network.

22. The method of claim 20, further comprising sending data to the wireless terminal via the WLAN.

23. The method of claim 20, further comprising, responsive to at least one of: a release of the wireless terminal; moving out of the wireless terminal; lack of use of the wireless terminal; and receiving a message that the wireless terminal is using another logical node, sending an indication to the logical node that resources for the WLAN MAC address associated with the wireless terminal can be released.

* * * * *